(12) United States Patent
Li et al.

(10) Patent No.: US 11,140,708 B2
(45) Date of Patent: Oct. 5, 2021

(54) METHOD AND APPARATUS FOR FRAME BASED EQUIPMENT OPERATION OF NR UNLICENSED

(71) Applicant: Samsung Electronics Co., Ltd., Suwon-si (KR)

(72) Inventors: Yingzhe Li, Mountain View, CA (US); Hongbo Si, Plano, TX (US); Qiongjie Lin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/522,588

(22) Filed: Jul. 25, 2019

(65) Prior Publication Data

US 2020/0037354 A1 Jan. 30, 2020

Related U.S. Application Data

(60) Provisional application No. 62/711,939, filed on Jul. 30, 2018, provisional application No. 61/713,840, (Continued)

(51) Int. Cl.
*H04W 74/00* (2009.01)
*H04L 5/00* (2006.01)

(52) U.S. Cl.
CPC .......... *H04W 74/004* (2013.01); *H04L 5/001* (2013.01); *H04L 5/0051* (2013.01)

(58) Field of Classification Search
CPC ............ H04W 74/0808; H04W 74/004; H04L 5/1469; H04L 5/0051; H04L 5/001
See application file for complete search history.

(56) References Cited

U.S. PATENT DOCUMENTS

2017/0318607 A1* 11/2017 Tiirola ............. H04W 74/0808
2018/0115992 A1 4/2018 Park et al.
(Continued)

FOREIGN PATENT DOCUMENTS

| WO | 2016072776 A1 | 5/2016 |
| WO | 2017131470 A1 | 8/2017 |
| WO | 2017155305 A1 | 9/2017 |

OTHER PUBLICATIONS

ISA/KR, International Search Report and Written Opinion of the International Searching Authority, International Application No. PCT/KR2019/009455, Nov. 14, 2019, 10 pages.
(Continued)

*Primary Examiner* — Anez C Ebrahim

(57) ABSTRACT

A user equipment (UE) includes at least one processor configured to identify a channel access mechanism to gain access to an operating channel of unlicensed band, perform a listen-before-talk (LBT) operation over the operating channel according to the identified channel access mechanism and obtain a channel occupancy time (COT) for transmission and reception on the operating channel after the LBT operation is successful, and identify, within the COT, one or more switching points for the UE to switch from uplink (UL) transmission to downlink (DL) reception or from the DL reception to the UL transmission. The UE further includes a transceiver configured to transmit to or receive from a base station (BS) over the operating channel during the COT, and switch from the UL transmission to the DL reception or from the DL reception to the UL transmission based on the identified one or more switching points.

20 Claims, 30 Drawing Sheets

Related U.S. Application Data filed on Aug. 2, 2018, provisional application No. 62/715,042, filed on Aug. 6, 2018, provisional application No. 62/719,917, filed on Aug. 20, 2018, provisional application No. 62/731,485, filed on Sep. 14, 2018.

(56) References Cited

U.S. PATENT DOCUMENTS

2018/0152851 A1* 5/2018 Li ................... H04W 16/14
2019/0342045 A1* 11/2019 Radulescu ............ H04L 5/001

OTHER PUBLICATIONS

Samsung, "LAA performance analysis on FBE and LBE for reuse-1," R1-151628, 3GPP TSG RAN WG1 Meeting #80bis, Belgrade, Serbia, Apr. 20-24, 2015, 9 pages.
"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 87 pages.
"LTE; Evolved Universal Terrestrial Radio Access (E-UTRA); Physical channels and modulation (3GPP TS 36.211 version 13.2.0 Release 13)", ETSI TS 136 211, V.13.2.0, Aug. 2016, 170 pages.
"LTE; Evolved Universal Terrestrial Radio Access (E-UTRA); Multiplexing and channel coding (3GPP TS 36.212 version 13.2.0 Release 13)", ETSI TS 136 212, V.13.2.0, Jan. 2016, 142 pages.
"LTE; Evolved Universal Terrestrial Radio Access (E-UTRA); Physical layer procedures (3GPP TS 36.213 version 13.2.0 Release 13)", ETSI 136 213, V.13.2.0, Aug. 2016, 383 pages.
"LTE; Evolved Universal Terrestrial Radio Access (E-UTRA); Medium Access Control (MAC) protocol specification (3GPP TS 36.321 version 13.2.0 Release 13)", ETSI TS 136 321, V.13.2.0, Aug. 2016, 93 pages.
"LTE; Evolved Universal Terrestrial Radio Access (E-UTRA); Radio Resource Control (RRC); Protocol specification (3GPP TS 36.331 version 13.2.0 Release 13)", ETSI TS 136 331, V.13.2.0, Aug. 2016, 834 pages.
"3rd Generation Partnership Project; Technical Specification Group Radio Access Network; NR; Physical channels and modulation (Release 15)", 3GPP TS 38.211 V15.4.0, Dec. 2018, 96 pages.
"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for control (Release 15)" 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
IEEE Std 802.11-2016, "Part 11: Wireless LAN Medium Access Control (MAC) and Physical Layer (PHY) Specifications", 2016, 3534 pages.
ETSI EN 301 893 V2.1.1, "5 GHz RLAN; Harmonised Standard covering the essential requirements of article 3.2 of Directive 2014/53/EU", 2017, 135 pages.
ETSI EN 302 567 V2.1.1, "Multiple-Gigabit/s radio equipment operating in the 60 GHz band; Harmonised Standard covering the essential requirements of article 3.2 of Directive 2014/53/EU", 2017, 40 pages.

* cited by examiner

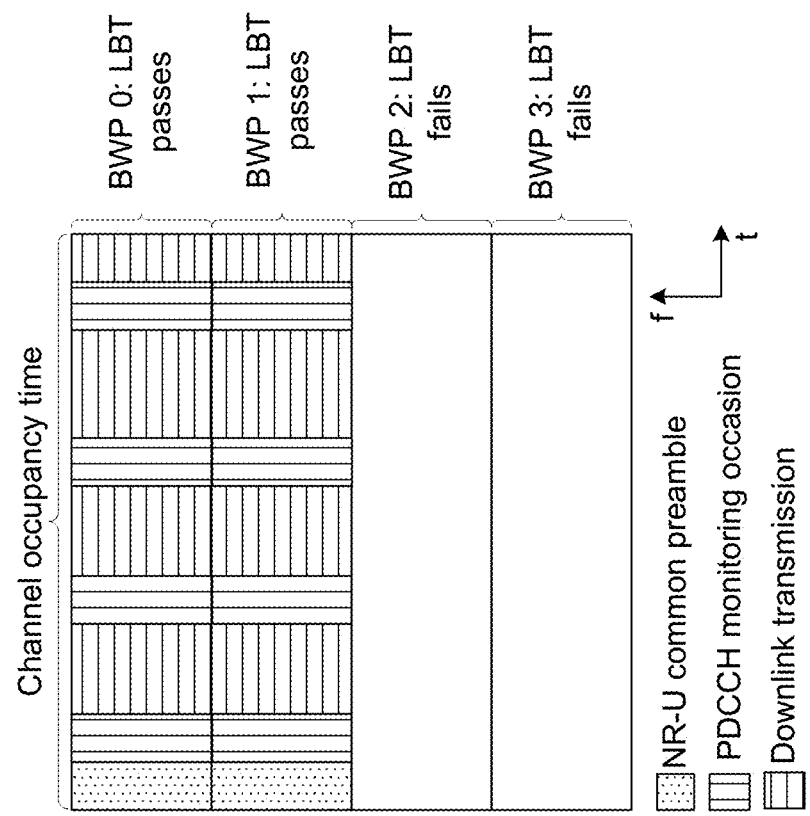
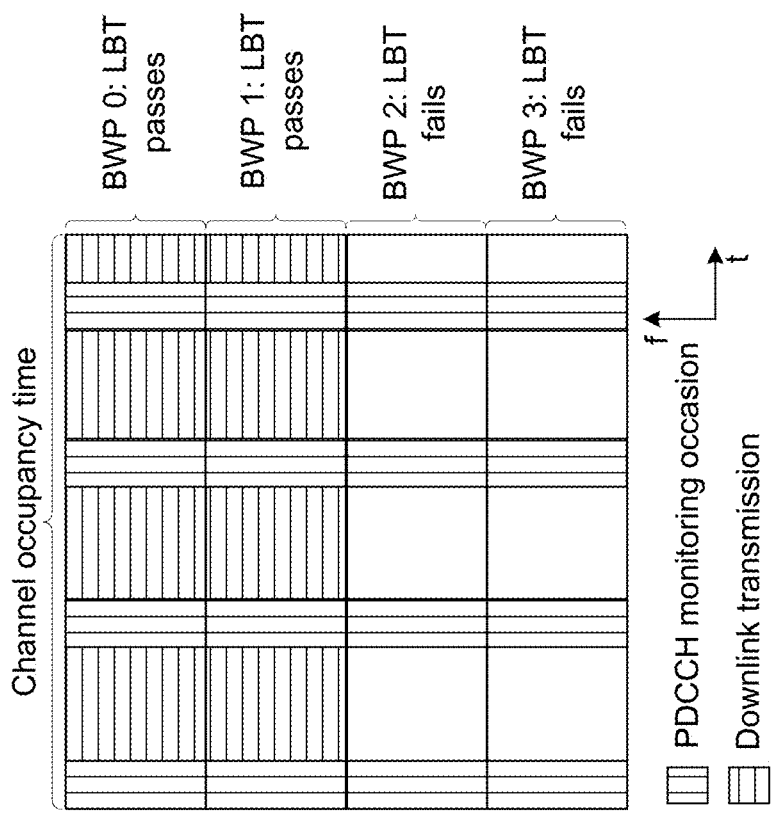
FIG. 37A
FIG. 37B

METHOD AND APPARATUS FOR FRAME BASED EQUIPMENT OPERATION OF NR UNLICENSED

CROSS-REFERENCE TO RELATED APPLICATIONS AND CLAIMS OF PRIORITY

This application claims priority under 35 U.S.C. § 119(e) to:
U.S. Provisional Patent Application No. 62/711,939 filed on Jul. 30, 2018;
U.S. Provisional Patent Application No. 62/713,840 filed on Aug. 2, 2018;
U.S. Provisional Patent Application No. 62/731,485 filed on Sep. 14, 2018;
U.S. Provisional Patent Application No. 62/715,042 filed on Aug. 6, 2018; and
U.S. Provisional Patent Application No. 62/719,917 filed on Aug. 20, 2018.
The above-identified provisional patent application is hereby incorporated by reference in their entirety.

TECHNICAL FIELD

The present disclosure relates to communication systems and, in particular, the configuration of NR unlicensed (NR-U) to support the frame-based equipment (FBE) operation mode and to support a downlink (DL) to uplink (UL) switching(s) and UL to DL switching.

BACKGROUND

To meet the increased demand for wireless data services since the deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beamforming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The present disclosure relates to a pre-5G or 5G communication system to be provided for supporting higher data rates beyond 4G communication system such as Long Term Evolution (LTE).

In one embodiment, a user equipment (UE) in a wireless communication system is provided. The UE includes at least one processor configured to identify a channel access mechanism to gain access to an operating channel of unlicensed band, perform a listen-before-talk (LBT) operation over the operating channel according to the identified channel access mechanism and obtain a channel occupancy time (COT) for transmission and reception on the operating channel after the LBT operation is successful, and identify, within the COT, one or more switching points for the UE to switch from UL transmission to DL reception or from the DL reception to the UL transmission. The UE further includes a transceiver operably connected to the at least one processor, the transceiver configured to transmit to or receive from a base station (BS) over the operating channel during the COT, and switch from the UL transmission to the DL reception or from the DL reception to the UL transmission based on the identified one or more switching points.

In another embodiment, a BS in a wireless communication system is provided. The BS includes at least one processor configured to identify a channel access mechanism to gain access to an operating channel of unlicensed band, perform a LBT operation over the operating channel according to the identified channel access mechanism and obtain a COT for transmission and reception on the operating channel after the LBT operation is successful, and identify, within the COT, one or more than one switching points for the BS to switch from DL transmission to UL reception or from the UL reception to the DL transmission. The BS further includes a transceiver operably connected to the at least one processor, the transceiver configured to transmit to or receive from a UE over the operating channel during the COT, and switch from the DL transmission to the UL reception or from the UL reception to the DL transmission based on the identified one or more switching points.

In yet another embodiment, a method for operating a UE in a wireless communication system is provided. The method includes identifying a channel access mechanism to gain access to an operating channel of unlicensed band, performing a LBT operation over the operating channel according to the identified channel access mechanism and obtain a COT for transmission and reception on the operating channel after the LBT operation is successful, and identifying, within the COT, one or more than one switching points for the UE to switch from UL transmission to DL reception or from the DL reception to the UL transmission, and switching from the UL transmission to the DL reception or from the DL reception to the UL transmission based on the identified one or more switching points.

Other technical features may be readily apparent to one skilled in the art from the following figures, descriptions, and claims.

Before undertaking the DETAILED DESCRIPTION below, it may be advantageous to set fourth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 37A and 37B illustrate exemplary FBE channel access schemes with configurable BWPs for the LBT processes according to embodiments of the present disclosure;

DETAILED DESCRIPTION

FIGS. 1 through 39, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

This disclosure relates to designing an adaptation procedure for a UE operation to enable signaling for both an adaptation request from the UE to a serving base station (gNB) and an adaptation request from the gNB to the UE that can be based on assistance information from the UE. This disclosure also relates to enabling adaptation schemes in a UE operation to support the adaptation on UE operating characteristics in frequency, time, and antenna domains, in Discontinuous Reception (DRX) configuration, and in processing timeline. This disclosure further relates to designing a downlink (DL) physical layer signal/channel for a gNB to signal to a UE information for the UE to adapt parameters of the UE operation. This disclosure additionally relates to designing an uplink (UL) physical layer signal/channel for a UE to transmit an adaptation request to a gNB. This disclosure additionally also relates to specifying assistance information for a UE to transmit to a gNB to assist the gNB in determining adaptations in parameters of the UE operation.

This disclosure also relates to enhancing a design of synchronization signals/physical broadcast channel (SS/PBCH) blocks based mobility measurements by a UE and to enhancing a design of CSI-RS based mobility measurements by a UE for asynchronous networks. This disclosure also relates to reducing an RRM measurement overhead by utilizing a change in UE mobility state or channel condition. This disclosure additionally relates to optimizing a mobility measurement by a UE in discontinuous reception (DRX) operation in a Radio Resource Control (RRC)_CONNECTED state (C-DRX) over reference signal (RS) resources with more flexibility in both time and frequency domains.

Figure 1:
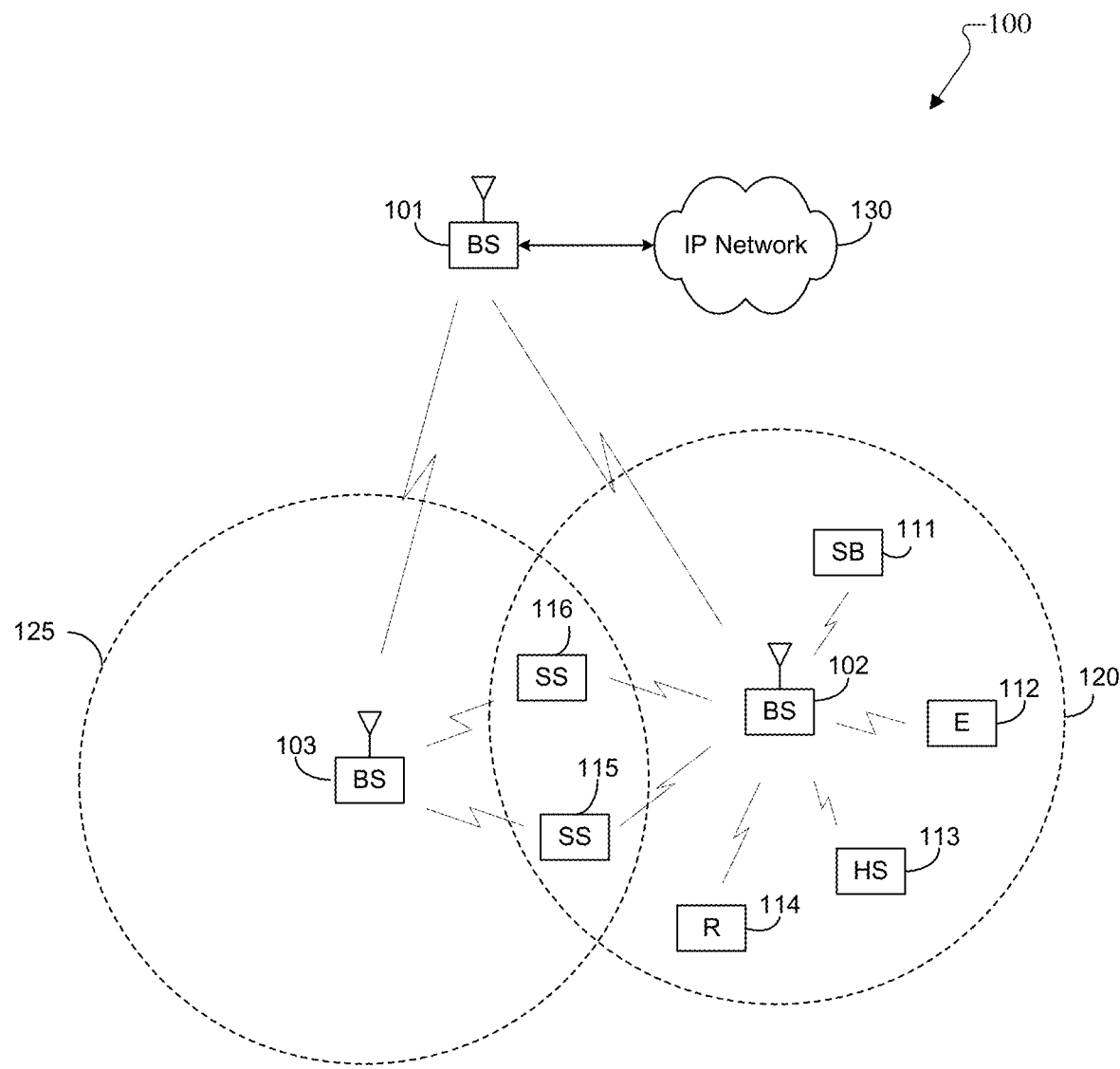
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
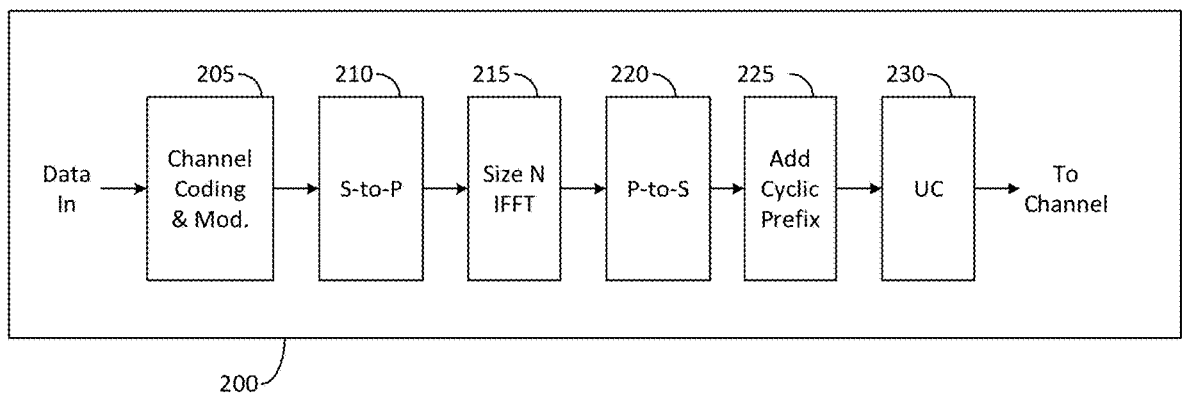
FIGS. 2A and 2B illustrate example wireless transmit and receive paths according to this disclosure.
Figure 2B:
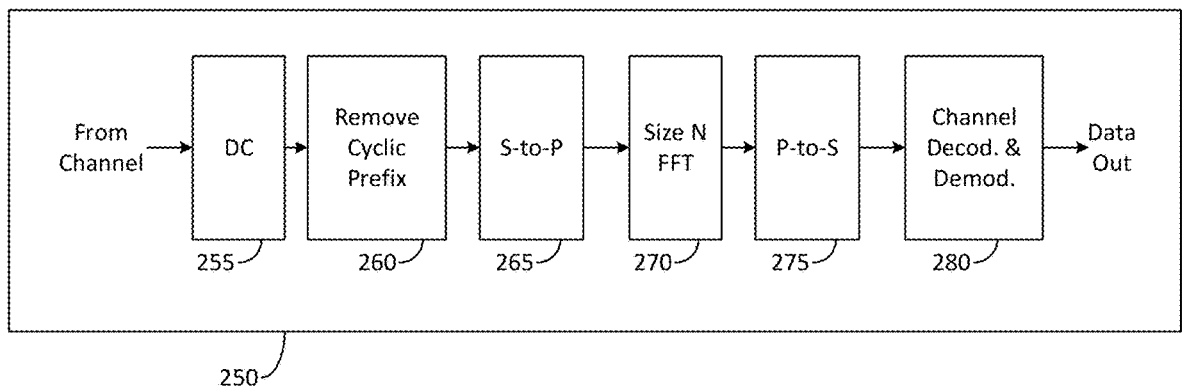

FIGS. 2A and 2B illustrate example wireless transmit and receive paths according to this disclosure. In the following description, a transmit path 200 may be described as being implemented in an gNB (such as gNB 102), while a receive path 250 may be described as being implemented in a UE (such as UE 116). However, it will be understood that the receive path 250 could be implemented in an gNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
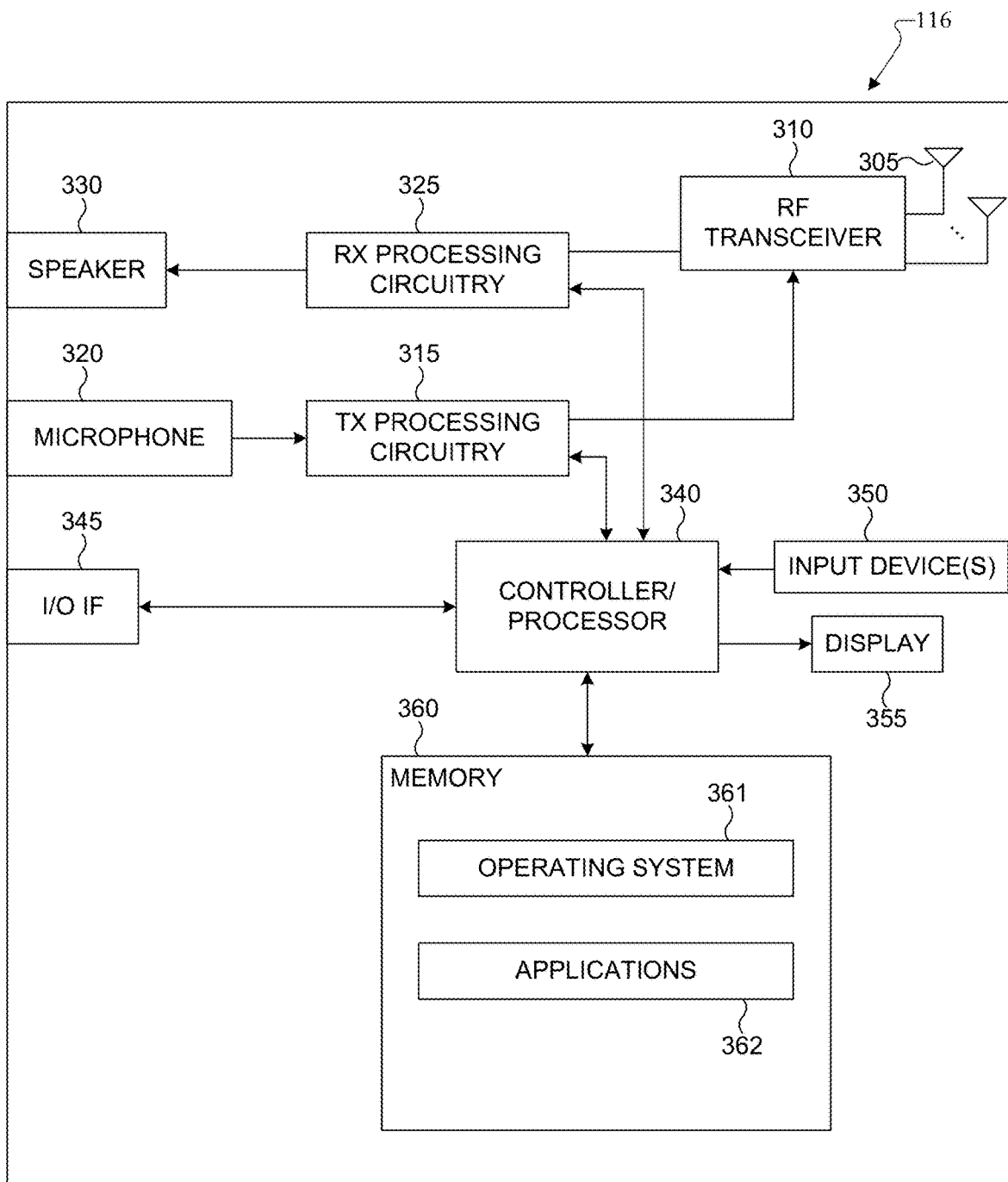
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
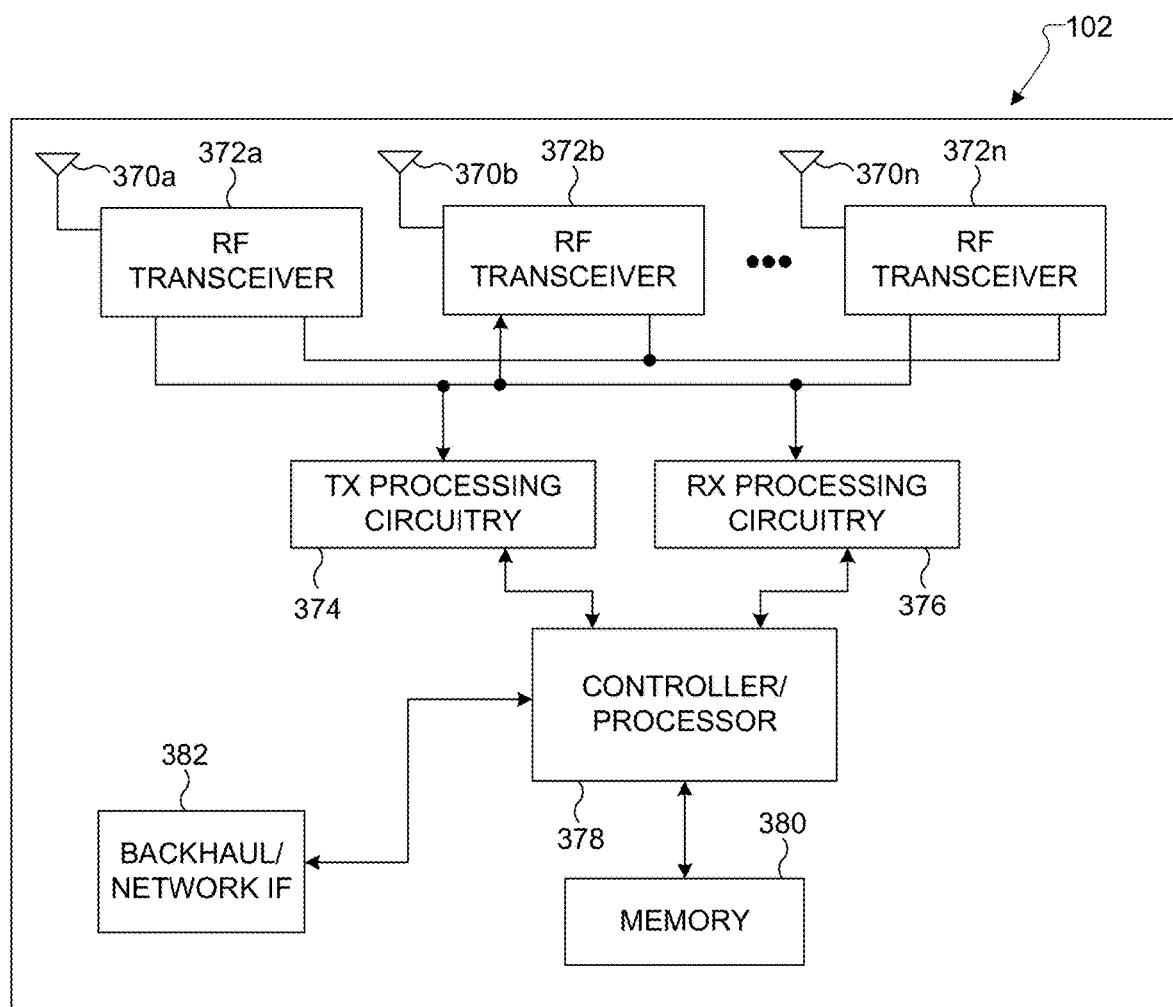
FIG. 3B illustrates an example enhanced NodeB (gNB) according to this disclosure.

FIG. 3B illustrates an example gNB 102 according to this disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions is configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

A UE is typically configured by a gNB to monitor multiple locations for respective candidate PDCCH receptions to decode one or more DCI formats. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier. For a DCI format scheduling a PDSCH conveying system information (SI), the RNTI can be a SI-RNTI. For a DCI format scheduling a PDSCH providing a random-access response (RAR), the RNTI can be a RA-RNTI. For a DCI format providing transmit power control (TPC) commands to a group of UEs, the RNTI can be a TPC-RNTI. Each RNTI type can be configured to a UE through higher-layer signaling such as RRC signaling. A DCI format scheduling PDSCH reception by a UE is also referred to as DL DCI format or DL assignment while a DCI format scheduling PUSCH transmission from a UE is also referred to as UL DCI format or UL grant.

A PDCCH transmission can be within a set of PRBs. A gNB can configure a UE one or more sets of PRB sets, also referred to as control resource sets (CORESETs), for PDCCH receptions. A PDCCH transmission can be in control channel elements (CCEs) of a CORESET. A UE determines CCEs for a PDCCH reception based on a search space set. A set of CCEs that can be used for PDCCH reception by a UE define a PDCCH candidate location.

Figure 4A:
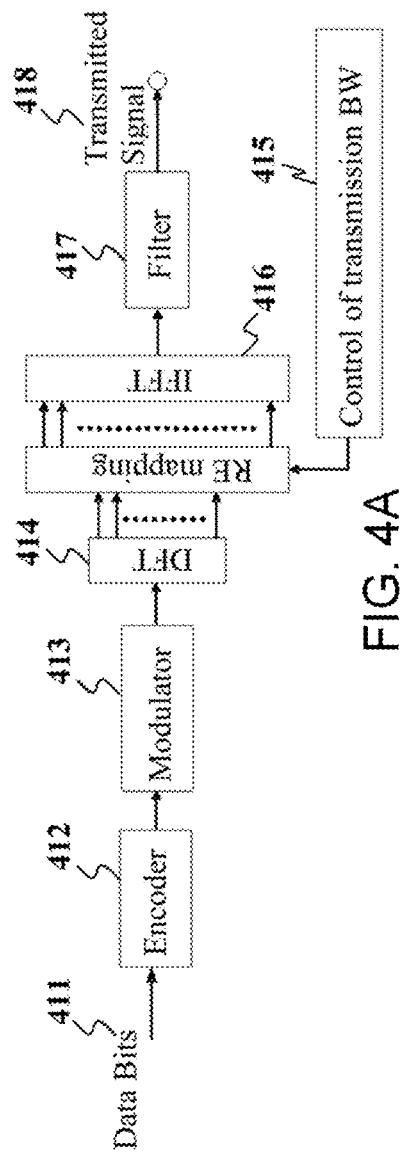
FIG. 4A illustrates an example encoding process for a DCI format according to this disclosure.

FIG. 4A illustrates a transmitter block diagram for a PUSCH in a subframe. The embodiment of the PUSCH transmitter block diagram shown in FIG. 4A is for illustration only. Other embodiments could be used without departing from the scope of the present disclosure. Information data bits 411 are encoded by encoder 412, such as a turbo encoder, and modulated by modulator 413. A Discrete Fourier Transform (DFT) unit 414 applies a DFT on the modulated data bits, resource elements (REs) corresponding to an assigned PUSCH transmission BW are selected by transmission BW selection unit 415, unit 416 applies an IFFT and, after a cyclic prefix insertion (not shown), filtering is applied by filter 417 and a signal transmitted 418.

Figure 4B:
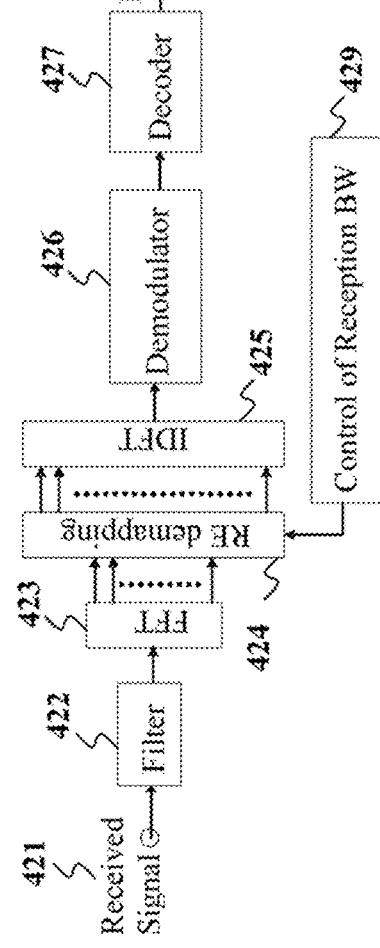
FIG. 4B illustrates an example decoding process for a DCI format according to this disclosure.

FIG. 4B illustrates a receiver block diagram for a PUSCH in a subframe. The embodiment of the PUSCH receiver block diagram shown in FIG. 4B is for illustration only. Other embodiments could be used without departing from the scope of the present disclosure. A received signal 421 is filtered by filter 422. Subsequently, after a cyclic prefix is removed (not shown), unit 423 applies a FFT, REs 424 corresponding to an assigned PUSCH reception BW are selected by a reception BW selector 429, unit 425 applies an Inverse DFT (IDFT), a demodulator 426 coherently demodulates data symbols by applying a channel estimate obtained from a DMRS (not shown), a decoder 427, such as a turbo decoder, decodes the demodulated data to provide an estimate of the information data bits 428.

In next generation cellular systems, various use cases are envisioned beyond the capabilities of LTE. Termed 5G or the fifth-generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed 'ultra-reliable and low latency' (URLL) targeted for applications with less stringent data rate requirements, but less tolerant to latency. A third group is termed 'massive MTC' (mMTC) targeted for large number of low-power device connections such as 1 million per $km^2$ with less stringent the reliability, data rate, and latency requirements.

In order for the 5G network to support such diverse services with different quality of services (QoS), called network slicing. To utilize PHY resources efficiently and multiplex various slices (with different resource allocation schemes, numerologies, and scheduling strategies) in DL-SCH, a flexible and self-contained frame or subframe design is utilized.

Figure 5:
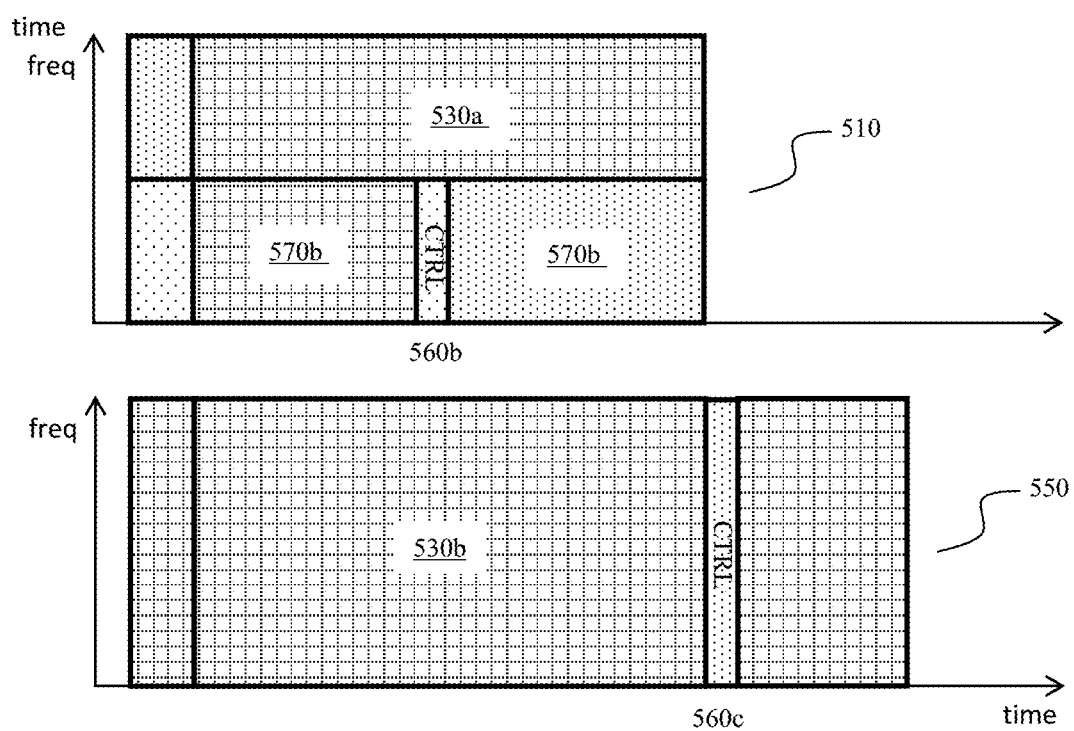
FIG. 5 illustrates two exemplary instances of multiplexing two slices within a common subframe or frame according to one embodiment of the present disclosure.

FIG. 5 illustrates two exemplary instances of multiplexing two slices within a common subframe or frame according to embodiments of the present disclosure. In these exemplary embodiments, a slice can be composed of one or two transmission instances where one transmission instance consists of a control (CTRL) component (520a, 560a, 560b, 520b, or 560c) and a data component: data frame/subframe for Slice 1 (530a), data frame/subframe for Slice 2 (570a), data frame/subframe for Slice 2 (570b), data frame/subframe for Slice 1 (530b), or data frame/subframe for Slice 2 (570c).

In embodiment 510, the two slices are multiplexed in frequency domain whereas in embodiment 550, they are multiplexed in time domain. These two slices can be transmitted with different sets of numerology.

Rel. 14 LTE supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

Figure 6:
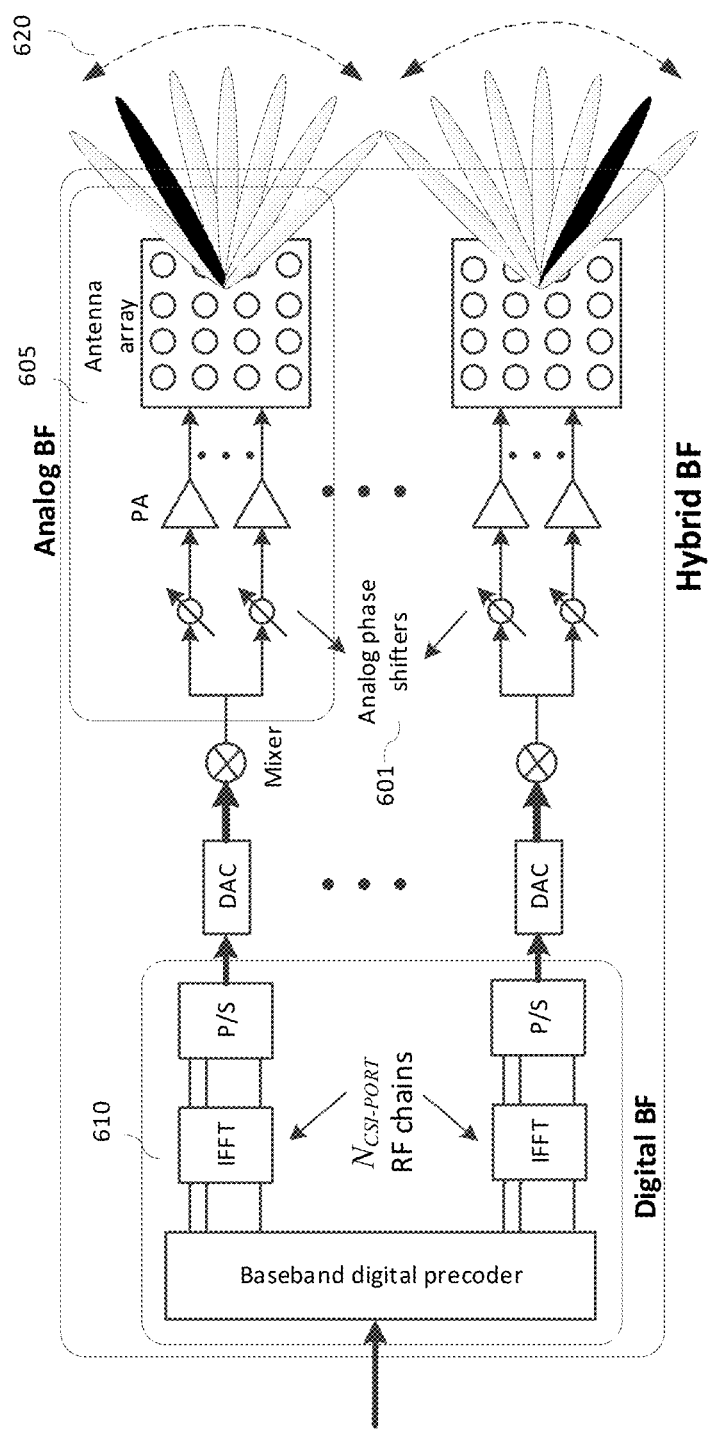
FIG. 6 illustrates an example of a large number of antenna elements for mmWave bands according to one embodiment of the present disclosure.

FIG. 6 illustrates an example of a large number of antenna elements for mmWave bands according to one embodiment of the present disclosure. The embodiment shown in FIG. 6 is for illustration only. Other embodiments could be used without departing from the scope of the present disclosure In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles (620) by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks.

In 3GPP LTE, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 7) is used or not.

Third, different frequency bands and use cases impose different coverage limitations. For example, mmWave bands impose large propagation losses. Therefore, some form of coverage enhancement scheme is needed. Several candidates include beam sweeping (cf. FIG. 6), repetition, diversity, and/or multi-TRP transmission. For mMTC where transmission bandwidth is small, time-domain repetition is needed to ensure sufficient coverage.

Figure 7:
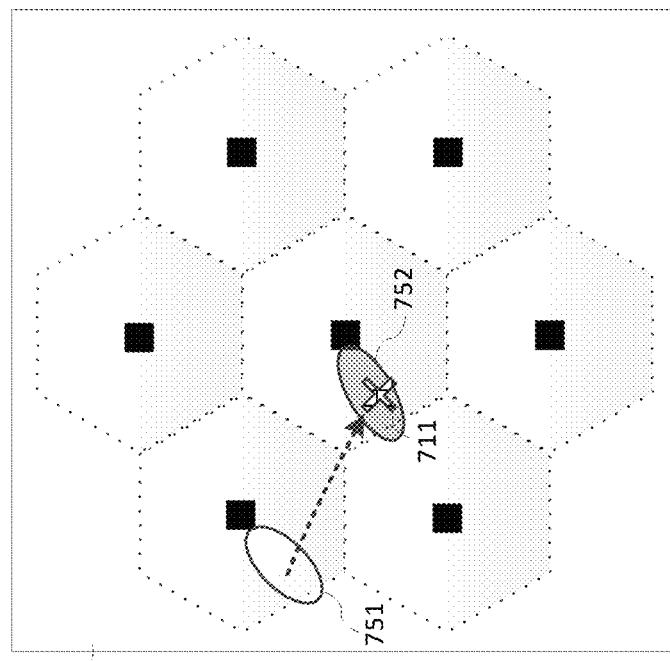
FIG. 7 illustrates exemplary embodiments of UE-centric access utilizing two levels of radio resource entity according to one embodiment of the present disclosure.
Figure 7:
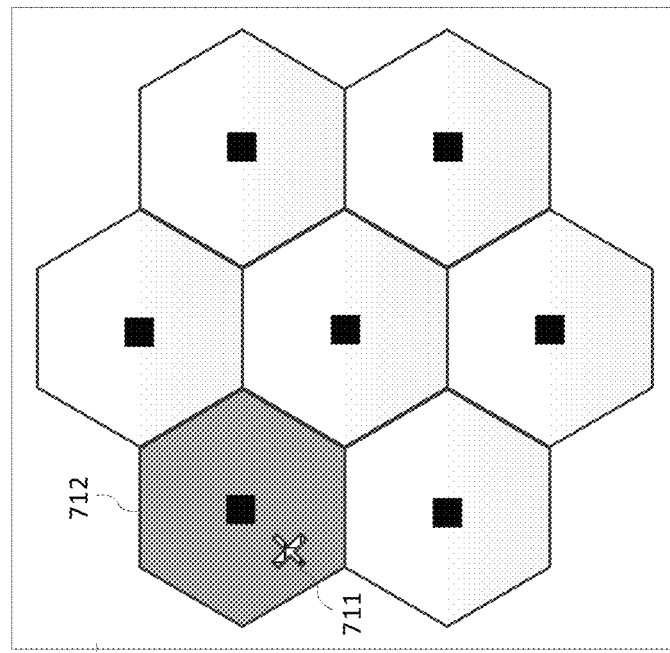

FIG. 7 illustrates exemplary embodiments 710, 750 of UE-centric access utilizing two levels of radio resource entity according to one embodiment of the present disclosure. The embodiments shown in FIG. 7 are for illustration only. Other embodiments could be used without departing from the scope of the present disclosure.

These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 6.

The first RR level (termed "cell") applies when a UE enters a network and therefore is engaged in an initial access procedure. In 710, a UE 811 is connected to cell 712 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 6, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, UE 711 can move within the network without observing cell boundaries as illustrated in embodiment 750. That is, UE mobility is handled on beam level rather than cell level, where one cell can be associated with N beams (N can be 1 or >1). Unlike cell, however, beam is a physical layer entity. Therefore, UE mobility management is handled solely on physical layer.

An example of UE mobility scenario based on the second level RR is given in embodiment 750. After UE 711 is associated with the serving cell 712, UE 711 is further associated with beam 751. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, UE 711 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to UE 711 for data and control transmission. When UE 711 moves to another cell, the boundary between the previous and the next cells is neither observed nor visible to UE 711. Instead of cell handover, UE 711 switches from beam 751 to beam 752. Such a seamless mobility is facilitated by the report from UE 711 to the network or associated TRP—especially when UE 711 reports a set of M>1 preferred beam identities by acquiring and measuring M beam (or RR) acquisition signals.

Figure 8:
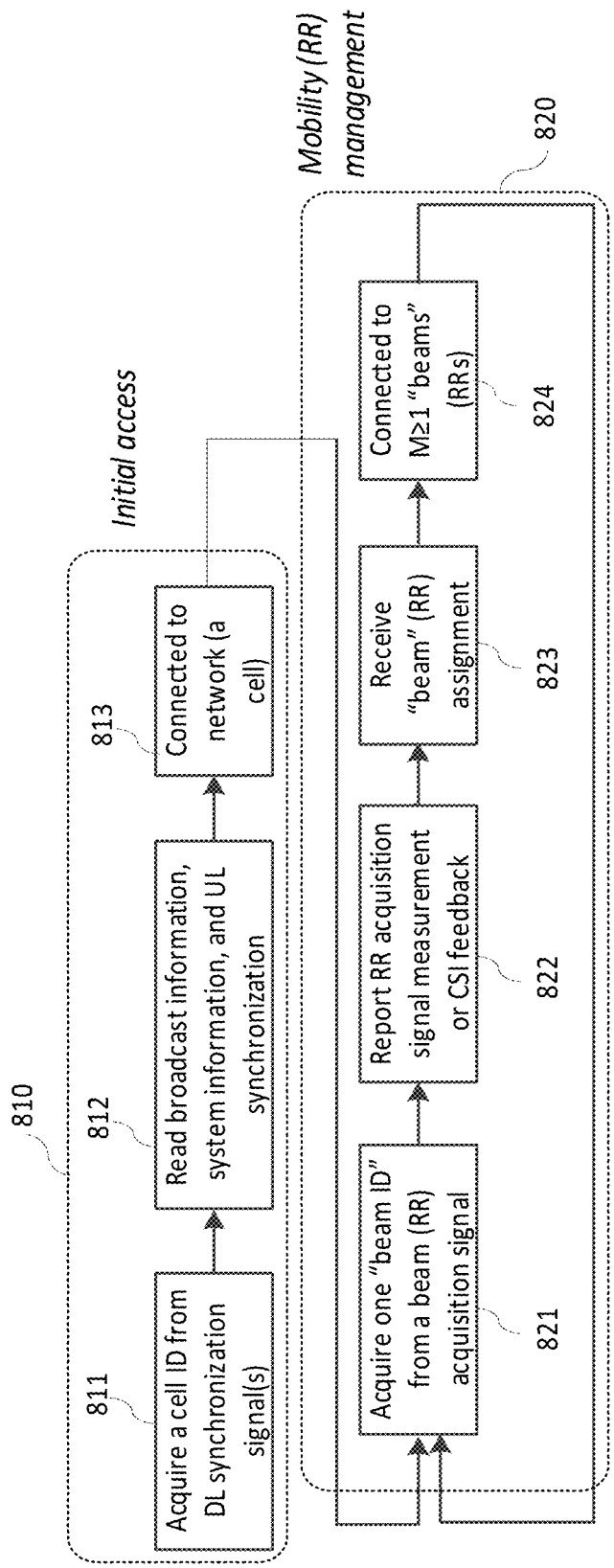
FIG. 8 illustrates an exemplary initial access procedure the aforementioned mobility or radio resource management from the perspective of a UE according to one embodiment of the present disclosure.

FIG. 8 illustrates an exemplary initial access procedure the aforementioned mobility or radio resource management from the perspective of a UE according to one embodiment of the present disclosure. The embodiment shown in FIG. 8 is for illustration only. Other embodiments could be used without departing from the scope of the present disclosure The initial access procedure 810 includes cell ID acquisition from DL synchronization signal(s) 811 as well as retrieval of broadcast information (along with system information required by the UE to establish DL and UL connections) followed by UL synchronization (which can include random access procedure) 812. Once the UE completes 811 and 812, the UE is connected to the network and associated with a cell. Following the completion of initial access procedure, the UE, possibly mobile, is in an RRM state described in 820. This state includes, first, an acquisition stage 821 where the UE can periodically (repeatedly) attempt to acquire a "beam" or RR ID from a "beam" or RR acquisition signal (such as a measurement RS). The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE. In this case, the UE can be configured with a set of K>1 CSI-RS resources to monitor. Several options are possible for measurement report 822. First, the UE can measure each of the K CSI-RS resources, calculate a corresponding RS power (similar to RSRP or RSRQ in LTE), and report it to the TRP (or network). Second, the UE can measure each of the K CSI-RS resources, calculate an associated CSI (which can include CQI and potentially other CSI parameters such as RI and PMI), and report it to the TRP (or network). Based on the report from the UE, the UE is assigned M≥1 "beams" or RRs either via a higher-layer (RRC) signaling or an L1/L2 control signaling (823). Therefore, the UE is connected to these M "beams"/RRs.

For certain scenarios such as asynchronous networks, the UE can fall back to cell ID based or cell-level mobility management similar to 3GPP LTE. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (termed the Master Information Block or MIB).

In the present disclosure, numerology refers to a set of signal parameters which can include subframe duration, sub-carrier spacing, cyclic prefix length, transmission bandwidth, or any combination of these signal parameters.

For the LTE system, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of System Frame Number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group. Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the Master Block Information (MIB) which consists of DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-⅓ tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

Frame based equipment, or FBE, is a channel access mechanism wherein the transmit/receive structure has a periodic timing with a periodicity named the fixed frame period (FFP); and that the initiating device shall perform listen-before-talk (LBT) during an observation slot before starting transmissions on an operating channel at the start of a FFP. The FFP is within 1 ms to 10 ms, and the observation slot is at least 9 microseconds. If the LBT fails on an operating channel, the initiating device shall not transmit on that channel, except for short control signaling transmissions providing it complies with certain requirements. The channel occupancy time (COT) associated with a successful LBT check for FBE operation shall be no greater than 95% of the FFP, and it shall be followed by an idle period until the start of next FFP such that the idle period is at least the max(5% of channel occupancy time, 100 microseconds).

Figure 9:
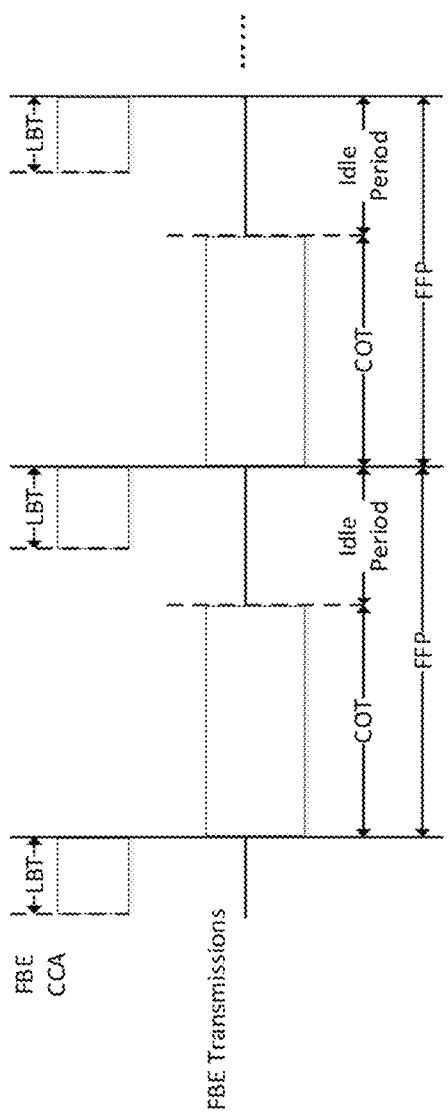
FIG. 9 illustrates an exemplary fixed frame period for FBE operations according to one embodiment of the present disclosure.

FIG. 9 illustrates an exemplary fixed frame period for FBE operations according to one embodiment of the present disclosure. The embodiment shown in FIG. 9 is for illustration only. Other embodiments could be used without departing from the scope of the present disclosure In the rest of this disclosure, an observation slot refers to the duration for an FBE device to perform LBT, while an NR-U slot refers to a slot of 14 OFDM symbols of the NR-U system.

Besides the load-based equipment (LBE) operation mode, NR unlicensed (NR-U) can also support the above FBE operation mode for various application scenarios. Examples can include a single NR-U operator exists in the operating channel(s) and other Wi-Fi network can be precluded (e.g., by deployment); and two or more NR-U operators coexist in the operating channel(s), potentially with coordination among the operators; and one or more NR-U operator coexist with an FBE operation based Wi-Fi network; etc. Compared to the LBE operation mode, the FBE operation mode can potentially have higher spectrum utilization under such scenarios, given the much simpler LBT process in FBE operation than the ones in LBE operation.

This disclosure is focused on the design aspects of NR-U to support the FBE operation mode, and enhancements over the baseline FBE operations to support more efficient channel access and transmissions for FBE operation based NR-U.

This disclosure includes several embodiments, principles, and examples that can be used in conjunction or in combination with one another or can operate as standalone.

In the rest of this disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

Embodiment 1. Principles on Supporting FBE Operation Mode for NR-U

The Embodiment 1 provides principles on supporting FBE operation mode for NR-U.

In a first principle of the Embodiment 1, an FBE operation mode can be supported for NR-U subject to the regulation in the unlicensed/shared band of NR-U.

In one example of the first principle, an FBE operation mode can be supported for NR-U operating on the 5 GHz unlicensed band, wherein the unlicensed regulation already supports the FBE operation.

In another example of the first principle, an FBE operation mode can be supported for FR1 NR-U operating on the 6 GHz unlicensed/shared band.

In another example of the first principle, an FBE operation mode can be supported for FR1 NR-U operating on the unlicensed/shared bands other than 5 GHz or 6 GHz bands.

In yet another example of the first principle, an FBE operation mode can be supported for FR2 NR-U. In one sub-example, the FR2 NR-U can operate in the 60 GHz unlicensed bands.

In yet another example of the first principle, for FBE NR-U, the initiating device can be the gNB, and the responding device is the UE.

In yet another example of the first principle, for FBE NR-U, the initiating device can be the UE, and the responding device is the gNB.

In a second principle of the Embodiment 1, an FBE operation mode can be supported for a carrier, if the absence of any other technology (such as Wi-Fi) sharing the carrier can be guaranteed on a long term basis (such as by deployment), and only the NR-U operator(s) or other nodes coordinating the NR-U operators supporting the FBE operations mode coexist in the carrier.

In a third principle of the Embodiment 1, an FBE operation mode can be supported for a carrier, based on the NR-U operator's configuration, such as the carrier can be configured by the NR-U operator to switch between FBE operation mode and LBE operation mode dynamically.

In a first example of this principle, the switching between FBE operation mode and LBE operation mode can be based on the channel access success ratio for a certain observation duration T1, wherein the channel access success ratio can be evaluated on at least one of a per-gNB basis, per-NR-U operator basis, or across the NR-U operators with coordination among the NR-U operators. For instance, FBE operation mode can be supported by default, and when the channel access success ratio over T1 is below some threshold τ1 (e.g. 5%), the NR-U operator can determine to switch to the LBE operation mode. This can happen when there is a random jammer in the operating channel, or when a nearby LBE-based network (e.g., LAA, Wi-Fi) is activated. Furthermore, NR-U can switch back to FBE operation mode from the LBE operation mode, such as after LBE mode is used for a certain duration T2; or the channel access success ratio over another certain duration T3 is above some threshold τ2; or a nearby LBE-based network (e.g., LAA, Wi-Fi) is de-activated.

In another example of this principle, the switching between FBE operation mode and LBE operation mode can be based on detecting the existence of an LBE-based network (e.g., LAA, Wi-Fi) in the operating channel. For instance, the FBE operation mode can be used when an LBE-based network is detected to be not present in the operating channel, and the LBE operation mode can be used when an LBE-based network is detected to be present in the operating channel.

Embodiment 2. Configuration of FBE Operation Mode

This Embodiment 2 provides the configuration of FBE operation mode, when an FBE operation mode is supported by NR-U.

In a first approach of the Embodiment 2, a fixed frame period (FFP) can be configurable, when an FBE operation mode is supported.

In a first example of the first approach of the Embodiment 2, for FR-1 FBE NR-U, the FFP can be configured to a value between 1 millisecond (ms) and 10 ms. In a first sub-example, the FFP can be configured from a set of predefined values in the unit of 1 ms. For instance, the set of supported FFPs can be {1, 2, 3, 4, 5, 6, 7, 8, 9, 10} ms using 4 bits. In a second sub-example, the FFP can be configured from a set of predefined values in the unit of 1 NR-U slot. For instance, the set of supported FFPs can be {1, 2, 3, 4, 5, 6, 7, 8, 9, 10, 11, 12, 13, 14, 15, 16} NR-U slots using 4 bits, wherein the subcarrier spacing (SCS) associated to the slot can be determined from other system parameters. In a third sub-example, the FFP can be configured from a set of predetermined values in the unit of 1 NR-U symbol. In a fourth sub-example, the value of FFP can be configured through a higher layer parameter. For instance, the FFP value can be configured by RRC layer through an RRC layer parameter. In a fifth sub-example, the value of FFP can be configured and indicated to the UE through downlink control information (DCI), which can indicate the chosen FFP value from the set of predefined FFP values.

In a second approach of the Embodiment 2, when an FBE operation mode is supported, a channel occupancy time (COT) can be configurable or determined from configurations for other related system information.

In a first example of the second approach of the Embodiment 2, a maximum COT (MCOT) value can be configured as the percentage $\eta$ of the FFP, wherein $0\% \leq \eta \leq 95\%$ for example. In a first sub-example, the percentage $\eta$ can be fixed in the specification. In a second sub-example, a set of values of the percentage $\eta$ can be supported, wherein the chosen value of the percentage $\eta$ can be configured by higher layer parameter or DCI. For instance, the set of supported percentage $\eta$ can be {0, 5, 10, 15, . . . , 95}%. In another instance, the value of $\eta$ can be adjusted according to the load of the current cell, such that a smaller $\eta$ can be configured for a lightly-loaded cell for power-saving purpose.

In a second example of the second approach of the Embodiment 2, a MCOT value can be fixed in the specification and determined as the maximum duration allowed by regulation, subject to: (1) COT is at most 95% of the FFP; and (2) the idle period is at least 5% of COT with minimum of 100 microseconds.

In a third example of the second approach of the Embodiment 2, a MCOT value can be configured from a set of predefined values, wherein the time unit of the value can be chosen from one or multiple of {1 ms, 1 NR-U slot, 1 NR-U mini-slot, 1 NR-U OFDM symbol}. In one sub-example, the NR-U mini-slot can be of 2, 4 or 7 symbols as in NR Rel-15. In another sub-example, the NR-U mini-slot can be of any number of symbols less than 14 symbols. This sub-example of min-slot can be applied to the rest of this disclosure when referring to the mini-slot. In another sub-example, the MCOT can be allocated as 21 NR-U slots with 30 kHz SCS. In another sub-example, the MCOT can be allocated as 9 NR-U slots plus 1 NR-U mini-slot of 7 symbols with 15 kHz SCS. In another sub-example, the MCOT value can be configured through a higher layer parameter or DCI.

In a fourth example of the second approach of the Embodiment 2, for the first example to the third example of the second approach of the Embodiment 2, when the ending position of the configured NR-U FBE MCOT is aligned with the NR-U slot boundary, the actual COT for FBE NR-U will be the same as the configured MCOT.

In a fifth example of the second approach of the Embodiment 2, when the ending position of the configured NR-U FBE MCOT is not aligned with the NR-U slot boundary.

Figure 10:
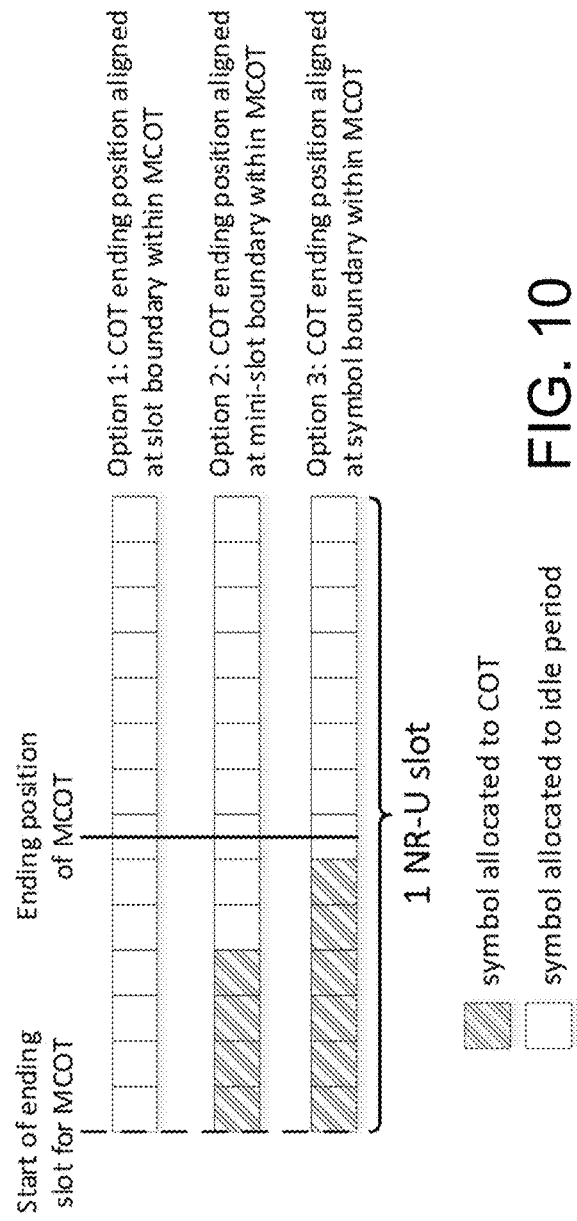
FIG. 10 illustrates exemplary three options for the cases when an ending position of the configured NR-U FBE maximum COT (MCOT) is not aligned with the NR-U slot boundary according to one embodiment of the present disclosure.

FIG. 10 illustrates exemplary three options for the cases when an ending position of the configured NR-U FBE MCOT is not aligned with the NR-U slot boundary according to embodiments of the present disclosure. The embodiments shown in FIG. 10 are for illustration only. Other embodiments could be used without departing from the scope of the present disclosure In a first option of the fifth example of the second approach of the Embodiment 2, the entire NR-U slot that contains the ending position of the configured NR-U FBE MCOT can be allocated to the IDLE period, and the actual COT will include the NR-U slots that comes before this slot within the current FFP.

In a second option of the fifth example of the second approach of the Embodiment 2, the ending position of the FBE NR-U COT can be allocated in the granularity of NR-U mini-slot(s), such that the ending position of FBE NR-U COT can be aligned at NR-U mini-slot boundary with the configured MCOT. For instance, one NR-U mini-slot can be consisted of 2, 4, or 7 OFDM symbols. In another instance, the ending position of the FBE COT can be aligned at OFDM symbol position that can be constructed by combination of one or multiple mini-slots.

In a third option of the fifth example of the second approach of the Embodiment 2, the ending position of the FBE COT can be allocated in the granularity of OFDM symbol, such that the ending position of FBE COT can be aligned at NR-U symbol boundary within the configured MCOT. As a result, the actual COT may be smaller than the configured MCOT.

In a sixth example of the second approach of the Embodiment 2, based on the configured fixed frame period and channel occupancy time, the idle period can be determined accordingly as fixed frame period—actual channel occupancy time.

In a seventh example of the second approach of the Embodiment 2, the idle period duration can be configurable and adjusted through higher layer parameter or DCI. Based on the idle period duration and the FFP duration, the corresponding MCOT duration can be inferred.

In a third approach of the Embodiment 2, the fixed frame period (FFP) for FBE NR-U can be dynamically adjusted within an allowed value range.

In a first example of the third example of the Embodiment 2, the adjustment of FFP can be based on the average channel access probability (CAP) over certain period T, wherein the period T can be at least 200 ms. For instance, if the CAP within T is greater than or equal to certain threshold $\tau 3$, the FFP can be increased, e.g., to the next available value or by a fixed amount; while if the CAP within T is smaller than certain threshold $\tau 4$, the FFP can be can be decreased, e.g., to the next available value or by a fixed amount. In addition, the CAP can be computed as the success rate of the single-shot LBT by NR-U gNB(s) before the transmission at each FFP; or the CAP can be computed as the success rate of all LBTs that happened within the period T, e.g., also include the LBT operations for DL/UL switching within the FFP.

In a second example of the third approach of the Embodiment 2, the FFP duration can be adjusted through higher layer parameter or DCI.

In a third example of the third approach of this approach, the FFP duration can be adjusted such that coexisting FBE NR-U initiating devices/operators can have the same FFP duration.

In a fourth approach of the Embodiment 2, the starting timing position of FFP for FBE NR-U can be adjusted.

In a first example of the fourth approach of the Embodiment 2, the starting timing position of each FFP for an FBE NR-U operator can be adjusted, such that all FBE NR-U device belonging to the same NR-U operator can be adjusted (e.g., advanced or postponed) by a same fixed time duration. For instance, this can be applied for two synched NR-U operators to align their respective starting timing positions of the FFP.

In a second example of the fourth approach of the Embodiment 2, the starting timing position of FFP for each FBE device of an FBE NR-U operator can be adjusted (e.g., advanced or postponed) by a specific time duration. For instance, this can be applied for a synched NR-U operator to align the starting timing positions of the FFP for each gNB within the operator.

In a third example of the fourth approach of the Embodiment 2, the time unit for adjusting the FFP starting position can be an integer multiple of $T_c$, wherein $T_c$ is the time unit for Rel-15 NR with $T_c=1/(480 \text{ kHz}*4096)$. For instance, the granularity can be $T_c$, or an NR-U OFDM symbol duration.

In a fourth example of the fourth approach of the Embodiment 2, the time unit for adjusting the FFP starting position can be millisecond or microsecond.

In a fifth example of the fourth approach of the Embodiment 2, the value of the time unit for adjusting the FFP can be configured and indicated through the higher layer parameter or DCI.

In a fifth approach of the Embodiment 2, the starting timing position of FFP for FBE NR-U can be aligned with the frame structure of the NR-U with a granularity of NR-U slot/mini-slot/symbol level.

In a first example of the fifth approach of the Embodiment 2, the starting position of each fixed frame period of the FBE NR-U can be aligned with the start of an NR-U slot. In one sub-example, the FFP duration also needs to be in integer multiples of the NR-U slot.

In a second example of the fifth approach of the Embodiment 2, the starting position of each fixed frame period of the FBE NR-U can be aligned with the start of an NR-U mini-slot or an NR-U symbol.

In one sub-example, the FFP duration also needs to be an integer multiple of the NR-U symbol. In another sub-example, the FFP can starts in the middle of an NR-U slot.

Embodiment 3. Channel Access Scheme for FBE NR-U

The Embodiment 3 provides the channel access scheme for FBE operation of NR-U.

In a first approach of the Embodiment 3, FBE NR-U can utilize the baseline FBE channel access scheme for determining whether the initiating device can obtain channel access in the next FFP, wherein the initiating device performs LBT with energy detection only, immediately before starting transmission on an operating channel at the start of a FFP, for the duration of a single observation slot, and the initiating device can start transmission within COT of the next FFP if it passes the LBT.

In a first example of the first approach of the Embodiment 3, the observation slot duration is at least 9 microseconds for 5 GHz unlicensed spectrum. The same observation slot duration constraint can be used for FR1 FBE NR-U.

In a second example of the first approach of the Embodiment 3, the FBE NR-U device can have multiple transmissions within the COT without performing an additional CCA on the operating channel is the gap between such transmissions does not exceed certain duration T. In one sub-example, for FR1 FBE NR-U, the duration can be 16 µs.

In a third example of the first approach of the Embodiment 3, if gap between two transmissions of an FBE NR-U device within the COT exceeds certain duration τ, the FBE NR-U device may continue transmission provided that an additional CCA within the gap and within the observation slot immediately before transmission has passed.

In a fourth example of the first approach of the Embodiment 3, if the LBT to continue transmission fails at an observation slot, the FBE NR-U device can continue to perform such LBT attempt. In one sub-example, the FBE NR-U device can perform LBT to continue transmission as long as the transmission can start within the current COT. In another sub-example, the LBT attempt(s) can start after an interval τ1 with respect to the previously failed LBT attempt. For instance, τ1 can be a NR-U slot, a NR-U mini-slot, or an NR-U OFDM symbol duration. In another sub-example, the LBT attempt(s) can be performed such that the transmission can start at one of NR-U OFDM symbol, NR-U mini-slot, and NR-U slot boundary.

In a second approach of the Embodiment 3, in addition to the energy detection scheme, one potential enhancement for channel access efficiency is to introduce preamble detection type of channel access scheme.

In one example of the second approach of the Embodiment 3, the preamble for NR-U can be chosen from the synchronization signal/physical broadcast channel block (SS/PBCH block, or SSB), channel state information reference signal (CSI-RS), demodulation reference signal (DM-RS), or sounding reference signal (SRS) for uplink. In one sub-example, the DM-RS can be of a wideband DM-RS for the group common (GC) PDCCH.

In another example of the second approach of the Embodiment 3, the preamble for NR-U can be introducing a new type of sequence or message for NR-U, compared to Rel-15 NR.

In another example of the second approach of the Embodiment 3, with the preamble detection channel access scheme considers the operating channel is clear if the strongest preamble power received at the initiating device is less than the preamble detection threshold.

In yet another example of the second approach of the Embodiment 3, the preamble detection threshold can be proportional to the maximum transmit power and can be lower than the corresponding energy detection threshold. In one sub-example, if denote by PH (dBm) the maximum transmit power with 0 dBi receive antenna, the preamble detection threshold (PDT) can be: for PH<=13 dBm, PDT=−85 dBm/MHz; for 13 dBm<PH<23 dBm, PDT=−85 dBm/MHz+(23 dBm−PH); for PH>=23 dBm, PH=−85 dBm/MHz.

In another example of the second approach of the Embodiment 3, with preamble detection scheme being supported, one or multiple of the LBT modes can be supported to determine if the operating channel is busy: (1) LBT mode 1: energy detection only; (2) LBT mode 2: preamble detection only; (3) LBT mode 3: channel is reported as busy if the total energy is above the energy detection threshold OR the preamble power is above the preamble detection threshold; (4) LBT mode 4: channel is reported as busy if the total energy is above the energy detection threshold AND the preamble power is above the preamble detection threshold.

In another example of the second approach of the Embodiment 3, the preamble can be utilized to facilitate the handshake exchange between the initiating device and the responding device, wherein the preamble can be served as a channel access request (CARQ) message/sequence.

In another example of the second approach of the Embodiment 3, the preamble can carry certain useful information regarding system configuration. For instance, the useful information can be the channel access priority information of the initiating device. In another instance, the preamble can carry information such as the COT duration, and/or the FFP duration.

In another example of the second approach of the Embodiment 3, the NR-U preamble can carry information regarding the radio access technology (RAT), and/or the NR-U operator, and/or NR-U cell information. In one sub-example, with the RAT information, NR-U node detecting the NR-U preamble can determine the preamble is from NR-U instead of another RAT, such as Wi-Fi.

In another example of the second approach of the Embodiment 3, the preamble detection scheme detailed in the above examples can be extended to LBE-based channel access schemes as well.

In a third approach of the Embodiment 3, the LBT for FBE NR-U can be performed omni-directionally or quasi-omni-directionally.

In one example of this approach, omni-directional/quasi-omni-directional LBT can be performed during the observation slot before the FFP, and omni-directional/quasi-omni-directional or directional communications can be supported during the FFP if LBT is successful.

In a fourth approach of the Embodiment 3, directional LBT can be supported by FBE NR-Unlicensed or NR-U.

Figure 11:
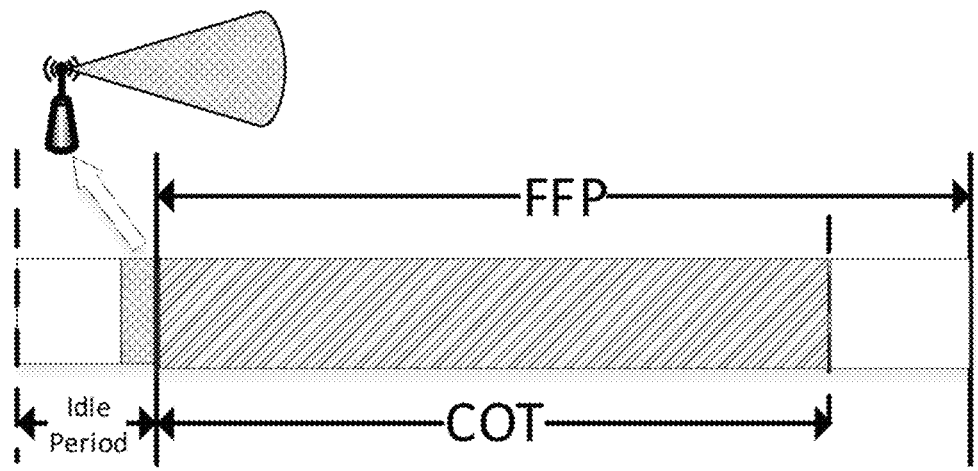
FIG. 11 illustrates an exemplary channel access scheme with one directional spatial TX parameter being used according to one embodiment of the present disclosure.

FIG. 11 illustrates an exemplary channel access scheme with one directional spatial TX parameter being used according to one embodiment of the present disclosure. The embodiment shown in FIG. 11 is for illustration only. Other embodiments could be used without departing from the scope of the present disclosure.

In a first example of fourth approach of the Embodiment 3, if only one directional spatial TX parameter is intended to be used by the initiating device during the FFP, the LBT can be performed over the spatial RX parameter that is aligned with the intended spatial TX parameter by the initiating device before the FFP.

In a second example of the fourth approach of the Embodiment 3, when multiple directional spatial TX parameters are intended to be used by the initiating device during the FFP, the initiating device can perform LBT over multiple spatial RX parameters that are aligned with the intended spatial TX parameters simultaneously at the observation slot, such that the availability of the spatial TX parameters can be determined at the same time. In one sub-example, spatial parameters that passed LBT at the observation slot can be utilized for transmission in the following COT within the FFP, and the initiating device can determine which spatial parameter(s) to utilize for transmission. For instance, even if direction LBT fails at a subset of the spatial parameters, the initiating device can still utilize the remaining spatial parameter(s) that have succeeded in LBT for transmission in the FFP.

Figure 12:
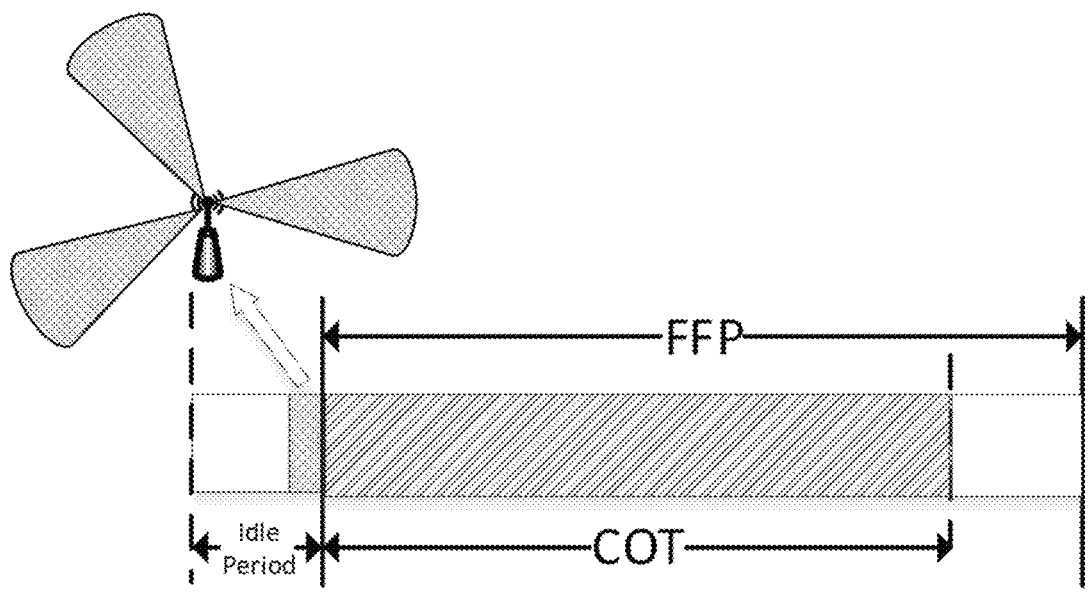
FIG. 12 illustrates another exemplary channel access scheme utilizing multiple directional spatial TX parameters according to one embodiment of the present disclosure.

FIG. 12 illustrates an exemplary channel access scheme utilizing hybrid beamforming or digital beamforming according to one embodiment of the present disclosure. The embodiment shown in FIG. 12 is for illustration only. Other embodiments could be used without departing from the scope of the present disclosure When multiple directional spatial TX parameters are intended to be used by the initiating device during the FFP, the initiating device can perform an LBT over multiple spatial RX parameters that are aligned with the intended spatial TX parameters simultaneously at the observation slot, such that the availability of the spatial TX parameters can be determined at the same time. This sub-example of a second example of the fourth approach of the Embodiment 3 can be applied when hybrid beamforming or digital beamforming is supported by the initiating device.

In a third example of the fourth approach of the Embodiment 3, when multiple directional spatial TX parameters are intended to be used by the initiating device during the FFP, the initiating device can perform LBTs over multiple spatial RX parameters that are aligned with the intended spatial TX parameters over multiple time units.

In one sub-example of the third example of the fourth approach of the Embodiment 3, the time unit can be one or multiple observation slots, and the multiple time units can be consecutive or nonconsecutive in time domain. For instance, the time unit can be one observation slot, and the multiple time units can be consecutive in time-domain and are located at the end of the IDLE period. In another sub-example, this option can be used to when hybrid beamforming is not supported; or when hybrid beamforming is supported but the number of RF chains is smaller than the number of intended spatial parameters. In another sub-example, if full-duplex is supported, the initiating device can perform LBT in a time unit while transmitting in spatial TX parameters that passed LBT in previous time units. In another sub-example, the multiple time units can be within the IDLE period that comes before the FFP. In another sub-example, a subset of the multiple units can be within the IDLE period, while the remaining time units are within the next FFP.

FIG. 12 illustrates another exemplary channel access scheme utilizing multiple directional spatial TX parameters according to one embodiment of the present disclosure. The embodiment shown in FIG. 12 is for illustration only. Other embodiments could be used without departing from the scope of the present disclosure.

As illustrated in FIG. 12, when multiple directional spatial TX parameters are intended to be used by the initiating device during the FFP, the initiating device can perform LBTs over multiple spatial RX parameters that are aligned with the intended spatial TX parameters over multiple time units.

Figure 13:
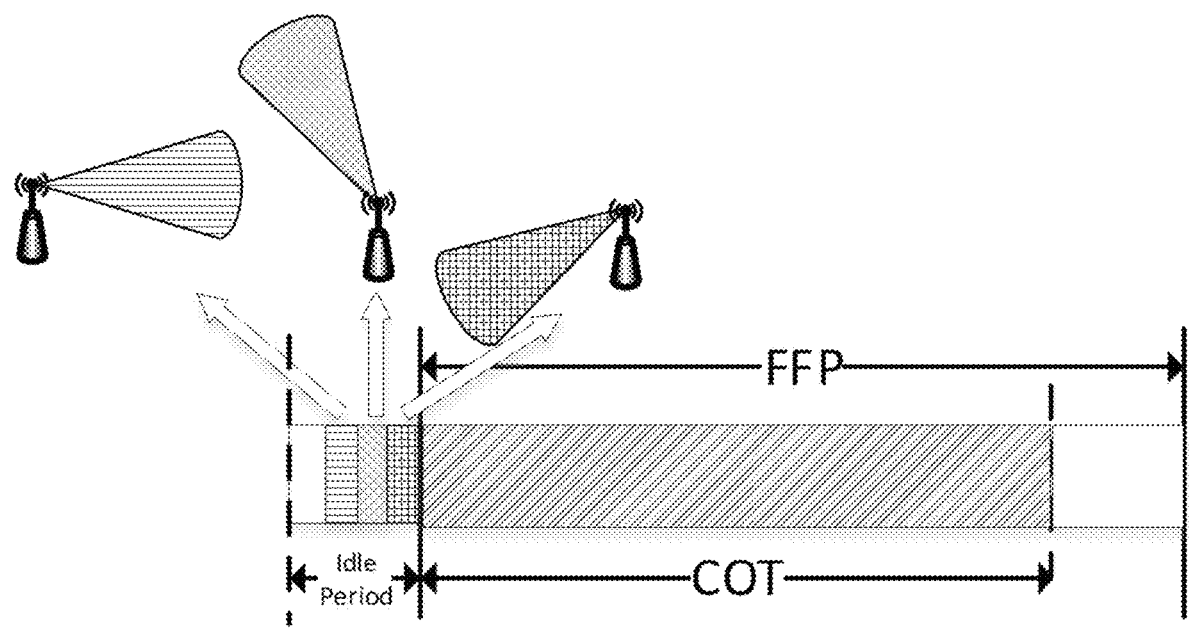
FIG. 13 illustrates another exemplary channel access scheme utilizing multiple directional spatial TX parameters according to one embodiment of the present disclosure.

FIG. 13 illustrates another exemplary channel access scheme utilizing multiple directional spatial TX parameters according to one embodiment of the present disclosure. The embodiment shown in FIG. 13 is for illustration only. Other embodiments could be used without departing from the scope of the present disclosure.

In another sub-example of the third example of the fourth approach of the Embodiment 3, spatial parameters that passed the LBT at its respective observation slot can be utilized for transmission in the following COT within the next FFP, and the initiating device can determine which spatial parameter(s) to utilize for transmission. For instance, even if direction LBT fails at a subset of the spatial parameters, the initiating device can still utilize the remaining spatial parameter(s) that have succeeded in LBT for transmission in the FFP.

In a fourth example of the fourth approach of the Embodiment 3, a hybrid approach of omni-directional/quasi-omni-directional LBT and directional LBT can be used by FBE NR-U.

In one sub-example of the fourth example of the fourth approach of the Embodiment 3, the initiating device can first perform omni-directional/quasi-omni-directional LBT during an observation slot before the FFP, and it can transmit in the next FFP, potentially over directional spatial TX parameters, if the omni-directional/quasi-omni-directional LBT passes. In another sub-example, if the omni-directional/quasi-omni-directional LBT fails, the initiating device can further perform directional LBT following either the second or the third example of the fourth approach of the Embodiment 3.

Figure 14:
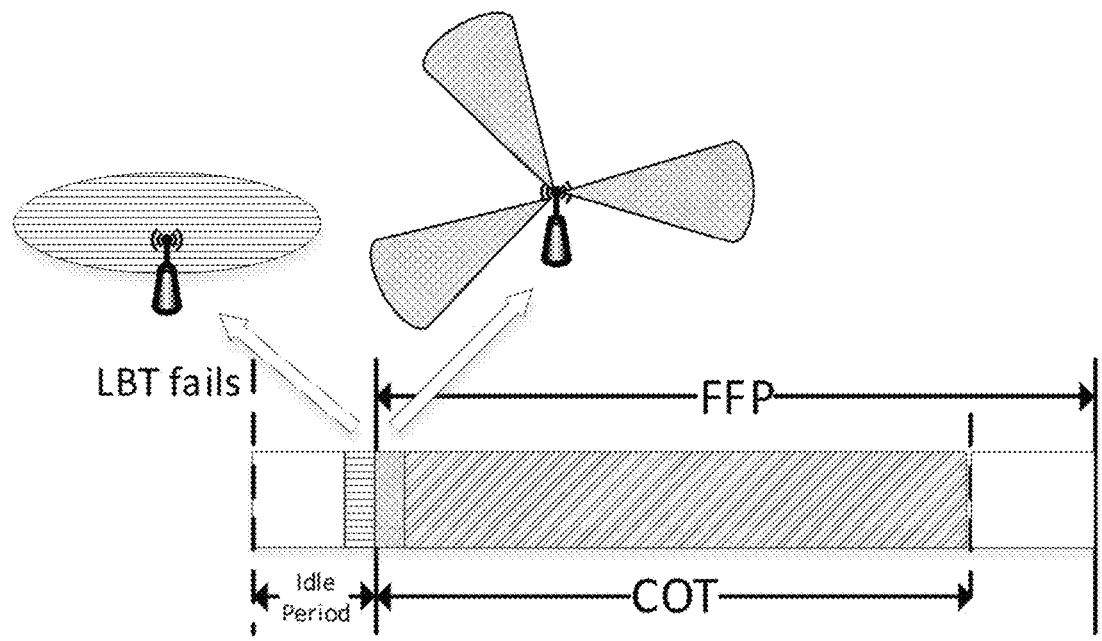
FIG. 14 illustrates another exemplary FBE channel access scheme utilizing a hybrid approach of an omni-directional/quasi-omni-directional LBT and a directional LBT according to one embodiment of the present disclosure.

FIG. 14 illustrates another exemplary FBE channel access scheme utilizing a hybrid approach of an omni-directional/quasi-omni-directional LBT and a directional LBT according to one embodiment of the present disclosure. The embodiment shown in FIG. 14 is for illustration only. Other embodiments could be used without departing from the scope of the present disclosure In another sub-example of the fourth example of the fourth approach of the Embodiment 3, if a directional LBT is used, the directional LBT can be performed within the idle period before the FFP, or during the start of the FFP.

For the baseline FBE channel access scheme in the first approach of the Embodiment 3, when one or multiple synchronized FBE NR-U operator(s) coexist in the operating channel, the initiating devices perform an LBT at the same observation slot and therefore can pass the LBT process. For such synchronized FBE NR-U network(s), strong interference may exist between neighboring gNBs during the COT, and the effects of hidden terminal issue may also be severe.

Figure 15:
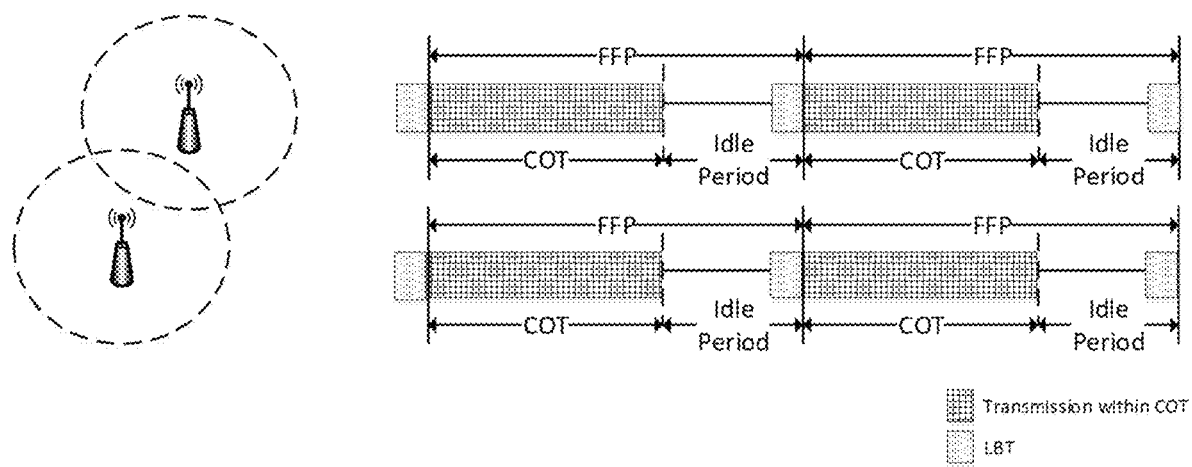
FIG. 15 illustrates an exemplary FBE channel access scheme with one or multiple synchronized FBE NR-U operators coexisting in the operating channel according to one embodiment of the present disclosure.

FIG. 15 illustrates an exemplary FBE channel access scheme with one or multiple synchronized FBE NR-U operators coexisting in the operating channel according to one embodiment of the present disclosure. The embodiment shown in FIG. 15 is for illustration only. Other embodiments could be used without departing from the scope of the present disclosure.

When one or multiple synchronized FBE NR-U operator(s) coexist in the operating channel, the two nearby gNBs can always pass their respective LBT processes since the LBT is performed at the same time, but the following transmissions may collide at each other.

In addition, for asynchronous FBE NR-U, the initiating device performed at its observation slot may always be blocked by the transmission from a nearby asynchronous initiating device.

In a fifth approach of the Embodiment 3, an enhancement to FBE NR-U channel access scheme is to introduce a set of N observation slots (N>=1), such that the LBT process for FBE initiating device can be performed at one or multiple observation slot(s) from the available set of observation slots.

In a first example of fifth approach of the Embodiment 3, the set of N observation slots can be consecutive in time domain, or non-consecutive in time domain to each other. In one sub-example, for non-consecutive observation slots, the gap between neighboring observation slots can be smaller than an observation slot length (e.g., 9 microseconds).

In a second example of fifth approach of the Embodiment 3, the number of observation-slots N can scale with the duration of the fixed frame period. In one sub-example, the number of allocated observation slots can be non-decreasing as the fixed frame period increases.

In a third example of fifth approach of the Embodiment 3, each FBE initiating device can be assigned one or multiple observation slot(s), according to some pre-defined rule. In one sub-example, this rule can be randomly and uniformly selecting one or multiple observation slot(s) among all the N observation slots, such as for fairness in terms of channel access. In another sub-example, this rule can be randomly and uniformly selecting one or multiple observation slot(s) within a subset of the N observation slots, such as for tiered access to the channel across different NR-U operators, wherein the observation slots of the subset assigned to one operator can always come before the subset assigned to other operator(s). In another sub-example, this rule can be selecting multiple neighboring observation slots among all the N observation slots, such as to perform LBT over different spatial RX parameters at different assigned observation slot. In yet another sub-example, this rule can be selecting multiple observation slots (potentially non-consecutive), wherein the number of assigned observation slots scales with the access priority of the initiating device to the operating channel.

For fifth approach of the Embodiment 3, when a set of observation slots are assigned, one or multiple of the following examples can be adopted to determine if the LBT is successful for the initiating device.

Figure 16:
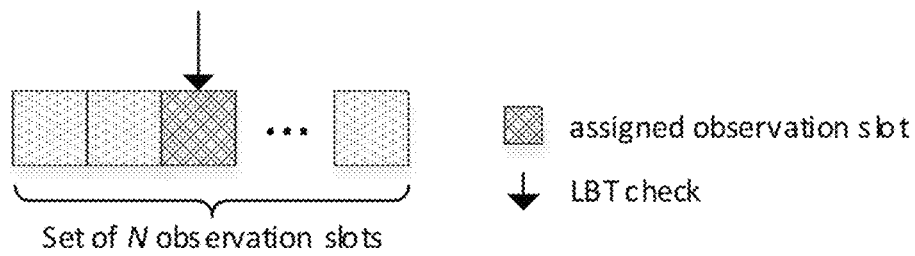
FIG. 16 illustrates an exemplary FBE channel access scheme with a set of observation slots according to one embodiment of the present disclosure.

FIG. 16 illustrates an exemplary FBE channel access scheme with a set of observation slots according to one embodiment of the present disclosure. The embodiment shown in FIG. 16 is for illustration only. Other embodiments could be used without departing from the scope of the present disclosure.

In a fourth example of the fifth approach of the Embodiment 3, if one observation slot is assigned to the initiating device, the LBT is successful for the initiating device of FBE NR-U if the LBT at the assigned observation slot is successful.

Figure 17:
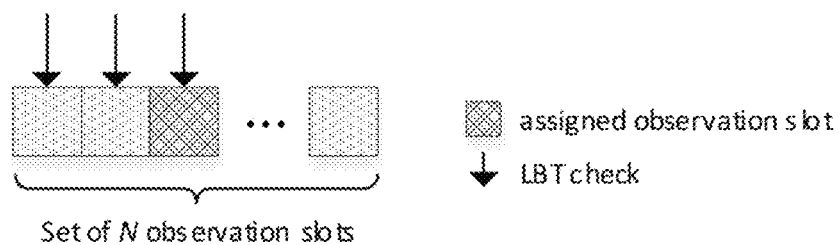
FIG. 17 provides an exemplary FBE channel access scheme with a set of observation slots according to one embodiment of the present disclosure.

FIG. 17 provides an exemplary FBE channel access scheme with a set of observation slots according to one embodiment of the present disclosure. The embodiment shown in FIG. 17 is for illustration only. Other embodiments could be used without departing from the scope of the present disclosure In a fifth example of the fifth approach of the Embodiment 3, if one observation slot is assigned to the initiating device, the LBT is successful for the initiating device of FBE NR-U if the LBT processes performed at the assigned observation slot, as well as the observation slot(s) that come before the assigned observation slot are successful.

Figure 18:
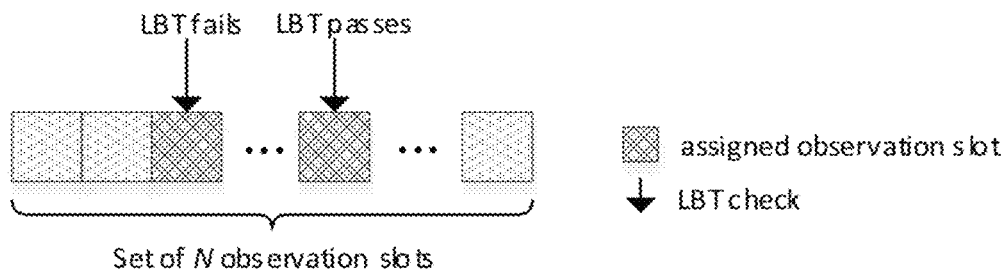
FIG. 18 illustrates another exemplary FBE channel access scheme with a set of observation slots according to one embodiment of the present disclosure.

FIG. 18 illustrates another exemplary FBE channel access scheme with a set of observation slots, wherein an LBT is successful as (at least) one LBT at an assigned observation slot passes the LBT process, according to one embodiment of the present disclosure. The embodiment shown in FIG. 18 is for illustration only. Other embodiments could be used without departing from the scope of the present disclosure.

In a sixth example of the fifth approach of the Embodiment 3, if multiple observation slots are assigned to the initiating device, LBT can be considered as successful if LBT on any one of the assigned observation slots are successful. In one sub-example, if the initiating device performs LBT using different spatial parameter at different assigned observation slot, then the device can utilize the spatial parameter(s) that corresponds to the assigned observation slot(s) that passed LBT during the COT.

Figure 19:
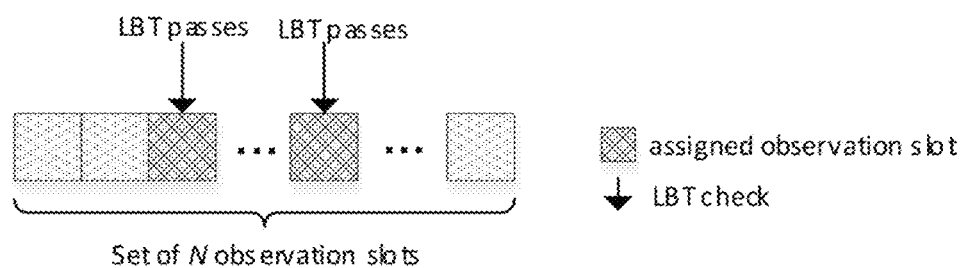
FIG. 19 illustrates another exemplary FBE channel access scheme with a set of observation slots according to one embodiment of the present disclosure.

FIG. 19 illustrates another exemplary FBE channel access scheme with a set of observation slots, wherein an LBT is successful as the LBTs at all the assigned observation slots have passed, according to one embodiment of the present disclosure. The embodiment shown in FIG. 19 is for illustration only. Other embodiments could be used without departing from the scope of the present disclosure.

In a seventh example of the fifth approach of the Embodiment 3, if multiple observation slots are assigned to the initiating device, the LBT process can be considered as successful if LBTs on all of the assigned observation slot are successful. In one example, when two FBE NR-U operators coexist, gNBs of one operator 1 can be assigned more observation slots than gNBs of operator 2, such that operator 2 can have higher access priority to the operating channel than operator 1.

For the fifth approach of the Embodiment 3, if the LBT process is successful for the FBE initiating device on an assigned observation slot, the following examples are possible for the initiating device:

In an eighth example of the fifth approach of the Embodiment 3, the initiating device can start transmissions immediately after the assigned observation slot that passed an LBT. In one sub-example, the transmission can be reservation signal similar to the Licensed Assisted Access (LAA), such that the initiating device can reserve the channel until the end of the set of N observation slots. In another sub-example, the transmission can be the useful data addressed to the responding device(s), such as when the assigned slot is the last slot among the set of N observation slots.

In a ninth example of the fifth approach of the Embodiment 3, after the initiating device passes an LBT on an assigned slot, it can defer the transmission until certain time instance (i.e., not to transmit until the start of the time instance). In one sub-example, the time instance can be the start of next fixed frame period. In another sub-example, the time instance can be the end of the last assigned observation slot to the initiating device, when multiple observation slots are assigned. In another sub-example, the time instance can be in the middle of the set of N observation slots, such as the end of the subset of the observation slots that can be assigned to an FBE NR-U operator.

In a tenth example of the fifth approach of the Embodiment 3, the transmission by the initiating device after the LBT is successful on its assigned observation slot(s) can be an NR-U signal. In one sub-example, such NR-U signal can be the SS/PBCH block, CSI-RS, or DM-RS. In another sub-example, such NR-U signal can be an NR-U preamble as detailed in second approach of the Embodiment 3. In another sub-example the signal transmitted by the initiating device can be utilized for handshake between the initiating device and responding device, and/or preamble detection/energy detection by other initiating devices, and/or the COT detection by the responding device which will be detailed in the Embodiment 4 below.

In an eleventh example of the fifth approach of the Embodiment 3, the transmission by the initiating device after the LBT is successful on its assigned observation slot(s) can be FBE NR-U channel. In one sub-example, the transmission can be an FBE NR-U signal, such as the group-common (GC) PDCCH, and/or UE specific PDCCH, and/or the PDSCH.

For the fifth approach of the Embodiment 3, one of the following examples can be adopted regarding the timing relation between the positions of the multiple observation slots and the fixed frame period.

Figure 20:
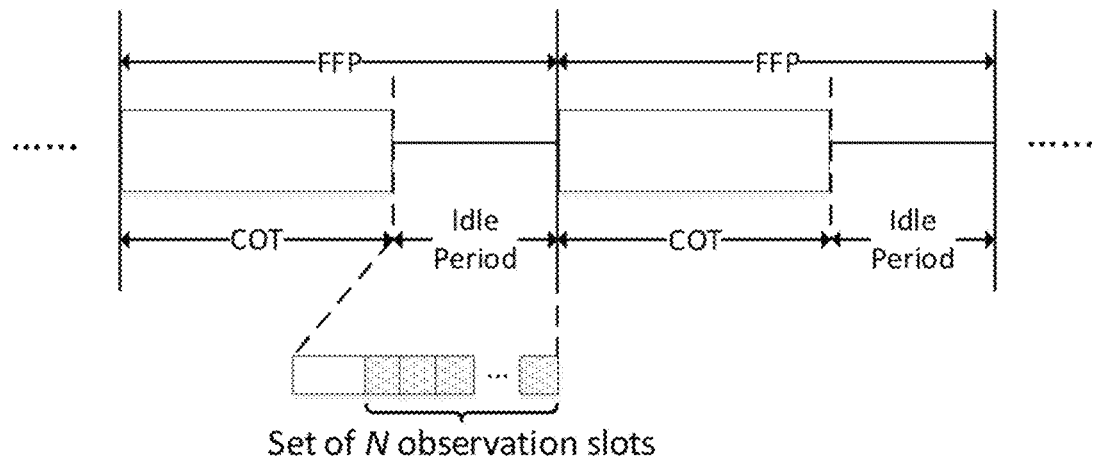
FIG. 20 provides an exemplary FFP with a set of observation slots according to one embodiment of the present disclosure.

FIG. 20 provides an exemplary fixed frame period with a set of observation slots according to one embodiment of the present disclosure. The embodiment shown in FIG. 20 is for illustration only. Other embodiments could be used without departing from the scope of the present disclosure.

In a twelfth example of the fifth approach of the Embodiment 3, the observation slots can all be contained within the IDLE period of the fixed frame period.

In a thirteenth example of the fifth approach of the Embodiment 3, a subset of the N observation slots can be contained within the idle period, and the remaining observation slots can be contained within the start of the next fixed frame period. In one sub-example, this example can be applied to when transmission in idle period is not permitted, e.g., by unlicensed regulation.

Figure 21:
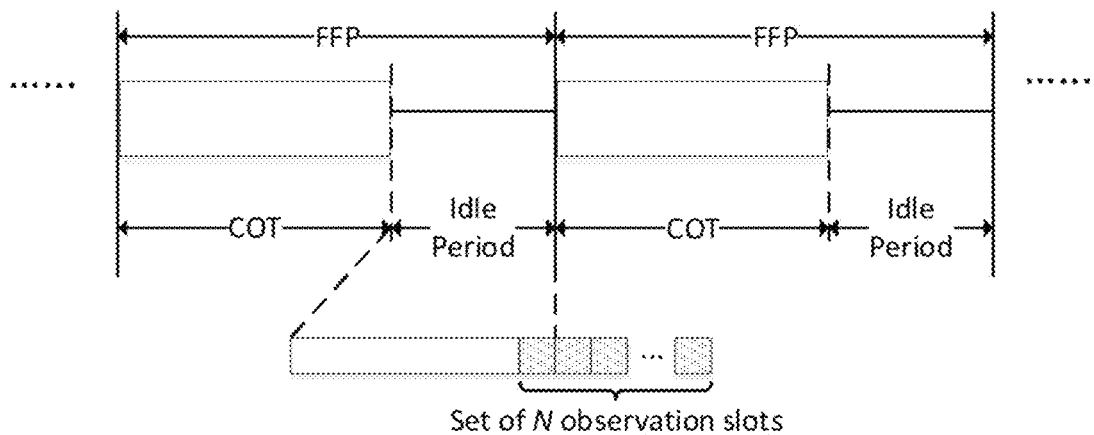
FIG. 21 provides an exemplary FFP with one portion of the observation slots being located in an idle period and the other portion of the observation slots being located in inside the next fixed frame period according to one embodiment of the present disclosure.

FIG. 21 provides an exemplary fixed frame period with one portion of the observation slots being located in an idle period and the other portion of the observation slots being located inside the next fixed frame period according to one embodiment of the present disclosure. The embodiment shown in FIG. 21 is for illustration only. Other embodiments could be used without departing from the scope of the present disclosure In another sub-example, the first observation slot can be at the end of the idle period and before the start of next fixed frame period, while the remaining N–1 observation slots are inside the next fixed frame period. In this case, the transmissions at the observation slots by the initiating device(s), which passed LBT in earlier observation slot(s), can meet the unlicensed regulation. Furthermore, such initiating device(s) can also transmit preamble signal/sequence for preamble detection/energy detection by other initiating devices.

In a sixth approach of the Embodiment 3, FBE NR-U can support simultaneously transmissions in adjacent or non-adjacent operating channels wherein the FBE device passes LBT, such that each FBE initiating device may use any combination/grouping of 20 MHz operating channels out of the supported channels.

In a first example of the sixth approach of the Embodiment 3, FBE NR-U can also support this baseline option for sub-band operation, such that each gNB can utilize any sub-band within the system bandwidth that passes the LBT. In one sub-example, each sub-band can be one or multiple of 20 MHz, or the corresponding number of resource blocks (RBs) that is close to one or multiple of 20 MHz.

In a second example of the sixth approach of the Embodiment 3, FBE NR-U can also support this baseline approach for multi-bandwidth part (BWP) operation, such that each gNB can utilize any BWP (within the system bandwidth) that passes the LBT. In one sub-example, each BWP can be of one or multiple of 20 MHz, or the corresponding number of resource blocks (RBs) that is close to one or multiple of 20 MHz.

In a third example of the sixth approach of the Embodiment 3, when N observation slots are utilized to improve channel access efficiency on each operating channel or BWP, the sub-band or multi-BWP channel access scheme can follow one of the following two options. In a first option, the same set of observation slots can be assigned across different sub-bands/BWPs for an initiating device, and that the sub-band/BWP that passes LBT can be utilized to transmit. In a second option, different set of observation slots can be assigned across different sub-bands/BWPs for an initiating device.

In one sub-example of the third example of the sixth approach of the Embodiment 3, transmission across different sub-bands/BWPs can be aligned after the last assigned observation slot across all sub-bands/BWPs is complete. In another sub-example, transmission across different sub-bands/BWPs can be aligned till the end of the N observation slots. In another sub-example, if full-duplex is supported, operation at each sub-band/BWP can be independent; such that gNB can perform LBT on certain sub-band/BWP and transmit on other sub-band(s)/BWP(s) that passed LBT.

In a seventh approach of the Embodiment 3, FBE NR-U UE needs to monitor for PDCCH within the fixed frame period, and one or multiple of the following examples can be adopted.

In a first example of the seventh approach of the Embodiment 3, for FBE NR-U, UE can monitor for PDCCH on an NR-U slot level within the COT of the fixed frame period, similar to NR-U within COT or as in licensed NR.

In a second example of the seventh approach of the Embodiment 3, for FBE NR-U, UE can monitor for PDCCH at OFDM symbol level or NR-U mini-slot level within the first or first few NR-U slots within the COT, and at NR-U slot level for the remaining COT. This example can be applied to the scenario as shown in FIG. 21.

In a third example of the seventh approach of the Embodiment 3, during the IDLE period, UE of FBE NR-U can defer monitoring for PDCCH until the start of next fixed frame period.

In a fourth example of the seventh approach of the Embodiment 3, during the IDLE period, UE of FBE NR-U can start to monitor for PDCCH after the start of the assigned observation slot(s), at the time granularity on a NR-U slot level, or NR-U mini-slot level, or OFDM symbol level.

In a fifth example of the seventh approach of the Embodiment 3, one or multiple of the first example to the fourth example of the seventh approach of the Embodiment 3 can also apply to sub-band or multi-BWP operation of FBE NR-U; and when sub-band or multi-BWP operation of FBE NR-U is used, UE can determine which sub-band/BWP is available to use by detecting the existence of PDCCH in each sub-band/BWP.

Embodiment 4. Channel Access Enhancement for Asynchronous FBE NR-U Network

The Embodiment 4 includes the approaches and examples for channel access mechanism enhancements for asynchronous FBE NR-U network(s).

The channel access mechanism for asynchronous FBE NR-U network (e.g., intra operator and/or inter-operator) shall also be enhanced over the baseline channel access scheme, wherein asynchronous for two FBE devices or operators can refer to the fact that their start timing for the fixed frame period is different; and/or the duration of the fixed frame period is different; and/or the duration of the COT/idle period is different.

For asynchronous NR-U devices, the LBT performed by one initiating device may always be blocked by the transmission from another initiating device that has an earlier start timing for the fixed frame period.

Figure 22:
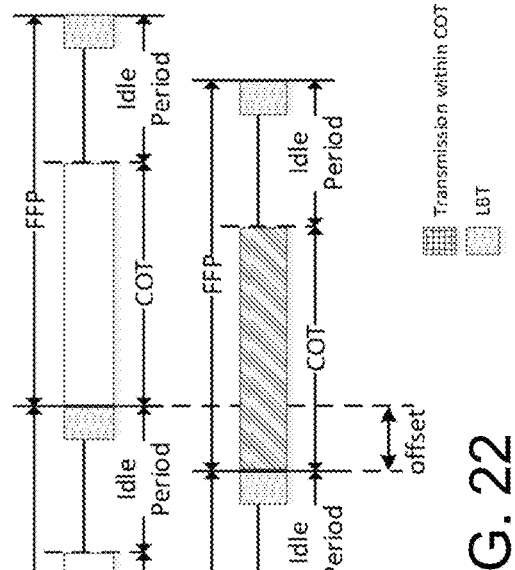
FIG. 22 illustrates an exemplary FBE channel access scheme with two neighboring asynchronous FBE NR-U initiating devices according to one embodiment of the present disclosure.
Figure 22:
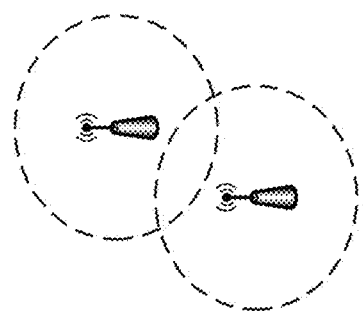

FIG. 22 illustrates an exemplary FBE channel access scheme with two neighboring asynchronous FBE NR-U initiating devices according to one embodiment of the present disclosure. The embodiment shown in FIG. 22 is for illustration only. Other embodiments could be used without departing from the scope of the present disclosure In this example, an LBT is performed omni-directionally between two neighboring asynchronous FBE NR-U initiating devices. One or multiple of the approaches in the Embodiment 4 can be adopted to enhance the channel access of asynchronous FBE NR-U. The approaches in the Embodiment 4 are beneficial in improving channel access for asynchronous FBE NR-U networks, but these approaches are not restricted to be only applied to asynchronous FBE NR-U network(s) and can be applied to any FBE NR-U network.

In a first approach of the Embodiment 4, each initiating FBE NR-U device can perform directional LBT over directional spatial RX parameter(s).

In a first example of the first approach of the Embodiment 4, for each initiating FBE NR-U device, the directional LBT scheme, and the spatial TX parameters utilized for transmission after the directional LBT can follow the fourth approach of the Embodiment 3. In one sub-example, the initiating FBE NR-U device can perform directional LBT over only one spatial RX parameter.

In another sub-example, the initiating FBE NR-U device can perform directional LBT over multiple spatial RX parameters.

Given the first approach of the Embodiment 4, the FBE LBT by an initiating device is less likely to be blocked by neighboring asynchronous initiating device(s) when their beam directions are not aligned, and hence spatial reuse can be improved.

Figure 23:
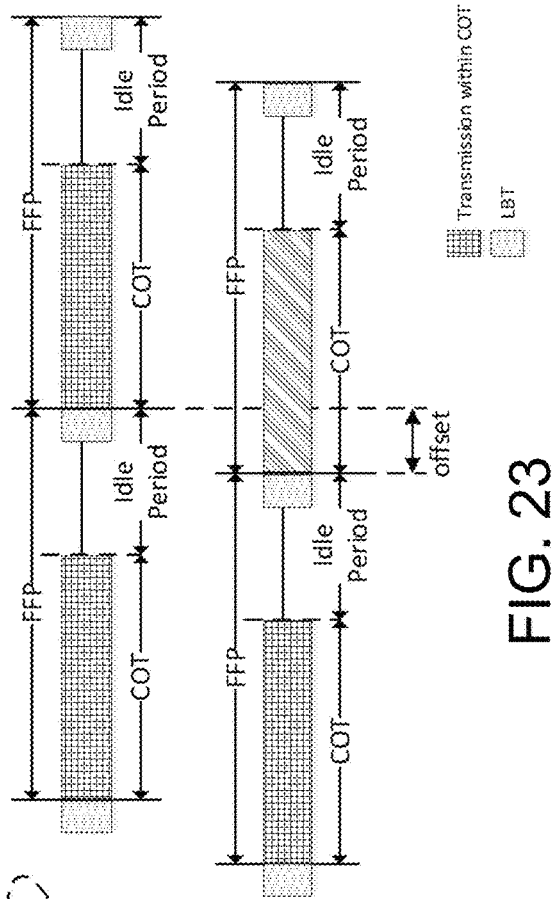
FIG. 23 illustrates another exemplary FBE channel access scheme with two neighboring asynchronous FBE NR-U initiating devices according to one embodiment of the present disclosure.
Figure 23:
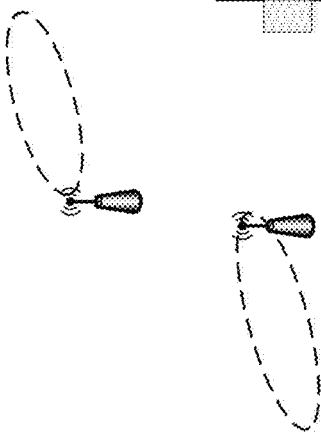

FIG. 23 illustrates another exemplary FBE channel access scheme with two neighboring asynchronous FBE NR-U initiating devices according to one embodiment of the present disclosure. The embodiment shown in FIG. 23 is for illustration only. Other embodiments could be used without departing from the scope of the present disclosure.

In the embodiment, each FBE NR-U initiating device performs directional LBT over one spatial RX parameter, and both FBE NR-U device can transmit during the FFP since their spatial parameters are not aligned.

Figure 24:
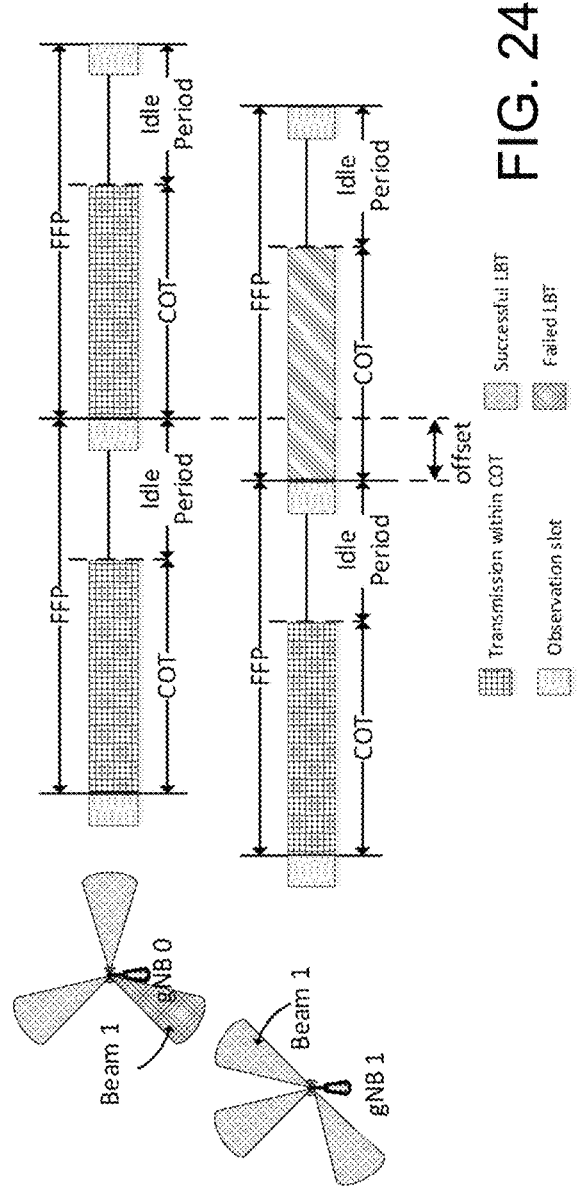
FIG. 24 illustrates another exemplary FBE channel access scheme with multiple asynchronous FBE NR-U initiating devices according to one embodiment of the present disclosure.

FIG. 24 illustrates another exemplary FBE channel access scheme with multiple asynchronous FBE NR-U initiating devices according to one embodiment of the present disclosure. The embodiment shown in FIG. 24 is for illustration only. Other embodiments could be used without departing from the scope of the present disclosure.

In the Embodiment 4, two FBE NR-U initiating devices performs directional LBT over three spatial RX parameters. Since one pair of the spatial RX parameters of gNB0 and gNB1 are aligned, and gNB1 has an earlier start timing for the FFP, the directional LBT at beam 1 of gNB0 will be blocked by the directional transmission at beam 1 of gNB1. However, the LBT at remaining spatial RX parameters of gNB0 other than beam 1 can still pass their respective directional LBT and thus gNB0 can utilize next FFP for transmissions.

In a second approach of the Embodiment 4, a set of N observation slots (N>=1) can be introduced to the asynchronous FBE NR-U initiating devices (or operators), such that each asynchronous initiating device (or operator) can have non-zero probability to access the operating channel through choosing the observation slot.

In a first example of the second approach of the Embodiment 4, the second approach of the Embodiment 4 can be utilized when the timing offset between asynchronous initiating devices (or two asynchronous FBE NR-U operators with fixed timing offset) is smaller than the idle period. In one sub-example, this can be extended to when the idle periods of the asynchronous devices/operators are different, and that the timing offset is smaller than the minimum of the idle periods of the asynchronous devices/operators.

In a second example of the second approach of the Embodiment 4, the second approach of the Embodiment 4 can be applied to the scenario when the fixed frame period is of the same length for the asynchronous FBE NR-U network(s). In one sub-example, the idle period can be the same or different for the asynchronous FBE NR-U network(s).

In a third example of the second approach of the Embodiment 4, the second approach of the Embodiment 4 can be applied to the scenario when the fixed frame period is of the different length for the asynchronous FBE NR-U network(s).

In a fourth example of the second approach of the Embodiment 4, when a set of observation slots is introduced to the asynchronous FBE NR-U initiating devices (operators), the configuration of the observation slots set can follow the fifth approach of the Embodiment 3. In one sub-example, the configuration of the observation slots set can include the time-domain positions of the observation slots, how to determine if the LBT is successful for the initiating device, timing relation between the positions of the multiple observation slots and the fixed frame period, when the initiating device can start transmissions after the assigned observation slot have passed LBT.

Figure 25:
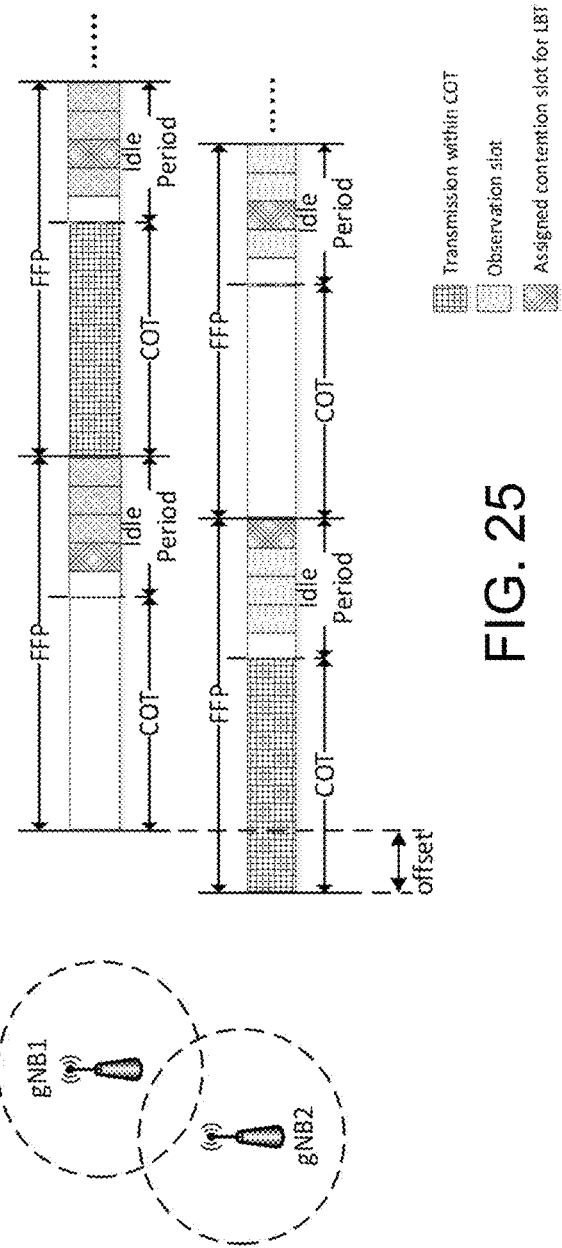
FIG. 25 illustrates another exemplary FBE channel access scheme with multiple asynchronous FBE NR-U initiating devices according to one embodiment of the present disclosure.

FIG. 25 illustrates another exemplary FBE channel access scheme with multiple asynchronous FBE NR-U initiating devices according to one embodiment of the present disclosure. The embodiment shown in FIG. 25 is for illustration only. Other embodiments could be used without departing from the scope of the present disclosure As shown, gNB1 is able to transmit in the next FFP, if its assigned observation slot comes before the assigned observation slot of the gNB2, and that gNB1 starts transmission after its assigned observation slot if it passes LBT.

In a third approach of the Embodiment 4, the FBE device/operator can fall back to the LBE mode. In a first example of the third approach of the Embodiment 4, the third approach of the Embodiment 4 can be used when the FBE device continuously fails the FBE LBT for duration D, or the FBE device continuously fails the FBE LBT after a certain number of LBT attempts N. For instance, this example can happen when timing offset is larger than the idle period between two asynchronous NR-U operators.

In a fourth approach of the Embodiment 4, for asynchronous FBE NR-U devices/operators, one or multiple of the FBE NR-U devices/operators can adjust one or multiple of the start timing of the FFP, the FFP duration, the COT or idle period duration within each FFP, such that the FBE NR-U devices/operators can be synchronized.

In a first example of the fourth approach of the Embodiment 4, the start timing of the FFP, the FFP duration, the COT or idle period duration within each FFP can be configured according to the Embodiment 2.

In a second example of the fourth approach of the Embodiment 4, the adjustment value for one or multiple of the start timing of the FFP, the FFP duration, the COT or idle period duration within each FFP can be determined and configured by higher layer parameter.

In a third example of the fourth approach of the Embodiment 4, the adjustment value for one or multiple of the start timing of the FFP, the FFP duration, the COT or idle period duration within each FFP can be determined by the FBE NR-U device.

In a fourth example of the fourth approach of the Embodiment 4, for the FBE NR-U device whose LBT at observation slot fails due to the transmission from neighboring asynchronous FBE NR-U device(s)/operator(s), the FBE NR-U device can determine during the FFP(s) corresponding to its failed LBT one or multiple of the start timing of the FFP, the FFP duration, the COT or idle period duration of its neighboring FBE NR-U device(s)/operator(s). In one sub-example, during the FFP(s) wherein the FBE NR-U device does not transmit due to failed LBT, the FBE NR-U device can determine the start timing of the FFP, the FFP duration, and the COT duration configuration of its neighboring FBE NR-U device through monitoring the energy of neighboring transmissions. In another sub-example, during the FFP(s) wherein the FBE NR-U device does not transmit due to failed LBT, the FBE NR-U device can determine the start timing of the FFP, the FFP duration, and the COT duration configuration of its neighboring FBE NR-U device through monitoring the channels/signals of neighboring transmissions that contains the corresponding configuration information. For instance, the preamble as detailed in the second approach of the Embodiment 3.

Figure 26:
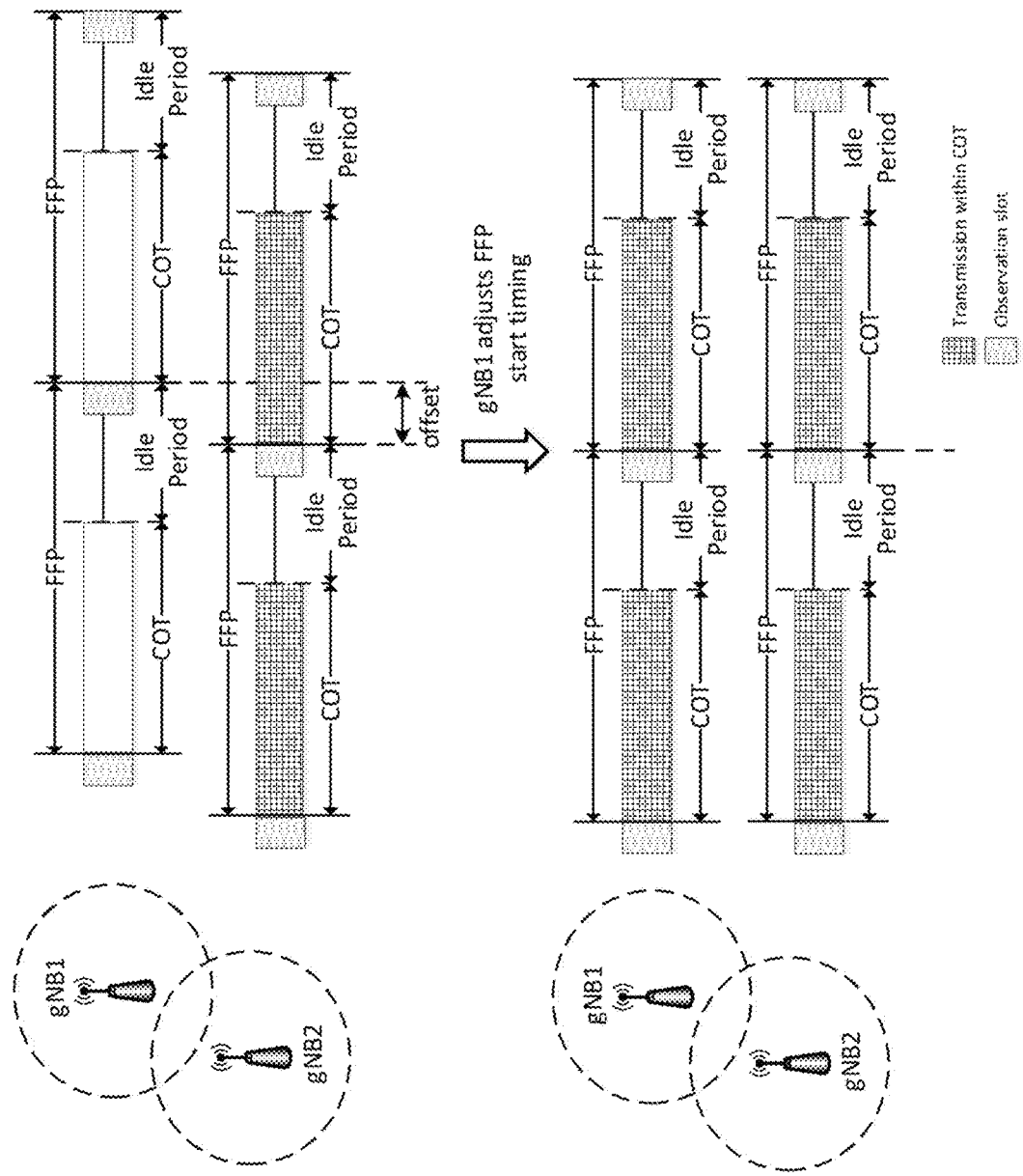
FIG. 26 illustrates another exemplary FBE channel access scheme with multiple asynchronous FBE NR-U initiating devices according to one embodiment of the present disclosure.

FIG. 26 illustrates another exemplary FBE channel access scheme with multiple asynchronous FBE NR-U initiating devices according to one embodiment of the present disclosure. The embodiment shown in FIG. 26 is for illustration only. Other embodiments could be used without departing from the scope of the present disclosure FIG. 26 illustrates an instance of the fourth approach, wherein gNB1 monitors for the start timing of the FFP of gNB2 during the FFP(s) that gNB1 fails LBT due to gNB2 transmission, and gNB1 correspondingly adjusts its start timing of the FFP, such that gNB1 and gNB2 are synchronized and both can transmit simultaneously.

In a fifth approach of the Embodiment 4, for asynchronous FBE NR-U devices/operators, upon successful LBT, the initiating FBE NR-U device and its corresponding device(s) can use directional transmissions during the COT, such that the other asynchronous FBE NR-U devices/operators can be have probability in passing their respective LBT.

In a first example of the fifth approach of the Embodiment 4, the directional transmissions during the COT can be the directional transmission of NR-U signals/channels, such as the SS/PBCH blocks or DRS.

In a second example of the fifth approach of the Embodiment 4, the directional transmissions during the COT can be at the beginning of the COT.

In a third example of the fifth approach of the Embodiment 4, the directional transmissions during the COT can be at the end of the COT.

In a fourth example of the fifth approach of the Embodiment 4, the directional transmissions at the initiating FBE NR-U device can be enabled at every N (N>=1) FFP upon successful LBT.

In a fifth example of the fifth approach of the Embodiment 4, the directional transmissions at the initiating FBE NR-U device can be enabled at every N (N>=1) FFP.

Figure 27:
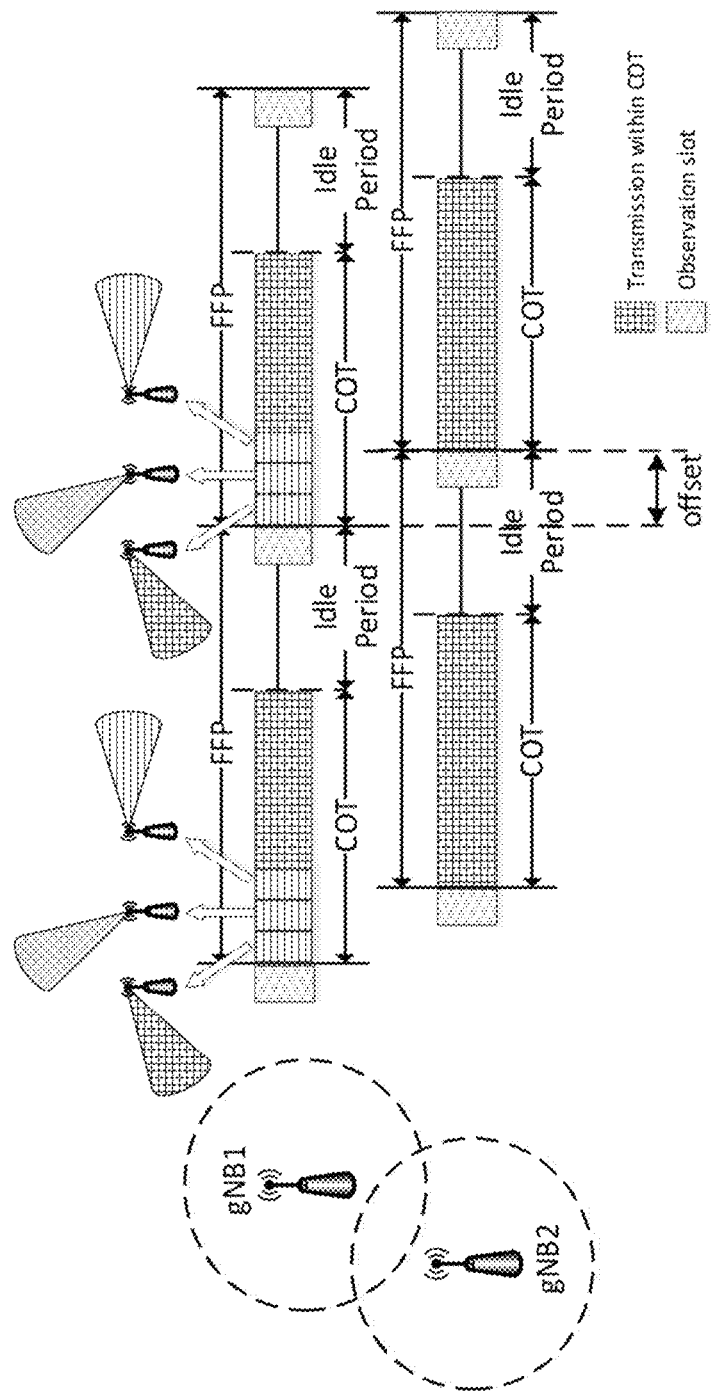
FIG. 27 illustrates another exemplary FBE channel access scheme with multiple asynchronous FBE NR-U initiating devices according to one embodiment of the present disclosure.

FIG. 27 illustrates another exemplary FBE channel access scheme with multiple asynchronous FBE NR-U initiating devices according to one embodiment of the present disclosure. The embodiment shown in FIG. 27 is for illustration only. Other embodiments could be used without departing from the scope of the present disclosure FIG. 27 provides an illustration of the fifth approach of the Embodiment 4, wherein after gNB1 has passed its LBT, it can use directional transmissions, e.g., to transmit SS/PBCH blocks. Meanwhile, when gNB2 performs LBT at its observation slot, since the directional spatial TX parameter from gNB1 is not aligned with gNB2, gNB2 can pass LBT and utilize the following COT for its own transmissions. By contrast, if both gNB1 only uses omni-directional transmission, LBT at gNB2 will always be blocked by gNB1 is a result of the timing offset.

In a sixth approach of the Embodiment 4, for FBE NR-U whose carrier channel bandwidth is larger than the operating channel bandwidth of the unlicensed/shared spectrum, and/or when the FBE NR-U supports multiple carriers, the FBE NR-U device can dynamically adjust its operating channel(s) and/or carrier(s) for FBE operation.

In a first example of the sixth approach of the Embodiment 4, the operating channel bandwidth can be 20 MHz, and the carrier channel bandwidth can be an integer multiple of the operating channel bandwidth.

In a second example of the sixth approach of the Embodiment 4, for each operating channel within the channel bandwidth and/or carrier of the FBE NR-U device, there can exist a maximum number of FFPs N1 that the operating channel and/or carrier can be utilized for transmission continuously. In one sub-example, if the operating channel and/or carrier has been utilized for transmission after N1 consecutive FFPs, the FBE NR-U device can have an observation period of duration T1 or N2 (N2>=1) FFPs, during which the FBE NR-U device does not utilize current operating channel and/or carrier and can monitor for the transmission status of other FBE NR-U device(s)/operator(s) on this operating channel and/or carrier. For instance, if gNB2 utilizes the operating channel and/or carrier right after the gNB1 stops transmission on current operating channel, this indicates it is likely that the transmission from gNB1 has blocked LBT attempts of gNB2 due to timing offset. In another sub-example, after the observation period of duration T1 or N2 (N2>=1) FFPs, the current FBE NR-U device can resume to utilize the current operating channel and/or carrier after duration T2 or N3 (N3>=1) FFPs. For instance, T2 or N3 can also be infinite.

In a third example of the sixth approach of the Embodiment 4, the FBE NR-U device can utilize different subsets of the operating channels within the channel bandwidth and/or carrier in a TDM'ed pattern. In one sub-example, during a period of M (M>=1)FFPs, there can exist m (m>=1) subset, and the FBE NR-U device can use subset S_i (1<=i<=m) of the operating channels within the channel bandwidth and/or carrier for M_i (1<=i<=m) FFPs, with M_1+ . . . +M_m=M. In another sub-example, different subset of the operating channels can be non-overlapping or overlapping. In one instance, one subset S_i can be all the operating channels within the channel bandwidth, and other subset(s) does not include all the operating channels within the channel bandwidth. In another instance, S_i (1<=i<=m) can be non-overlapping, and the union of S_i (1<=i<=m) is all the operating channels within the channel bandwidth. In another instance, the operating channel subset can be a null set. In another sub-example, the duty cycle for each operating channel subset can be fixed. For instance, each subset can share equal fraction of time, and thus the duty cycle for each subset equals 1/m. In another sub-example, the duty cycle for each operating channel subset can be dynamically adjusted. For instance, the subset with higher number of operating channels can have higher duty cycle, when the channel occupancy from other FBE NR-U devices using this subset is low and vice versa. In another sub-example, from a single operating channel's perspective, the third example of the sixth approach of the Embodiment 4 is equivalent to enable the FBE NR-U device to utilize the operating channel through a TDM pattern; wherein the operating channel is utilized by the device if it belongs to the currently utilized subset of operating channels, and otherwise the operating channel is not utilized.

Embodiment 5. Short Control Signaling Transmission for FBE NR-U

The Embodiment 5 provides the principles and examples on supporting short control signaling transmissions for FBE NR-U.

In a first principle of the Embodiment 5, an NR-U FBE can support the short control signaling transmissions, which are the transmissions used by the equipment to send management and control frames without sensing the channel for the presence of other signals.

In a first example of the first principle of the Embodiment 5, the use of short control signaling transmissions needs to meet the constraints as follows: i) Within an observation period of 50 ms, the number of Short Control Signaling Transmissions by the equipment shall be equal to or less than 50; and ii) The total duration of the equipment's Short Control Signaling Transmissions shall be less than 2500 μs within the said observation period.

In a second example of the first principle of the Embodiment 5, for an NR-U FBE initiating device that finds the operating channel to be occupied, it is allowed to continue the short control signaling transmissions on this channel providing it complies with the first example of this principle.

In a third example of the first principle of the Embodiment 5, the short control signaling constraint is interpreted as met if all the combined short control signaling transmissions from the gNB and the UEs associated with the gNB, have a total number of at most 50 transmissions with a total of at most 2500 μs within an observation period of 50 ms, with each short control signal transmission can be chosen from one of the channels/signals in the examples of the second principle in the Embodiment 5.

In a fourth example of the first principle, the short control signaling constraint can be interpreted per device (either a gNB or a UE), such that the constraint is met if the short control signaling transmissions from this device have a total number of at most 50 transmissions with a total of at most 2500 μs within an observation period of 50 ms, with each short control signal transmission can be chosen from one of the channels/signals in the examples of the second principle in the Embodiment 5.

In a second principle of the Embodiment 5, an FBE NR-U can support one or multiple types of signal/channel to be transmitted by utilizing the allowance of the short control signaling transmissions, without performing LBT.

In a first example of the second principle of the Embodiment 5, the SS/PBCH blocks can be transmitted by gNB. In one sub-example, the SS/PBCH block can be transmitted for initial access UEs to detect the SS/PBCH block and corresponding master information block (MIB). For instance, the remaining minimum system information (RMSI) and corresponding control resource set (CORESET) can also be transmitted along with the SS/PBCH block, subject to satisfying the constraints of short control signaling transmissions. In another instance, if SS/PBCH block design for FBE NR-U follows that as Rel-15 NR, wherein the SS burst set period is 20 ms and the SS burst is confined within a 5 ms measurement window; then at most 3 SS bursts can be transmitted within an observation period of 50 ms. If denote by n the maximum number of SS/PBCH blocks that can be transmitted within each SS burst to ensure short control signaling transmissions constraints are satisfied, then n needs to meet that: $3*\min(n,8)<=50$ and $3*4*n*\text{symbol\_period}<=2500$ μs. As a result, n is 2 and 5 respectively with 15 kHz SCS and 30 kHz SCS of the SS/PBCH block. In another sub-example, the SS/PBCH block can be transmitted for measurement purpose, e.g., by the connected UEs. In another sub-example, gNB can pre-configure the SS/PBCH block locations for connected UEs in fixed frame periods that succeed in LBT, wherein the configured SS/PBCH blocks will be used for measurement purpose. Compared to initial access, the SS/PBCH transmission periodicity for measurement can be increased from 20 ms to higher periodicity such as 40 or 80 ms; and the number of SS/PBCH to be transmitted can also be decreased.

In a second example of the second principle of the Embodiment 5, the CSI-RS can be transmitted by gNB. In one sub-example, the CSI-RS can be transmitted for measurement purpose, such as to evaluate the RSRP/RSRQ for the serving cell or neighboring cells. In another sub-example, the gNB can pre-configure the CSI-RS locations for connected UEs in fixed frame periods that succeed in LBT, wherein the configured CSI-RS will be used for measurement purpose.

In a third example of the second principle of the Embodiment 5, the DM-RS can be transmitted by gNB, which can be multiplexed with PDCCH or PDSCH to be transmitted.

In a fourth example of the second principle of the Embodiment 5, the UEs can transmit HARQ-ACK as short control signaling transmissions. In one sub-example, the UE can respond HARQ-ACK to the downlink transmissions from previous fixed frame period, regardless of if the LBT for current fixed frame period at gNB fails or not. In another sub-example, the UE can respond HARQ-ACK to the downlink transmissions when the gap between timing for HARQ-ACK and the end of downlink transmission at UE is larger than SIFS duration (e.g., 16 µs for 5 GHz unlicensed band); such that the UE does not need to perform an extra single-shot LBT for an observation slot duration before grating transmission of HARQ-ACK.

In a fifth example of the second principle of the Embodiment 5, the UE can transmit PUCCH as short control signaling transmissions. In one sub-example, short PUCCH formats such as PUCCH format 0 or PUCCH format 2 can be transmitted with 1 symbol or 2 symbols in the PUCCH.

In a sixth example of the second principle of the Embodiment 5, the UE can transmit SRS as the short control signaling transmissions.

In a seventh example of the second principle of the Embodiment 5, the UE can transmit PRACH as the short control signaling transmissions. In one sub-example, PRACH can be transmitted when the gap between timing for its allocated RACH occasion and the end of previous downlink transmission is larger than SIFS duration (e.g., 16 µs for 5 GHz unlicensed band); such that the UE does not need to perform an extra single-shot LBT for an observation slot duration before grating transmission of PRACH. In another sub-example, the UE can transmit PRACH at its allocated RACH occasion, regardless of if the LBT for current fixed frame period at gNB fails or not. In another sub-example, following PRACH transmission, one or multiple of the Msg2, Msg3 and Msg4 of the random-access procedure can be transmitted as the short control signaling transmissions, subject to satisfying the constraints.

In an eighth example of the second principle of the Embodiment 5, the FBE NR-U responding device, upon correct reception of a packet which was intended for this device, can skip CCA and immediately proceed with the transmission of management and control frames; and a consecutive sequence of such transmissions by the equipment, without it performing a new CCA shall not exceed the MCOT. For instance, the management and control frames for FBE NR-U device can be HARQ-ACK.

In a third principle of the Embodiment 5, all the previous principles and corresponding examples in the embodiments regarding the short control signaling transmission of FBE NR-U can also be applied to NR-U with LBE based operations, subject to the unlicensed regulations.

Embodiment 6. UE Channel Occupancy Time Detection for FBE NR-U

The Embodiment 6 provides the approaches and examples on the detection of the COT for FBE NR-U UE, including the UE monitoring behavior of the COT and the COT structure detection of the UE.

In a first approach of the Embodiment 6, the UE monitoring behavior for the COT and/or PDCCH can be divided into two or multiple phases, wherein the UE monitoring behavior for the COT and/or PDCCH can be different in different phases.

In a first example of the first approach of the Embodiment 6, one phase can be the IDLE period. In one sub-example, the IDLE period phase can refer to the entire IDLE period of the fixed frame period. In another sub-example, when observation slots defined in Embodiment III are introduced as FBE NR-U enhancement, the IDLE period phase can refer to the start of the idle period until the start the start of the first contention slot within the idle period.

In one sub-example, during this phase, the UE does not monitor for any NR-U channel/signal. For instance, the UE can stay in a power saving mode.

In one sub-example, if this phase is configured/supported, the UE can monitor for UE-specific PDCCH and/or GC-PDCCH and/or FBE NR-U preamble signals in this phase. In addition, if the UE has detected such signals/channels, the UE can determine its serving gNB has successfully passed LBT and will transmit in the COT.

In another sub-example, if the UE monitors for UE-specific PDCCH and/or GC-PDCCH and/or FBE NR-U preamble signals in this phase, the granularity for UE monitoring can be on an NR-U slot level or NR-U mini-slot level or NR-U symbol level; wherein the granularity can be fixed in the spec, or configured by higher layer parameter. In addition, the granularity for different channels/signals that UE monitors for can be either same or different. For instance, UE can be configured with dedicated monitoring period for PDCCH and GC-PDCCH respectively. In another sub-example, this monitoring phase can be referred to as Phase A.

In a second example of the first approach of the Embodiment 6, when observation slots defined in the Embodiment 3 are introduced as FBE NR-U enhancement, one phase can be the configured observation slots. In one sub-example, the configuration of the observation slots can be indicated through system information such as the remaining system information (RMSI) and/or the other system information (OSI). In another sub-example, the configured observation slots can span both the end of the idle period and the start of the channel occupancy time of the next fixed frame period. In another sub-example, if this phase is configured/supported, the UE can monitor for the signals/channels that will be transmitted after the NR-U FBE initiating device (i.e., gNB) has passed its LBT at its assigned observation slot(s), wherein such signals/channels are detailed in the fifth approach of the Embodiment 3. In addition, if such signals/channels have been detected by the FBE UE, the UE can determine its serving gNB has successfully passed LBT and will transmit in the COT. In another sub-example, the time-domain granularity for UE monitoring can be an observation slot. In another sub-example, this monitoring phase can be referred to as Phase B.

In a third example of the first approach of the Embodiment 6, another monitoring phase can be the entire channel occupancy time (COT). In one sub-example, UE can have the same monitoring behavior within the entire COT. This can be applied when there is no enhancement of random observation slots; and when the starting time of the fixed frame period is aligned with the starting position of an NR-U slot. In one sub-example, if this phase is configured/supported, the UE can monitor for UE-specific PDCCH and/or GC-PDCCH and/or FBE NR-U preamble signals in this phase. In addition, if such signals/channels have been detected by the FBE UE, the UE can determine its serving gNB has successfully passed LBT and transmit in the current COT (i.e., a COT is detected by the UE). In another sub-example, the granularity for UE monitoring in this phase can be on an NR-U slot level or NR-U mini-slot level; wherein the granularity can be fixed in the spec, or configured by higher layer parameter, or can be dynamically adjusted according to the DCI. In addition, the granularity for different channels/signals that UE monitors for can be either same or different. For instance, UE can be configured with dedicated monitoring period for PDCCH and GC-PDCCH respectively. In another sub-example, the UE monitoring behavior in this phase can be configured by higher layer and/or DCI, such that UE only monitors for FBE NR-U channels/signals for a subset duration of this phase. In another sub-example, this monitoring phase can be referred to as Phase C.

In a fourth example of the first approach of the Embodiment 6, another monitoring phase can be the starting portion with duration $\tau$ of the COT in the fixed frame period. In one sub-example, when the start of the channel occupancy time is aligned with NR-U frame structure on a mini-slot and/or symbol level, $\tau$ can be the duration of the initial partial slot of the COT. In one sub-example, if this phase is configured/supported, the UE can monitor for UE-specific PDCCH and/or GC-PDCCH and/or FBE NR-U preamble signals in this phase. In addition, if such signals/channels have been detected by the FBE UE, the UE can determine its serving gNB has successfully passed LBT and transmit in the current COT (i.e., the COT is detected by the UE). In another sub-example, the granularity for UE monitoring in this phase can be on an NR-U mini-slot level or NR-U symbol level; wherein the granularity can be fixed in the spec or configured by higher layer parameter. In addition, the granularity for different channels/signals that UE monitors for can be either same or different. For instance, UE can be configured with dedicated monitoring period for PDCCH and GC-PDCCH respectively. In another sub-example, this monitoring phase can be referred to as Phase D.

In a fifth example of the first approach of the Embodiment 6, another monitoring phase can be from duration $\tau$ after the start of the COT until the end of the COT of the fixed frame period. In one sub-example, this example can be applied when observation slots are introduced, and the configured observation slots ends after duration $\tau$ of a COT. If the observation slots are all contained within the idle period, $\tau$ can be 0; otherwise $\tau>0$. In another sub-example, this example can be applied when the start of the channel occupancy time is aligned with NR-U frame structure on a mini-slot and/or symbol level, $\tau$ can be the duration of the initial partial slot of the COT. In one sub-example, if this phase is configured/supported, the UE can monitor for UE-specific PDCCH and/or GC-PDCCH in this phase and/or FBE NR-U preamble signals. In another sub-example, the granularity for UE monitoring in this phase can be on an NR-U slot level or NR-U mini-slot level; wherein the granularity can be fixed in the spec, or configured by higher layer parameter, or can be dynamically adjusted according to the DCI. In addition, the granularity for different channels/signals that UE monitors for can be either same or different. For instance, UE can be configured with dedicated monitoring period for PDCCH and GC-PDCCH respectively. In another sub-example, this monitoring phase can be referred to as Phase E.

In a sixth example of the first approach of the Embodiment 6, each fixed frame period can be divided into two monitoring phases with Phase A and Phase C only, wherein Phase A spans over the entire idle period of the COT. In one sub-example, the UE switching from Phase A (of a previous COT) to Phase C (of current COT) can be implicit, wherein UE switches from Phase A (of a previous COT) to Phase C (of current COT) according to the configured structure of the fixed frame period (i.e., COT duration and idle period duration in each COT), wherein the UE can obtain the fixed frame period configuration according to the Embodiment 2. In one sub-example, the UE switching from Phase A (of a previous COT) to Phase C (of current COT) can be explicit, wherein trigger for UE to switch from Phase A (of a previous COT) to Phase C (of current COT) is that UE-specific PDCCH and/or GC-PDCCH and/or FBE NR-U preamble signals has been detected by the UE. In one sub-example, the UE switching from Phase C (of a current COT) to Phase A (of current COT) can be implicit, wherein UE switches from Phase C (of a current COT) to Phase A (of current COT) according to the configured structure of the fixed frame period (i.e., COT duration and idle period duration in each COT), wherein the UE can obtain the fixed frame period configuration according to the Embodiment 2. In one sub-example, the UE switching from Phase C (of a current COT) to Phase A (of current COT) can be implicit, wherein UE switches from Phase C (of a current COT) to Phase A (of current COT) according to a configured structure of the fixed frame period (i.e., COT duration and idle period duration in each COT), wherein the UE can obtain the fixed frame period configuration according to the Embodiment 2.

In a seventh example of the first approach of the Embodiment 6, each fixed frame period can be divided into three monitoring phases with Phase A, Phase B and Phase E. In one sub-example, this example can be used when random observation slots are introduced. In another sub-example, the UE switching from Phase A (of a previous COT) to Phase B can be implicit, wherein UE switches from Phase A (of a previous COT) to Phase B according to the configured structure of the fixed frame period (i.e., COT duration and idle period duration in each COT), wherein the UE can obtain the fixed frame period configuration according to the Embodiment 2. In one sub-example, the UE switching from Phase A (of a previous COT) to Phase B can be explicit, wherein the trigger for UE to switch from Phase A (of a previous COT) to Phase B if UE-specific PDCCH and/or GC-PDCCH and/or FBE NR-U preamble signals has been detected by the UE. In another sub-example, the UE switching from Phase B to Phase E (of current COT) can be implicit, wherein UE switches from Phase B to Phase E (of current COT) according to the configured structure of the fixed frame period (i.e., COT duration and idle period duration in each COT), wherein the UE can obtain the fixed frame period configuration according to the Embodiment 2. This example can be applied regardless if UE has detected the signals/channels that will be transmitted by the NR-U FBE initiating device (i.e., gNB) after it has passed its LBT at its assigned observation slot(s), which is detailed in the second example of the first approach of the Embodiment 6. In another sub-example, the UE switching from Phase B to Phase E (of current COT) can be explicit, wherein UE switches from Phase B to Phase E (of current COT) if the UE has detected the signals/channels that will be transmitted by the NR-U FBE initiating device (i.e., gNB) after it has passed its LBT at its assigned observation slot(s), which is detailed in the second example of the first approach of the Embodiment 6. In another sub-example, the UE switching from Phase E (of a current COT) to Phase A (of current COT) can be implicit, wherein UE switches from Phase E (of a current COT) to Phase A (of current COT) according to the configured structure of the fixed frame period (i.e., COT duration and idle period duration in each COT), wherein the UE can obtain the fixed frame period configuration according to the Embodiment 2.

In an eighth example of the first approach of the Embodiment 6, each fixed frame period can be divided into three monitoring phases with Phase A, Phase D and Phase E. In one sub-example, this example can be used when the start of the channel occupancy time is aligned with NR-U frame structure on a mini-slot and/or symbol level. In another sub-example, this example can be used when the UE monitoring behavior (e.g., for PDCCH/GC-PDCCH/preamble signal) in first k>=1 slots of the channel occupancy time (including mini-slot) is different from the remaining slots of the COT. In another sub-example, the UE switching from Phase A (of a previous COT) to Phase D (of current COT) can be implicit, wherein UE switches from Phase A (of a previous COT) to Phase D (of current COT) according to the configured structure of the fixed frame period (i.e., COT duration and idle period duration in each COT), wherein the UE can obtain the fixed frame period configuration according to the Embodiment 2. In one sub-example, the UE switching from Phase A (of a previous COT) to Phase D (of current COT) can be explicit, wherein the trigger for UE to switch from Phase A (of a previous COT) to Phase D (of current COT) can be UE-specific PDCCH and/or GC-PDCCH and/or FBE NR-U preamble signals has been detected by the UE. In another sub-example, the UE switching from Phase D (of current COT) to Phase E (of current COT) can be implicit, wherein UE switches from Phase D (of current COT) to Phase E (of current COT) according to the configured structure of the fixed frame period (i.e., COT duration and idle period duration in each COT), wherein the UE can obtain from fixed frame period configuration (e.g., according to the Embodiment 2) as well as the FBE frame structure, the switching boundary from Phase D to Phase E. For instance, Phase D can be an initial NR-U mini-slot, while Phase E can start from the first NR-U full slot within the COT. This example can be applied regardless if UE has detected the signals/channels that will be transmitted by the NR-U FBE initiating device (i.e., gNB) after it has passed its LBT at its assigned observation slot(s), which is detailed in the second example of the first approach of the Embodiment 6. In another sub-example, the UE switching from Phase D to Phase E (of current COT) can be explicit, wherein trigger for UE to switch from Phase D to Phase E (of current COT) if the UE has detected the signals/channels that will be transmitted by the NR-U FBE initiating device (i.e., gNB) after it has passed its LBT at its assigned observation slot(s), which is detailed in the second example of the first approach of the Embodiment 6. In another sub-example, the UE switching from Phase E (of a current COT) to Phase A (of current COT) can be implicit, wherein UE switches from Phase E (of a current COT) to Phase A (of current COT) according to the configured structure of the fixed frame period (i.e., COT duration and idle period duration in each COT), wherein the UE can obtain the fixed frame period configuration according to the Embodiment 2.

In a second approach of the Embodiment 6, the UE can obtain the structure of the channel occupancy time during the monitoring phase(s) of the fixed frame period.

In a first example of the second approach of the Embodiment 6, the UE can obtain the slot format for each slot of the COT from the GC-PDCCH detected during the COT. In one sub-example, the GC-PDCCH can reuse the DCI format 2_0 from NR Rel-15, wherein the DCI format can indicate the DL/UL/flexible symbol for each slot within the COT. In another sub-example, the GC-PDCCH can be enhanced from DCI format 2_0 of NR Rel-15. For instance, the GC-PDCCH can be of a new DCI format other than DCI format 2_0.

In a second example of the second approach of the Embodiment 6, for the FBE NR-U slot(s) that overlap with the IDLE period of the FBE fixed frame period, the UE can ignore the slot format configuration on symbol(s) of such FBE NR-U slot(s) that overlap with the IDLE period. In one sub-example, if the random observation slots are used, the UE can ignore the UE can ignore the slot format configuration on symbol(s) of such FBE NR-U slot(s) that overlap with the IDLE period excluding the observation slots. In another sub-example, if the random observation slots are used, the UE can treat the symbol(s) of such FBE NR-U slot(s) that overlap with the observation slots as DL symbols by default. In another sub-example, if the random observation slots are used, the UE can determine the format of the symbol(s) that overlap with the observation slots according to the corresponding slot format indication (SFI).

In a third example of the second approach of the Embodiment 6, the sub-band usage information can also be indicated to the UE through GC-PDCCH/UE-specific PDCCH/FBE NR-U preamble signals, which UE will detect during the monitoring phases of the fixed frame period. In one sub-example, the sub-band usage information can include which sub-band(s) the gNB can utilize in current COT for DL/UL transmissions. For instance, such sub-bands can be determined by the gNB according to the sixth approach of the Embodiment 3. In another instance, such information can be indicated through GC-PDCCH. In another sub-example, the sub-band usage information can include which sub-band(s) the gNB configures in current COT for DL/UL transmissions to the UE. For instance, such sub-bands can be a subset of the sub-bands determined by the gNB according to the sixth approach of the Embodiment 3. In another instance, such information can be indicated through UE specific PDCCH.

Extend 5G NR into the unlicensed spectrum is an important component of the Rel-16 NR, and one of the most important design considerations for unlicensed operations is the channel access mechanism. The unlicensed regulation has defined two types of channel access mechanisms for devices/equipments operating in the unlicensed spectrum, namely FBE and LBE. FBE is a channel access mechanism wherein the transmit/receive structure has a periodic timing with a periodicity named the fixed frame period (FFP), and that the initiating device shall perform LBT during an observation slot before starting transmissions on an operating channel at the start of a FFP. Load based equipment, or LBE, is a channel access mechanism that implements LBT with random backoff with a contention window of variable size.

For both FBE and LBE operations, the unlicensed regulation allows the initiating device to grant one or more associated responding devices to transmit on the current operating channel within the current COT, wherein the responding device may proceed with such transmission without LBT if the transmission starts within SIFS period (i.e., 16 μs at 5 GHz unlicensed band) after the last transmission by the initiating device; otherwise the responding device performs LBT during an observation slot within PIFS period (i.e., 25 μs at 5 GHz unlicensed band) ending immediately before the granted transmission time.

In this disclosure, the observation slot refers to the period during which the operating channel is checked for the presence of other transmissions. The maximum time that the LBT mechanism has available to assess the operating channel to determine if its busy or idle within the observation slot is implementation dependent. For both FBE and LBE, the observation slot is at least 9 microseconds in the 5 GHz unlicensed spectrum. For 60 GHz unlicensed spectrum, the observation slot, or equivalently a clear channel assessment (CCA) slot, is 5 microseconds. In addition, the SIFS and PIFS refer to the short inter-frame space and the point coordination function inter-frame space respectively, whose duration depends on the unlicensed band and can be configurable. For example, for sub-7 GHz NR-U operating in 5 GHz unlicensed band, SIFS duration can be 16 μs, and the PIFS duration can be 25 μs. In another example, for above-7 GHz NR-U in 60 GHz unlicensed band, the SIFS duration can be 3 μs, and the PIFS duration can be 8 μs.

For the downlink (DL) to uplink (UL) switching and uplink to downlink switching operations performed by NR unlicensed (NR-U), the above unlicensed regulations regarding the LBT requirements need to be satisfied.

This disclosure is focused on the design aspects to support DL to UL switching and UL to DL switching of NR-U, the NR-U operations at DL to UL switching point(s) and UL to DL switching point(s) and the corresponding LBT requirements.

This disclosure includes several embodiments, principles, approaches and examples that can be used in conjunction or in combination with one another or can operate as stand-alone. The embodiments/principles/approaches/examples in this disclosure can be applied to FBE-based NR-U, LBE-based NR-U, or both FBE-based and LBE-based NR-U.

In the rest of this disclosure, sub-7 GHz NR-U refers to NR-U that operates in the unlicensed/shared bands below 7 GHz, such as the 5 GHz unlicensed bands or the 6 GHz unlicensed/shared bands; and above-7 GHz NR-U refers to NR-U that operators in the unlicensed/shared bands above 7 GHz, such as the 60 GHz unlicensed bands. In addition, the "DL/UL switching" refers to either one DL to UL switching, or one UL to DL switching.

Embodiment 7. Principles on DL/UL Switching for NR-U

The Embodiment 7 includes the principles on supporting DL/UL switching for NR-U.

In a first principle of the Embodiment 7, NR-U can support downlink to uplink switching within the channel occupancy time (COT), such that the UE(s) associated with a gNB can be authorized for uplink transmissions within the COT.

In a first example of the first principle of the Embodiment 7, the COT can be obtained by the gNB, e.g., for FBE-based NR-U or LBE-based NR-U.

In a second example of this first principle, the uplink transmission can be scheduled by the gNB through UL grant, or grant-free uplink transmissions, or HARQ-ACK that responds to the previous downlink transmissions, or other PUCCH transmission, or SRS transmissions.

In a third example of the first principle, the LBT requirement for such uplink transmissions by the UE shall follow that of the unlicensed regulation, i.e., LBT is not needed if uplink transmission starts within SIFS duration (e.g. 16 μs for 5 GHz band) after the last downlink transmission; otherwise LBT needs to be performed during an observation slot within a period of PIFS duration (e.g., 25 μs for 5 GHz band) ending before the granted uplink transmission needs to be performed by the UE.

In a fourth example of the first principle, a no-LBT option can be adopted for such uplink transmission, subject to regulation allowance and restrictions. For instance, this no-LBT option can be used when UE responds HARQ-ACK to the corresponding DL transmission, subject to regulation restrictions.

In a second principle of the Embodiment 7, NR-U can support uplink to downlink switching within the COT, such that the serving gNB of the UE can be authorized for downlink transmissions within the COT.

In a first example of the second principle of the Embodiment 7, the COT can be obtained by the UE through LBT operation similar to category-4 (CAT-4) LBT of LTE-LAA for LBE-based NR-U, or if UE is initiating device for FBE-based NR-U.

In a second example of the second principle, the LBT requirement for such downlink transmissions by the gNB shall follow that of the unlicensed regulation, i.e., LBT is not needed if downlink transmission starts within SIFS duration (e.g. 16 μs for 5 GHz band) after the last uplink transmission; otherwise LBT needs to be performed during an observation slot within a period of PIFS duration (e.g., 25 μs for 5 GHz band) ending before the downlink transmission needs to be performed by the gNB.

In a third example of the second principle, a no-LBT option can be adopted for such downlink transmission, subject to regulation allowance and restrictions. For instance, this no-LBT option can be used when gNB responds HARQ-ACK to the corresponding UL transmission, subject to regulation restrictions.

In unlicensed regulation, the responding device may transmit in the current operating channel for the remaining COT after receiving the grant from the initiating device, and it can have multiple transmissions providing the gap does not exceed 16 μs. In addition, the grant can be issued to multiple responding devices, and each responding device can transmit in the remaining COT according to the start time indicated in the grant. In one example, under the unlicensed regulation, NR-U can have at most one DL to UL switching, if the initiating device is gNB and the responding device is the UE. In one sub-example, multiple UEs can perform UL transmissions with the COT after the DL to UL switching. In another example, under the unlicensed regulation, NR-U can have at most one UL to DL switching, if the initiating device is UE and the responding device is the gNB.

In a third principle of the Embodiment 7, NR-U can allow more than one DL to UL switching point(s) and UL to DL switching point(s) within the channel occupancy time.

In a first example of the third principle, the COT can be the COT obtained by the gNB in LBE mode. In a second example of the third principle, the COT can be the COT obtained by the gNB in FBE mode. In a third example of the third principle, the COT can be obtained by the UE in LBE mode. In a fourth example of the third principle, the COT can be obtained by the UE in FBE mode.

In a fifth example of the third principle, for each of the DL to UL switching points, LBT is not needed for the UE if the uplink transmission starts within SIFS duration (e.g. 16 μs for 5 GHz band) after the last downlink transmission from the UE perspective; otherwise LBT needs to be performed by the UE during an observation slot within a period of PIFS duration (e.g., 25 μs for 5 GHz band) ending before the granted uplink transmission. In one sub-example, this can be applied to COT obtained by the gNB, and the uplink transmission is the initial uplink transmission from the UE within this COT.

In a sixth example of the third principle, for each of the UL to DL switching points, LBT is not needed for gNB if downlink transmission starts within SIFS duration (e.g. 16 μs for 5 GHz band) after the last uplink transmission from the gNB perspective; otherwise, LBT needs to be performed by gNB during an observation slot within a period of PIFS duration (e.g., 25 μs for 5 GHz band) ending before the downlink transmission. In one sub-example, this can be applied to COT obtained by the UE, and the downlink transmission is the initial downlink transmission from the gNB within this COT.

In a seventh example of the third principle, a no-LBT option can be adopted for the DL to UL switching point(s), and/or UL to DL switching point(s), subject to regulation allowance and restrictions. For instance, this no-LBT option can be used when UE responds HARQ-ACK to the corresponding DL transmission at the DL to UL switching point, subject to regulation restrictions.

In an eighth example of the third principle, for each switching from DL to UL then back to DL (e.g., DL-UL-DL switching) during a COT obtained by gNB, LBT is not needed for the gNB to resume the DL transmission if the gap between the end of first DL transmission and the start of the second DL transmission for this DL-UL-DL switching is within SIFS duration (e.g. 16 μs for 5 GHz band); and if the gap between the end of first DL transmission and the start of the second DL transmission is between SIFS duration and PIFS duration (e.g., [16 μs, 25 μs] for 5 GHz band), a gNB can resume the DL transmission if LBT is passed during an observation slot. For instance, this can be applied to sub-7 NR-U system with higher subcarrier spacing such as 60 kHz SCS or 120 kHz SCS. In another instance, this can be applied to FDD NR-U system, such as when NR-U uplink is transmitted through licensed carrier, and that the gap between two DL transmissions of this DL-UL-DL switching can be only 1 OFDM symbol, which is less than 25 μs with subcarrier spacing of 60 kHz or higher SCS.

In one sub-example of the seventh example of the third principle, if the gap between the end of first DL transmission and the start of the second DL transmission is larger than PIFS duration (e.g., 25 μs for 5 GHz band), gNB can resume the second DL transmission if LBT is passed during an observation slot within a period of PIFS duration ending before the start of second DL transmission. For instance, this can be used for FBE-based NR-U, or LBE-based NR-U in 6 GHz band or 5 GHz band, or FDD-based NR-U, such as uplink carrier on the licensed band. In another sub-example, if the gap between the end of first DL transmission and the start of the second DL transmission is larger than PIFS duration (e.g., 25 μs for 5 GHz band), gNB cannot resume the DL transmission. For instance, this can be used for LBE-based TDD NR-U in 5 GHz band and when the COT is obtained by a gNB LBT. In another sub-example, if after the DL-UL-DL switching, another DL to UL switching is initiated, then the second DL to UL switching for this DL-UL-DL-UL switching is allowed only if the two UL transmissions are from the same UE over the unlicensed carrier and the gap between the two UL transmissions are within SIFS duration (e.g., 16 μs for 5 GHz band); or if the two UL transmissions are over the licensed carrier; or if the two UL transmissions are from different UEs over the unlicensed carrier, then the second DL to UL switching satisfies the example of the LBT requirement for such uplink transmission from the first principle (i.e., third example of the first principle) of the Embodiment 7. For instance, for sub-7 GHz NR-U and subcarrier spacing of no larger than 60 kHz and SIFS duration of 16 μs, the DL-UL-DL-UL switching cannot be allowed if the two UL transmissions over the unlicensed carrier are from the same UE; and the UE HARQ-ACK for the second DL transmission for the DL-UL-DL switching can be either reported by the UE within the next COT obtained by the gNB, or reported by the UE with a COT obtained by this UE through a CAT-4 LBT. In another sub-example, if a further DL/UL switching is needed, the LBT requirements from this example needs to be met, and the total number of DL/UL switching points need to meet the example on the maximum allowed number of DL/UL switching points for this principle.

In a ninth example of the third principle, for each switching from UL to DL then back to UL (e.g., UL-DL-UL switching) during a COT obtained UE, LBT is not needed for the UE to resume the UL transmission if the gap between the end of first UL transmission and the start of the second UL transmission of this UL-DL-UL switching is within SIFS duration (e.g. 16 μs for 5 GHz band); and if the gap between the end of first UL transmission and the start of the second UL transmission is between a SIFS duration and a PIFS duration (e.g., [16 μs, 25 μs] for 5 GHz band), UE can resume the UL transmission if an LBT is passed during an observation slot.

In one sub-example of the ninth example of the third principle, if the gap between the end of first UL transmission and the start of the second UL transmission is larger than a PIFS duration (e.g., 25 μs for 5 GHz band), UE can resume the UL transmission if an LBT is passed during an observation slot within a period of PIFS duration ending before the start of the second DL transmission. For instance, this can be used for FBE-based NR-U, or LBE-based NR-U in 6 GHz band or 5 GHz band. In another sub-example, if the gap between the end of first UL transmission and the start of the second UL transmission is larger than a PIFS duration (e.g., 25 μs for 5 GHz band), UE cannot resume the UL transmission. For instance, this can be used for LBE-based NR-U in 5 GHz band and when the COT is obtained by a UE LBT. In another sub-example, if after the UL-DL-UL switching, another UL to DL switching is initiated, then the second UL to DL switching for this UL-DL-UL-DL switching is allowed if the two DL transmissions are from the same gNB (or TRP) and the gap between the two DL transmissions are within a SIFS duration (e.g., 16 μs for 5 GHz band); or if the two DL transmissions are from a different gNBs (or TRPs), then the second UL to DL switching satisfies the example of the LBT requirement for such downlink transmission from the second principle (i.e., second example of the second principle) of the Embodiment 7. For instance, for sub-7 GHz NR-U and subcarrier spacing of no larger than 60 kHz and the SIFS duration of 16 µs, the UL-DL-UL-DL switching cannot be allowed if the two DL transmissions are from the same gNB. In another sub-example, if further DL/UL switching is needed, the LBT requirements from this example needs to be met, and the total number of DL/UL switching points need to meet the example on the maximum allowed number of DL/UL switching points for this principle.

In a tenth example of the third principle, the maximum allowed number of DL/UL switching points within the COT, including both DL to UL switching point(s) and UL to DL switching point(s) can be either predefined in the spec or configurable. The specification can specify the total number of DL to UL switching point(s) and UL to DL switching point(s), or specify the number of DL to UL switching point(s) and the number for UL to DL switching point(s) separately, or specify either one of the number of DL to UL switching point(s) or the number for UL to DL switching point(s). In one approach, the maximum number of switching points can be predefined in the spec as a fixed number, such as N (N>=1) within a COT duration. In another approach, the maximum number of switching points can be predefined in the specification, wherein the number is scalable with the COT duration, such as being non-decreasing with a COT duration for at least one of LBE-based or FBE-based NR-U. For instance, if the COT duration is M milliseconds, the maximum allowed total number of switching points can be 2*M−1, which can be at least applied to the scenario where UE responds HARQ-ACK feedback to the corresponding DL transmissions every 1 millisecond.

Figure 28:
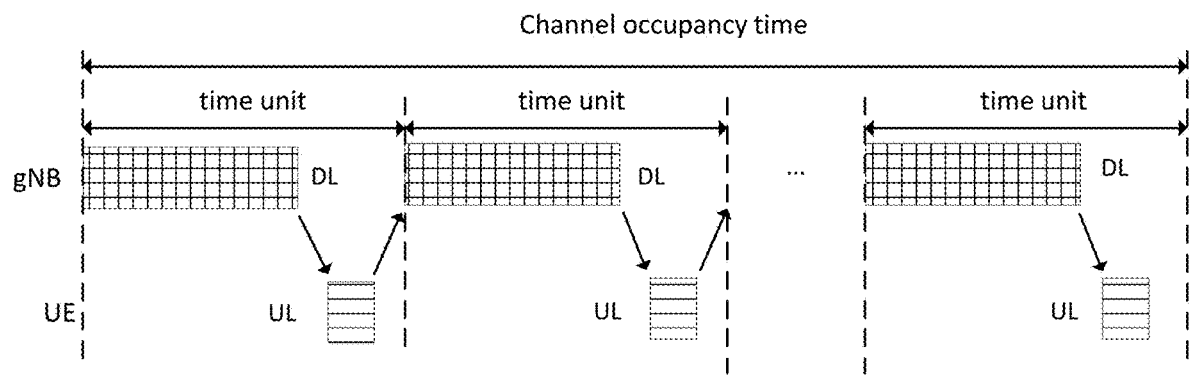
FIG. 28 illustrates exemplary DL/UL switching points within a channel occupancy time according to one embodiment of the present disclosure.

FIG. 28 illustrates exemplary DL/UL switching points within a channel occupancy time according to one embodiment of the present disclosure. The embodiment shown in FIG. 28 is for illustration only. Other embodiments could be used without departing from the scope of the present disclosure.

The maximum allowed number of DL/UL switching points within the COT can be either predefined in the specification or configurable. In one instance, the time unit is 1 ms. In another instance, if the COT duration is M NR-U slots of a given subcarrier spacing (e.g., 15 kHz SCS for sub-7 GHz NR-U), the maximum allowed number of switching points can be 2*M−1, which can be at least applied to the scenario where a UE responds a HARQ-ACK feedback to the corresponding DL transmissions once every NR-U slot duration of the given subcarrier spacing. As illustrated in FIG. 28, the time unit is the slot duration of the given subcarrier spacing, such as 15 kHz SCS for sub-7 GHz NR-U or 60 kHz SCS for above-7 GHz NR-U.

In another approach, the maximum number of switching points can be predefined in the spec, wherein the number is scalable with the LBT priority class, such as being non-decreasing as the LBT priority class increases, i.e., NR-U has lower priority to access the channel. In another approach, the maximum number of switching points can be increased with the FFP duration for FBE-based NR-U. In another approach, for a given COT, the maximum number of switching points can be increased when the subcarrier spacing for NR-U increases. In another approach, there can exist a maximum allowed number of switching points per NR-U slot, denoted by N, which can be larger than or equal to 1; or smaller than 1, in which case there can exist at most 1 DL/UL switching point every 1/N NR-U slots on average. In another approach, there can exist at most 1 DL/UL switching point every NR-U mini-slot.

In an eleventh example of the third principle, NR-U can utilize the allowance of one or multiple DL/UL switching points within a COT for UE to report HARQ-ACK feedback(s) for the corresponding downlink transmissions at the UL portion(s) of the COT. For instance, the unlicensed regulation allows the device to skip an LBT and immediately proceed with the transmission of management and control frames (e.g., ACK or block ACK frames), upon correct reception of a packet which was intended for this device. In one sub-example, if gNB does not receive a HARQ-ACK from the UE at the pre-determined location(s) for UE to respond HARQ-ACK, the gNB can treat this condition as receiving a NACK. In another sub-example, HARQ-ACK can also be treated as part of the short control signaling transmissions such that LBT can be skipped, as long as the constraints for short control signaling transmissions are satisfied.

Embodiment 8. LBT at DL/UL Switching Points for NR-U

The Embodiment 8 provides the principles and approaches for operations at DL/UL switching point(s) and the corresponding LBT requirements for NR-U, which applies to both sub-7 GHz NR-U and above-7 GHz NR-U.

Figure 29:
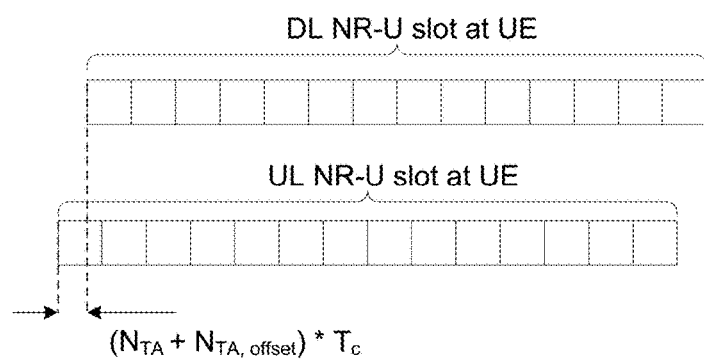
FIG. 29 illustrates an exemplary timing relation for a single LBT at an DL to UL switching point or an UL to DL switching point according to one embodiment of the present disclosure.

FIG. 29 illustrates an exemplary timing relation for a single LBT at an DL to UL switching point or an UL to DL switching point according to one embodiment of the present disclosure. The embodiment shown in FIG. 29 is for illustration only. Other embodiments could be used without departing from the scope of the present disclosure.

An important design consideration for DL/UL switching of NR-U (including both FBE and LBE based NR-U) is the timing analysis for the necessity of performing a single-shot LBT at DL to UL switching point and UL to DL switching point. In Rel-15 NR, the uplink NR-U slot transmission for UE takes place $\tau = (N_{TA} + N_{TA, offset})*T_c$ before the start of the corresponding downlink NR-U slot at the UE, wherein $T_c = 1/(4096*480 \text{ kHz})$, $N_{TA}*T_c$ represents the timing advance value of the UE (e.g., round trip delay between gNB and the UE); $N_{TA, offset}*T_c$ represents the guard period for the UL to DL switching time, which is 0 for FDD, 25560 $T_c = 13$ µs for TDD in FR1 and 13763 $T_c = 7$ is for TDD in FR2.

Figure 30:
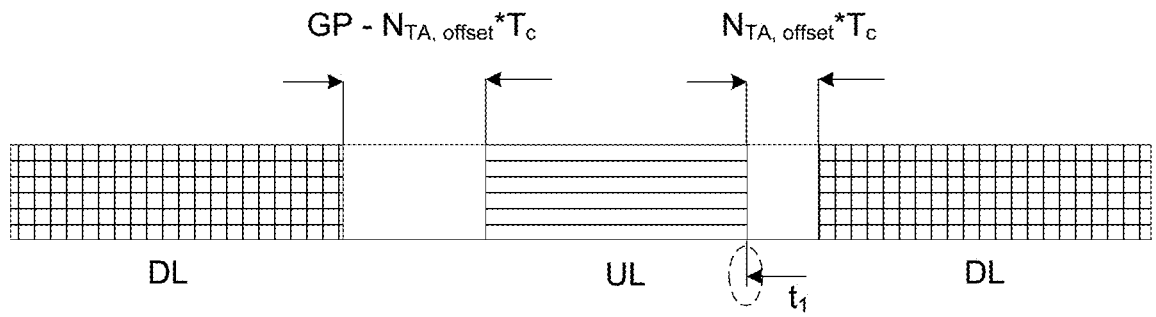
FIG. 30 illustrates an exemplary guard period timing relation for DL and UL switching points at a gNB according to one embodiment of the present disclosure.

FIG. 30 illustrates an exemplary guard period timing relation for DL and UL switching points at a gNB according to one embodiment of the present disclosure. The embodiment shown in FIG. 30 is for illustration only. Other embodiments could be used without departing from the scope of the present disclosure In a first principle of the Embodiment 8, denote by GP the total allocated guard period (GP) duration for one DL to UL switch and corresponding UL to DL switch, then GP is an integer number of NR-U OFDM symbols which needs to satisfy:

$$GP \geq = TA_{max} + N_{TA,offset}*T_c + T_{UE\ DL\text{-}UL},$$

wherein $T_{UE\ DL\text{-}UL}$ is UE RF switching time from DL (reception) to UL (transmission); $N_{TA, offset}*T_c$ accounts for the guard period allocated for the UL to DL switch; while $GP - N_{TA, offset}*T_c$ is the guard period allocated for DL to UL switch, which needs to include at least the UE RF switching time from DL to UL (i.e., $T_{UE\ DL\text{-}UL}$) and the max UE timing advance value based on the cell size (i.e., $TA_{max}$).

Figure 31:
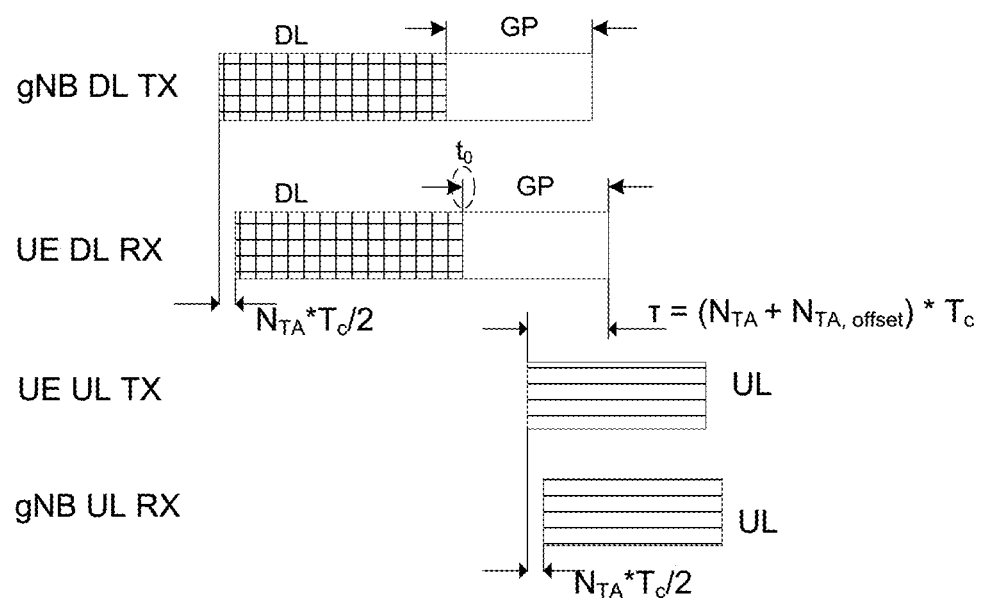
FIG. 31 illustrates another exemplary guard period timing relation for DL and UL switching points according to one embodiment of the present disclosure.

FIG. 31 illustrates another exemplary guard period timing relation for DL and UL switching points according to one embodiment of the present disclosure. The embodiment shown in FIG. 31 is for illustration only. Other embodiments could be used without departing from the scope of the present disclosure FIG. 31 shows the timing relation at both gNB side and UE side for DL to UL switching, wherein the timing advance value for the UE is $N_{TA}*T_c$ (in $T_c$ units).

In a first approach of the Embodiment 8, for a downlink to uplink switching point during a COT, if the gap duration between the start of the assigned uplink transmission and the end of previous downlink transmission is less than SIFS duration from the UE perspective (e.g., GP−τ<SIFS with τ=$(N_{TA}+N_{TA,\ offset})*T_c$), then no LBT is needed for NR-U UE to start UL transmission; and if the gap duration between the start of assigned the uplink transmission and the end of previous downlink transmission is at least SIFS duration from the UE perspective (e.g., GP−τ>=SIFS with τ=$(N_{TA}+N_{TA,\ offset})*T_c$), then at least one of the following options can be adopted by NR-U UE for the DL to UL switching.

In a first option, a UE can perform the LBT process during an observation slot within a period of PIFS duration ending before the assigned start of UL transmission inside the guard period. In one example of this option, the start time to perform the LBT process is within [max($t_0$, $t_0$+GP−τ-PIFS), $t_0$+GP−τ-observation slot], wherein to refers $t_0$ the end of DL transmission at UE as illustrated in FIG. 31.

In a second option, UE can transmit a reservation signal starting at time instance t, which is within [$t_0$+$T_{UE\ DL-UL}$, $t_0$+SIFS]; and end at $t_0$+GP−τ, wherein $t_0$ refers to the end of DL transmission at UE as illustrated in FIG. 31; in this case the LBT is not required by the UE. This option needs SIFS to be no smaller than $T_{UE\ DL-UL}$, i.e., the UE DL to UL switching time.

In a third option, UE can extend its cyclic prefix (CP) of the next uplink transmission, such that the extended CP can be transmitted from [$t_0$+t, $t_0$+GP−τ], with t within [$T_{UE\ DL-UL}$, SIFS] and $t_0$ refers to the end of DL transmission at UE as illustrated in FIG. 31. In this case, the LBT is not required by the UE for next uplink transmission. This option needs SIFS to be no smaller than $T_{UE\ DL-UL}$, i.e., the UE DL to UL switching time.

In a fourth option, UE can use a no-LBT option subject to regulation allowance and restrictions. For instance, this no-LBT option can be used when UE responds HARQ-ACK to the corresponding DL transmission, subject to unlicensed band regulation restrictions.

In an example of the first approach in the Embodiment 8, for sub-7 GHz NR-U, the observation slot duration can be 9 μs, SIFS duration can be 16 μs, and the PIFS duration can be 25 μs. In another example of the first approach in the Embodiment 8, for above-7 GHz NR-U, the observation slot duration can be 5 μs, SIFS duration can be 3 μs, and the PIFS duration can be 8 μs.

In another example of the first approach in the Embodiment 8, for sub-7 GHz NR-U, the maximum allowed UE DL to UL RF switching time $T_{UE\ DL-UL}$ is 13 μs; and for above-7 GHz NR-U, the maximum allowed UE DL to UL RF switching time $T_{UE\ DL-UL}$ is 7 μs.

In another example of the first approach in the Embodiment 8, the same value of $N_{TA,\ offset}$ from Rel-15 TDD NR in FR1 can be used for sub-7 GHz NR-U, which leads to $N_{TA,\ offset}*T_c$=13 μs. In another example of the first approach in the Embodiment 8, the same value of $N_{TA,\ offset}$ from Rel-15 TDD NR in FR2 can be used for above-7 GHz NR-U, which leads to $N_{TA,\ offset}*T_c$=7 μs.

In another example of the first approach in the Embodiment 8, if the DL to UL switching during a COT is part of a UL-DL-UL switching, then the LBT requirement at the DL to UL switching should also follow the ninth example of the third principle in Embodiment 7.

In another example of the first approach in the Embodiment 8, if LBT is needed by the UE for DL to UL switching, then GP as defined in the first principle of the Embodiment 8 needs to further satisfy that:

$$GP>=TA_{max}+N_{TA,offset}*T_c+T_{UE\ DL-UL}+\text{LBT\_time},$$

wherein LBT_time is the maximum time the LBT mechanism has available to assess the medium to determine if its busy or idle during an observation slot, which is implementation dependent and is at most the observation slot duration; the other parameters are defined the same as in the first principle of the Embodiment 8.

In another example of the first approach in the Embodiment 8, for sub-7 GHz NR-U, the LBT requirement at DL to UL switching point(s) and the guard period duration GP depend on the NR-U subcarrier spacing.

In one sub-example, for sub-7 GHz NR-U with 15 kHz SCS, GP can be of 1 OFDM symbol length, and the first option in the first approach of this embodiment is preferred for DL to UL switching within the COT, when GP−τ>=SIFS. Specifically, for sub-7 GHz NR-U, the TA offset is 13 μs, and therefore τ=(13+TA) μs, with TA denoting the timing advance value of UE. For 15 kHz SCS NR-U, which has an average symbol duration of 71.4 μs, GP of 1 OFDM symbol length is sufficient to support a cell with coverage area of up to 6.81 km. In addition, GP−τ=GP-13 μs-TA; and in order for GP−τ<=16 μs needs TA>GP−29 μs, which indicates the distance from UE to gNB needs to be at least 6.36 km. Since NR-U is mainly targeting small cell scenario with less than few kilometers cell radius, most UEs will satisfy that GP−τ is much larger than 16 μs, and the third or second option can lead to high time overhead for reserving the channel. Therefore, for NR-U with 15 kHz SCS, it is more preferred for UE to perform LBT during an observation slot at DL to UL switching point. For UEs in NR-U cells with large coverage size (e.g., more than 5 km), the second or third option may also be adopted when the corresponding time-overhead for reservation signal or extended CP is reasonable.

In another sub-example, for sub-7 GHz NR-U with 30 kHz SCS, GP can be of 1 OFDM symbol length, and the third option in the first approach of the Embodiment 8 can be used for DL to UL switching within the COT, when GP−τ>=SIFS. Specifically, for 30 kHz SCS NR-U, which has an average symbol duration of 35.7 μs, GP of 1 OFDM symbol is sufficient to support a cell with coverage area of up to 1.455 km. In addition, GP−τ=GP−13−TA; and in order for GP−τ<=16 μs needs TA>GP−29 μs, which indicates the distance from UE needs to be at least 1.005 km. For UEs that are closer to its associated gNB than 1.005 km, option 2 and option 3 are feasible to grant UL transmission at the DL to UL switching point. In one example, for option 3, UE can extend its CP for the next uplink transmission, such that the extra CP can be transmitted from [$t_0$+16 μs, $t_0$+GP−τ](time to being the start of the guard period at UE), wherein an extra copy of the UL data of (GP−29 μs−TA) duration is appended as the extra CP. Since option 3 does not need an extra LBT, and can also potentially facilitate the decoding of the uplink data, it is the more preferred option for the 30 kHz SCS NR-U. By contrast, in order to use option 1, the GP needs to be GP>=$TA_{max}$+$N_{TA,\ offset}*T_c$+$T_{UE\ DL-UL}$+LBT_time, this means $TA_{max}$<=0.7 μs assuming $T_{UE\ DL-UL}$=13 μs and LBT_time=9 µs, which corresponds to a max cell size of 105 meters, which is too small for most NR-U application scenario. Therefore, option 1 is infeasible for most NR-U scenarios with 30 kHz SCS and GP of 1 symbol.

In another sub-example, for sub-7 GHz NR-U with 60 kHz SCS, GP can be of 2 OFDM symbols, and the third option in the first approach of the Embodiment 8 is preferred for DL to UL switching within the COT, when GP−τ>=SIFS. For 60 kHz SCS NR-U, which has an average symbol duration of 17.8 µs, GP of at least 2 OFDM symbols is needed to meet the first principle of the Embodiment 8. When the GP is of 2 OFDM symbols, the analysis will be the same as in the case of 30 kHz SCS NR-U with GP of 1 OFDM symbol, and thus option 3 is preferred for UEs and LBT for DL to UL switching is not needed.

In another sub-example, for sub-7 GHz NR-U with 60 kHz SCS, GP can be of 1 OFDM symbol. In this case, a smaller $N_{TA, offset}$ and/or $T_{UE\ DL-UL}$ may be needed, such that the first principle of the Embodiment 8 can be met, and LBT is not needed by the UE at the DL to UL switching point.

In another sub-example, for sub-7 GHz NR-U with 30 kHz SCS and 60 kHz SCS, the GP can be more than 1 OFDM symbol and 2 OFDM symbols respectively to support NR-U cells with large coverage size (e.g., more than 1.5 km), in which case the first option in the first approach of the Embodiment 8 can be used for DL to UL switching within the COT, when GP−τ>=SIFS.

In another sub-example, for sub-7 GHz NR-U, the sub-carrier spacing can be larger than 60 kHz, such as 120 kHz, and the GP can be more than 1 OFDM symbol for DL to UL switching within the COT.

In another example of the first approach in the Embodiment 8, UE is required to perform LBT at the DL to UL switch point, when NR-U UE RF switching time from DL to UL is more than SIFS, irrespective of the NR-U subcarrier spacing. This is because the UE is unable to start UL transmission within SIFS duration after the end of previous DL transmission, thus the second and third option in the first approach of the Embodiment 8 cannot be applied. In one sub-example, this scenario can be applied to the above-7 GHz NR-U. For instance, NR-U at 60 GHz band has a SIFS duration of 3 µs, which is smaller the 7 µs maximum allowed UE RF switching time from DL to UL, and thus LBT is required for UEs with an RF switching time from DL to UL larger than 3 µs, which is typically the case. In another sub-example, for above-7 GHz NR-U that needs to perform LBT at the DL to UL switching point, GP needs to satisfy that: $GP \geq TA_{max}+N_{TA, offset}*T_c+T_{UE\ DL-UL}+LBT\_time$, which leads to GP>=6.67+7+7+5=25.67 µs assuming the max cell radius is 1 km, $T_{UE\ DL-UL}$=7 µs and LBT_time=5 µs. This indicates the corresponding GP needs to be at least 2 OFDM symbols and 3 OFDM symbols respectively for above-7 GHz NR-U with 60 kHz SCS and 120 kHz SCS respectively.

In a second approach of the Embodiment 8, for UL to DL switching during a COT, if the gap duration between the start of the assigned downlink transmission and the end of previous uplink transmission is less than SIFS duration from the gNB perspective (i.e., $N_{TA, offset}*T_c$<SIFS), then no LBT is needed for gNB to start the DL transmission; while if the gap duration between the start of the assigned downlink transmission and the end of previous uplink transmission is at least SIFS duration from the gNB perspective (i.e., $N_{TA, offset}*T_c$>=SIFS), then at least one of the following options can be adopted by NR-U gNB for the UL to DL switching:

In a first option, gNB can perform LBT during an observation slot within a period of PIFS duration ending before the assigned start of DL transmission. In one example of this option, the start time to perform the LBT is within [max($t_1$, $t_1+N_{TA, offset}*T_c$−PIFS), $t_1+N_{TA, offset}*T_c$−observation slot], wherein $t_1$ refers to the end of UL reception at gNB, as illustrated in FIG. 30.

In a second option, gNB can transmit a reservation signal starting at time instance t, which is within [$t_1+T_{gNB\ UL-DL}$, $t_1$+SIFS]; and end at $t_1+N_{TA, offset}*T_c$, wherein $t_1$ refers to the end of UL reception at gNB, as illustrated in FIG. 8; in this case the LBT is not required by the gNB. This option needs SIFS to be no smaller than $T_{gNB\ UL-DL}$, i.e., the gNB UL (reception) to DL (transmission) RF switching time.

In a third option, gNB can extend its cyclic prefix (CP) of the next uplink transmission, such that the extended CP can be transmitted from [$t_1$+t, $t_1+N_{TA, offset}*T_c$], with t within [$T_{gNB\ UL-DL}$, SIFS] and $t_1$ refers to the end of UL reception at gNB, as illustrated in FIG. 30. In this case, the LBT is not required by the gNB for next downlink transmission. This option needs SIFS to be no smaller than $T_{gNB\ UL-DL}$, i.e., the gNB UL to DL RF switching time.

In a fourth option, gNB can use a no-LBT option subject to regulation allowance and restrictions.

In an example of the second approach in the Embodiment 8, for sub-7 GHz NR-U, the observation slot duration can be 9 µs, SIFS duration can be 16 µs, and the PIFS duration can be 25 µs. In another example of the second approach in the Embodiment 8, for above-7 GHz NR-U, the observation slot duration can be 5 µs, SIFS duration can be 3 µs, and the PIFS duration can be 8 µs.

In another example of the second approach in the Embodiment 8, same value of $N_{TA, offset}$ from TDD Rel-15 NR can be applied to incorporate the UL to DL switching time for NR-U, which can be 13 µs for sub-7 GHz NR-U, and 7 µs for above-7 GHz NR-U.

In another example of the second approach in the Embodiment 8, if the UL to DL switching during a COT is part of the DL-UL-DL switching, then the LBT requirement at the UL to DL switching should also follow the eighth example of the third principle in Embodiment 7.

In another example of the second approach in the Embodiment 8, if LBT is needed by the gNB for UL to DL switching, then the guard period for UL to DL switch needs to be at least $T_{gNB\ UL-DL}$+LBT_time, wherein LBT_time is the maximum time the LBT mechanism has available to assess the medium to determine if its busy or idle during an observation slot, which is implementation dependent and is at most the observation slot duration; and $T_{gNB\ UL-DL}$ is the gNB UL reception to DL transmission RF switching time.

In another example of the second approach in the Embodiment 8, for sub-7 GHz NR-U, gNB does not need to perform LBT when switching from UL to DL, irrespective of the subcarrier spacing. This is because for sub-7 GHz NR-U, the guard period for UL to DL switching is contained within $N_{TA, offset}*T_c$, which is 13 µs and is always smaller than the SIFS duration of 16 µs for sub-7 GHz unlicensed bands.

In yet another example of the second approach in the Embodiment 8, for above-7 GHz NR-U, if the same value of $N_{TA, offset}$ from Rel-15 NR is used for NR-U, then the gap duration between the start of the assigned downlink transmission and the end of previous uplink transmission is larger than the SIFS duration. This is because for above-7 GHz NR-U, the guard period for UL to DL switching is 7 µs, which is larger than the SIFS duration for above-7 GHz unlicensed bands, i.e., 3 µs for 60 GHz unlicensed bands. In one sub-example, if the gNB RF switching time from UL to DL satisfy that $T_{gNB\ UL-DL}$<SIFS, then the second option or the third option of the second approach of the Embodiment 8 can be utilized, such that no LBT is needed by gNB for UL to DL switching. In another sub-example, if the gNB RF switching time from UL to DL satisfies that $T_{gNB\ UL-DL}$>=SIFS and that $N_{TA,\ offset}*T_c$>=$T_{gNB\ UL-DL}$+LBT_time, then LBT can be performed by gNB during an observation slot within the guard period $N_{TA,\ offset}*T_c$ for UL to DL switching.

In yet another example of the second approach in the Embodiment 8, for above-7 GHz NR-U, if the gNB RF switching time from UL to DL satisfies that $T_{gNB\ UL-DL}$>=SIFS and that $T_{gNB\ UL-DL}$+LBT_time>7 µs, then LBT needs to be performed by gNB during an observation slot within the guard period allocated for UL to DL switching, and at least one of the following options for the duration of the guard period for UL to DL switching can be adopted:

In a first option of this example, a larger value of $N_{TA,\ offset}$ than that of Rel-15 NR can be adopted for above-7 GHz NR-U, such that $N_{TA,\ offset}*T_c$ is enough for RF switching from UL to DL and the LBT operation for gNB, i.e., $N_{TA,\ offset}*T_c$>=$T_{gNB\ UL-DL}$+LBT_time. Note this also affects the GP, which is the total allocated guard period for both DL to UL and UL to DL guards, such that GP needs to satisfy that GP>=$TA_{max}$+$T_{gNB\ UL-DL}$+$N_{TA,\ offset}*T_c$>=$TA_{max}$+$T_{gNB\ UL-DL}$+LBT_time+$T_{UE\ DL-UL}$.

In a second option of this example, the gNB can extend the guard period allocated for UL to DL switching (or equivalently postpone the start of assigned DL transmission), such that it is enough for RF switching from UL to DL and the LBT operation for gNB. In addition, the gNB can align the end of this guard period to the NR-U OFDM symbol or mini-slot boundary. Note this option does not require changing the value of $N_{TA,\ offset}$ from Rel-15 NR.

In a third approach of the Embodiment 8, when LBT is needed at the DL to UL switching point or UL to DL switching point, the number of LBT attempt(s) that is allowed to grant the UL transmission or the DL transmission respectively within the current COT can be can be either predefined in the spec or configurable.

In one example of the third approach, the maximum number of allowed LBT attempt(s) can be predefined in the spec as a fixed number, such as N (N>=1). In one sub-example, N can be 1, which means at most 1 LBT attempt can be allowed, and the UL data or DL data will not be transmitted if the LBT fails. In another sub-example, N can be infinity, which means there is not an upper limit to the number of LBT attempts.

In another example of the third approach, the maximum number of allowed LBT attempt(s) can be scalable and non-decreasing with the duration of the assigned UL transmission for DL to UL transmission, or the assigned DL transmission for the UL to DL transmission. In one sub-example, if the desired duration of the assigned UL or DL transmission is T, then the maximum number of allowed LBT attempts can be min(ceil(T/$t_0$), M), wherein M>=1 is the maximum allowed LBT attempts which can be infinity, and $t_0$ can refer to sometime interval such as one NR-U OFDM symbol duration, one NR-U mini-slot duration (2/4/7 OFDM symbols), one NR-U slot duration, or any other arbitrary number of NR-U symbols duration. For instance, if the desired duration of the assigned UL transmission at DL to UL switching point is one symbol (e.g., for HARQ-ACK in self-contained slot), and $t_0$ is one NR-U slot, then the max number of LBT attempts is 1. In another instance, if the desired duration of the assigned UL or DL transmission is 10 NR-U slots, and $t_0$ is one NR-U slot, then the maximum number of allowed LBT attempts can be 10.

In another example of the third approach, the maximum number of allowed LBT attempt(s) at the DL to UL switching point or UL to DL switching point can be scalable with the COT duration, and/or the packet duration for the UL transmission or DL transmission respectively. In one sub-example, the COT duration can be referred to as the entire duration of the current COT; or the COT duration can be referred to as the remaining duration of the current COT. In another sub-example, subject to a maximum number of LBT attempts which can be predefined in the spec, the number of LBT attempts can have no limit as long as the corresponding UL transmission (for DL to UL switching) or DL transmission (for UL to DL switching) can start within the COT. In another sub-example, subject to a maximum number of LBT attempts which can be predefined in the spec, the number of LBT attempts can have no limit as long as the corresponding UL transmission (for DL to UL switching) or DL transmission (for UL to DL switching) can be entirely contained within the COT.

In another example of the third approach, a time interval for adjacent LBT attempts can be configured at the DL/UL switching points; wherein if the current LBT attempt fails, the starting time for the next LBT attempt can follow one of the following options: (1) if the single-shot LBT of PIFS duration fails, the next LBT attempts can start immediately in the next PIFS duration; this option means the interval between two adjacent LBT attempts can be PIFS (i.e., 25 µs in 5 GHz band and 8 µs in 60 GHz band); (2) the next LBT can start after certain interval from the start of the previous LBT attempt, which can be an NR-U OFDM symbol duration, or one NR-U mini-slot duration (2/4/7 OFDM symbols), or one NR-U slot duration, or any other arbitrary number of NR-U symbols duration. In one sub-example, the maximum allowed number of LBT switching points can be correspondingly determined as the min(ceil(T/$t_0$), M), wherein T can be the desired duration of the assigned UL or DL transmission, or the remaining COT duration, or the minimum of the desired duration of the assigned UL or DL transmission and the remaining COT duration; to is the time interval for adjacent LBT attempts; and M>=1 is the maximum allowed LBT attempts by the spec, wherein M can be infinity, in which case there is no cap for the number of LBT attempts by the spec. For instance, if the first option in this example is used, this means as long as the number of LBT attempts does not exceed the maximum value allowed by the spec (i.e., M in the sub-example), there is no limit on the number of LBT attempts.

In another example of the third approach, a starting time for adjacent LBT attempts can be configured at the DL/UL switching points; wherein if the current LBT attempt fails, the starting time for the next LBT attempt can be immediately before the NR-U OFDM symbol/NR-U mini-slot/NR-U slot/ms boundary, such that the transmission after DL/UL switching can start at NR-U OFDM symbol/NR-U mini-slot/NR-U slot/ms boundary if LBT passes.

In another example of the third approach, if all the allowed LBT attempt within current COT fails for the assigned UL transmission at the DL to UL switching point, or the assigned DL transmission at the UL to DL switching point, the UE or gNB respectively can attempt CAT-4 LBT like LBT outside the current COT for the assigned UL transmission or DL transmission. In one sub-example, the COT associated with new CAT-4 LBT can be adjusted (either longer, shorter, or remain the same as the previous COT) to contain the assigned UL transmission or DL transmission. This can be up to network implementation to determine the COT.

In another example of the third approach, if all the allowed LBT attempt within current COT fails for the assigned UL transmission at the DL to UL switching point, or the assigned DL transmission at the UL to DL switching point, the UE or gNB can discard the assigned UL data or DL data respectively.

In another example of the third approach, if the assigned UL transmission (or assigned DL transmission) at the DL to UL switching point (or UL to DL switching point) is not finished within the remaining COT, the UE (or the gNB) can attempt CAT-4 LBT like LBT outside the current COT to transmit the remaining UL transmission (or DL transmission). In one sub-example, the COT associated with new CAT-4 LBT can be adjusted (either longer, shorter, or remain the same as the previous COT) to contain the remaining UL transmission or DL transmission. This can be up to network implementation to determine the COT.

In another example of the third approach, if the assigned UL transmission (or assigned DL transmission) at the DL to UL switching point (or UL to DL switching point) is not finished within the remaining COT, the UE (or the gNB) can discard the remaining UL transmission (or DL transmission).

Figure 32:
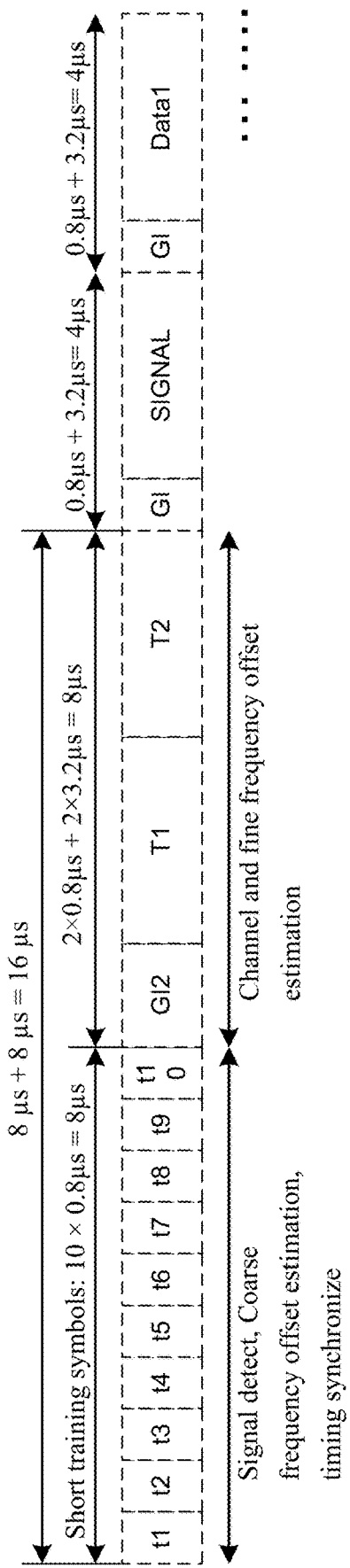
FIG. 32 illustrates exemplary short preamble symbols of the 802.11 preamble.

FIG. 32 illustrates exemplary short preamble symbols of the 802.11 preamble. For the short preamble symbols of the 802.11 preamble, the repetition of 0.8 µs is achieved by only allowing OFDM subcarriers with indices that are a multiple of 4 to have non-zero amplitude, which results in a periodicity of 0.8 µs given the IFFT/FFT period of 3.2 µs and subcarrier spacing of 312.5 kHz (i.e., 20 MHz/64) for the 802.11 system. The IEEE 802.11 preambles as illustrated in FIG. 32 can be detected through auto-correlation based algorithms by utilizing the repeated short training symbols structure, or through cross-correlation based algorithms by utilizing the known short or long training sequence as the local reference signal.

If the 802.11 preamble portion is present in an OFDM transmission, and it is received at a receive level equal to or greater than the receiver minimum input level sensitivity (which is also referred to as PDT, e.g., −82 dBm for 20 MHz channel), the Wi-Fi device shall indicate the clear channel assessment (CCA) as busy with a probability >90% within 4 µs. This mechanism can be referred to as preamble detection (PD). If the 802.11 preamble is absent, the Wi-Fi device shall indicate CCA as busy for any signal 20 dB above the receiver minimum input level sensitivity (which is also referred to as EDT, e.g., −62 dBm for 20 MHz channel). This mechanism can be referred to as energy detection (ED).

Without the introduction of Wi-Fi preamble to a NR system, Wi-Fi system can only detect the existence of NR in unlicensed system through the energy detection mechanism, which can have negative impacts on the SINR and rate performance for Wi-Fi due to the much higher ED threshold (EDT) compared to PD threshold (PDT). By contrast, if NR unlicensed system (NR-U) supports to transmit the 802.11-like preamble that is also detectable by Wi-Fi, the preamble detection mechanism can be used instead of the energy detection mechanism for NR-U and Wi-Fi coexistence, which can have the benefits of improved coexistence between NR-U and Wi-Fi, better SINR and rate performance for Wi-Fi and NR-U, reduced Wi-Fi power consumption, etc.

This disclosure provides the common preamble design of NR-U that can be detected by both NR-U and Wi-Fi, including the potential changes to the NR-U channel access procedure, sequence design, and time/frequency resource for this common preamble of NR-U and Wi-Fi.

Embodiment 9. Channel Access Procedure with Common Preamble for NR-U and Wi-Fi

A first embodiment includes the changes to specifications on the channel access procedure, when NR-U supports a common preamble for NR-U and Wi-Fi.

In a first approach of this embodiment, the common preamble for NR-U and Wi-Fi refers to the preamble for NR-U that can be detected by the NR-U device, as well as the Wi-Fi device through existing Wi-Fi preamble detection algorithms.

In one example of the first approach of the Embodiment 9, the Wi-Fi receiver can detect the existence of the common preamble through auto-correlation-based algorithms or cross-correlation based algorithms.

In another example of the first approach, in order for the Wi-Fi receiver to correctly detect the common preamble, the NR-U channel allocation can choose from the set of valid operating channel numbers defined by regional unlicensed regulations for corresponding unlicensed band. In one sub-example, for 5 GHz unlicensed band, this means the NR-U channel bandwidth is integer multiple of 20 MHz, with each 20 MHz sub-band following the valid channel center frequencies allowed by regulatory domain. In addition, the common preamble can be transmitted over one or multiple of such 20 MHz sub-bands.

In another example of the first approach of this example, with the support of common preamble for NR-U and Wi-Fi, carrier sense clear channel assessment (CS/CCA) mechanism (or preamble detection mechanism) can be utilized by Wi-Fi in addition to energy detection in detecting the NR-U preamble. The preamble detection threshold for Wi-Fi device in detecting the NR-U common preamble can be the minimum modulation and coding rate sensitivity of Wi-Fi that corresponds to the channel bandwidth, wherein 802.11a device can perform preamble detection with −82 dBm threshold at 20 MHz channel; 802.11n device can perform preamble detection with −82 dBm threshold at 20 MHz channel or −79 dBm threshold at 40 MHz channel; 802.11ac device can perform preamble detection with −82 dBm threshold at the primary 20 MHz channel.

Figure 33A:
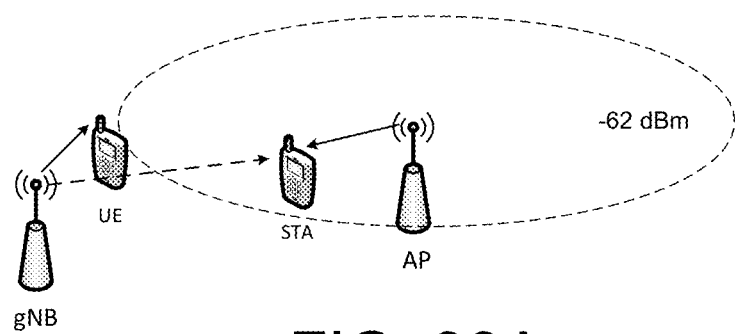
FIGS. 33A and 33B illustrates exemplary embodiments in which a Wi-Fi AP is performing a CCA to determine channel availability while an NR-U gNB starts transmission after passing the CCA according to embodiments of the present disclosure
Figure 33B:
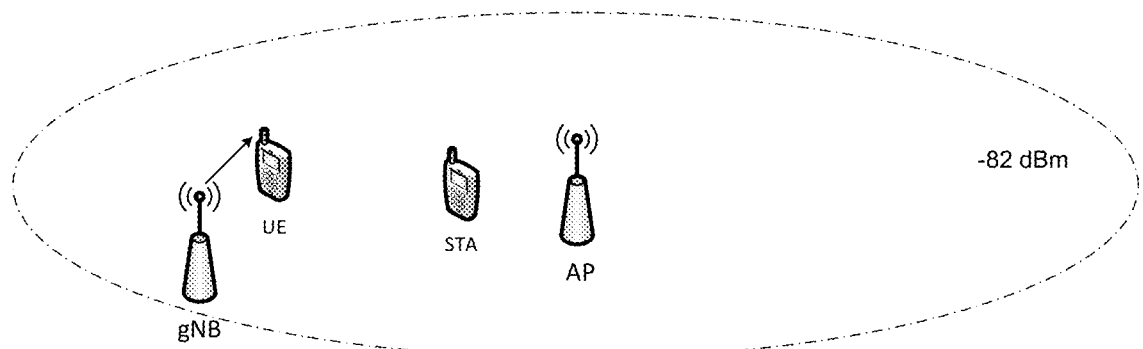

FIGS. 33A and 33B illustrates exemplary embodiments in which a Wi-Fi AP is performing a CCA to determine channel availability while an NR-U gNB starts transmission after passing the CCA according to embodiments of the present disclosure. The embodiments shown in FIGS. 33A and 34B are for illustration only. Other embodiments could be used without departing from the scope of the present disclosure.

As shown in FIG. 33A, the NR-U does not support the common preamble, and a Wi-Fi AP determines channel as available since the AP received power from the gNB is below −62 dBm; in FIG. 33B, NR-U first transmits the common preamble, and Wi-Fi detects the existence common preamble through the preamble detection mechanism. As a result, the Wi-Fi station (STA) in FIG. 33A will have low SINR due to the strong interference from gNB, which may significantly lower the rate or cause retransmissions for Wi-Fi AP. By contrast, the preamble detection mechanism in FIG. 33B can facilitate Wi-Fi to avoid transmissions from Wi-Fi AP to STA with low SINR and save power.

In another example of the first approach of this example, with the support of NR-U common preamble, carrier sense clear channel assessment (CS/CCA) mechanism (or preamble detection mechanism) can be utilized by NR-U as the supported channel access procedures. In one sub-example, with the CS/CCA mechanism for NR-U, the channel is considered as busy by an NR-U device if any NR-U common preamble is detected and the corresponding received power of the detected preamble at the NR-U device exceeds the CS/CCA detection threshold or preamble detection threshold (PDT) within a certain channel sensing duration. In another sub-example, due to similar structure of NR-U common preamble and existing Wi-Fi preamble at least in the time-domain, NR-U device may also optionally be implemented to have the capability to detect Wi-Fi preambles through auto-correlation or cross-correlation based detection algorithms. In another sub-example, the PDT for NR-U common preamble by NR-U, and the PDT for Wi-Fi preamble by NR-U if NR-U device is able to detect Wi-Fi preamble, can be chosen the same as the Wi-Fi preamble detection threshold for corresponding bandwidth, which can be −82 dBm at 20 MHz channel or −79 dBm threshold at 40 MHz channel.

In another example of the first approach of this example, NR-U can utilize the CS/CCA mechanism in combination with the energy detection mechanism, such that within a certain channel sensing duration, the observation channel is considered as busy by an NR-U device according to one of the following sub-examples; wherein the preamble refers to the NR-U common preamble, or both NR-U common preamble and Wi-Fi preamble if NR-U device is able to detect Wi-Fi preamble as well.

In one sub-example, the channel is considered as busy if the total energy received in the observation channel exceeds energy detection threshold.

In one sub-example, the channel is considered as busy if the total energy received in the observation channel exceeds energy detection threshold AND any preamble that exceeds the PDT is detected.

In one sub-example, the channel is considered as busy if the total energy received in the observation channel exceeds energy detection threshold OR any preamble that exceeds the PDT is detected.

In one sub-example, the channel is considered as busy any preamble that exceeds the PDT is detected.

In another sub-example, the energy detection threshold (EDT) for NR-U when NR-U supports the common preamble, can be chosen to be the same as that of Wi-Fi preamble detection threshold for corresponding bandwidth. For instance, the EDT can be −62 dBm at 20 MHz channel or −59 dBm threshold at 40 MHz channel.

In another sub-example, the above rules in determining if an observation channel is busy can be used by the single-shot LBT procedure, wherein the channel sensing duration is the PIFS duration in the unlicensed band (e.g., 25 μs in 5 GHz unlicensed band).

In another sub-example, the above rules in determining if an observation channel is busy can be used by the CAT-4 LBT procedure, wherein the channel sensing duration in decrementing the backoff counter can be the of an observation slot (e.g., 9 μs in 5 GHz unlicensed band). In another sub-example, NR-U can utilize one of the rules in determining if an observation channel is busy by default, which can also be configurable through higher layer parameter.

In another example of the first approach of the Embodiment 9, the applicable unlicensed band for enabling the NR-U to support a common preamble can include the 5 GHz unlicensed band, and/or 6 GHz unlicensed band, and/or unlicensed bands in FR2 (e.g., 60 GHz band).

Embodiment 10. Designs for Common Preamble of NR-U

The Embodiment 10 provides the approaches for the common preamble design for NR-U.

In a first approach of the Embodiment 10, the NR-U preamble can directly reuse Wi-Fi preamble design and follow the Wi-Fi 802.11 OFDM timing-related parameters.

In one example of the first approach of the Embodiment 10, the NR-U preamble can follow the 802.11a training sequence, wherein the subcarrier spacing is 312.5 kHz for 802.11 system, with the FFT/IFFT size for 20 MHz channel being 64, among which the total number of subcarriers is 52 (48 data carriers and 4 pilot subcarriers). The short OFDM training symbol consists of only 12 subcarriers out of 52 subcarriers, and subcarriers with indices of multiple of 4 have non-zero amplitude; while the long training sequence consists of 53 subcarriers (including a zeros value at DC subcarrier). The details of the sequences are provided in IEEE Std 802.11-2016, "Part 11: Wireless LAN Medium Access Control (MAC) and Physical Layer (PHY) Specifications", 2016, with an illustration of the 802.11a preamble provided in FIG. 32.

In one sub-example, the NR-U common preamble can only consist of the short training symbols part of 802.11a preamble with 10×0.8 μs duration, which can be detected by the neighboring Wi-Fi devices. In another sub-example, the NR-U common preamble can consist of both the short training symbols and long training symbols of 802.11a preamble with 8+8 μs duration. In another sub-example, the NR-U common preamble can consist of the short training symbols, the long training symbols of 802.11a preamble, and the SIG field of the 802.11a preamble with 8+8+4 μs duration. In another sub-example, this example can be used for NR-U in the 5 GHz unlicensed band. In another sub-example, this example can be used for NR-U in the 6 GHz unlicensed band.

In another example of the first approach of the Embodiment 10, the NR-U preamble can follow the non-HT short training field (i.e., L-STF), or both the L-STF and the non-HT long training field (L-LTF) of the 802.1 in HT and 802.11ac VHT system. In particular, the L-STF and L-LTF bandwidth can be 20 MHz, 40 MHz, 80 MHz, 160 MHz, or 80 MHz+80 MHz (i.e., aggregation of 2 non-contiguous 80 MHz channel). The duration for L-STF is 10×0.8 μs=8 μs, while the duration for L-LTF is also 8 μs as in 802.11a. In another sub-example, this example can be used for NR-U in the 5 GHz unlicensed band. In another sub-example, this example can be used for NR-U in the 6 GHz unlicensed band.

In another example of the first approach of the Embodiment 10, the NR-U preamble can follow the HT-Greenfield short training field (HT-GF-STF) of the 802.11n HT system. In particular, the HT-GF-STF bandwidth can be 20 MHz or 40 MHz as detailed in [6], and the duration for HT-GF-STF is 10×0.8 μs=8 μs. In another sub-example, this example can be used for NR-U in the 5 GHz unlicensed band. In another sub-example, this example can be used for NR-U in the 6 GHz unlicensed band.

In another example of the first approach of the Embodiment 10, the NR-U preamble can follow the high efficient (HE) part of the preamble of 802.1 lax HE system. In one sub-example, this example can be used for NR-U in the 5 GHz unlicensed band. In one sub-example, this example can be used for NR-U in the 6 GHz unlicensed band.

In another example of the first approach of the Embodiment 10, in order to for NR-U to directly reuse the Wi-Fi preamble sequence, the NR-U device needs to support the Wi-Fi 802.11 transmitter block processing for generating the Wi-Fi preamble sequence (e.g., subcarrier spacing of 312.5 kHz and FFT size of 64 over 20/40 MHz channel), either through the existing NR-U RF module or supporting a separate RF module for Wi-Fi processing at the NR-U device.

In addition to the supported preamble sequence, another important design consideration is time position to transmit such NR-U common preamble that reuses Wi-Fi preamble.

Figure 34A:
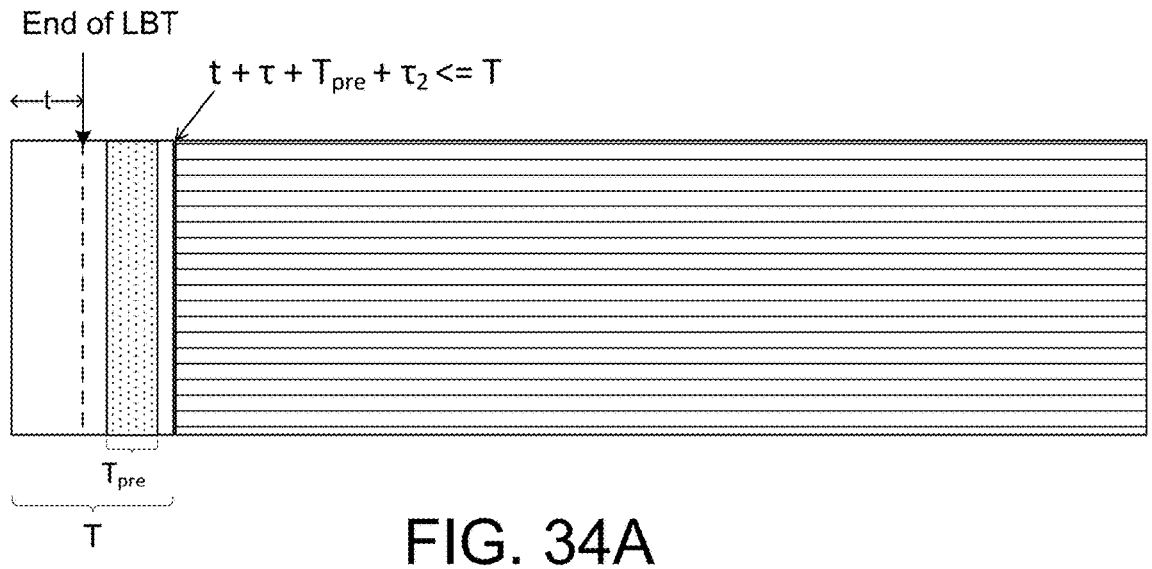
FIGS. 34A and 34B illustrate exemplary fixed frame periods with a NR-U preamble in according to one embodiment of the present disclosure.
Figure 34B:
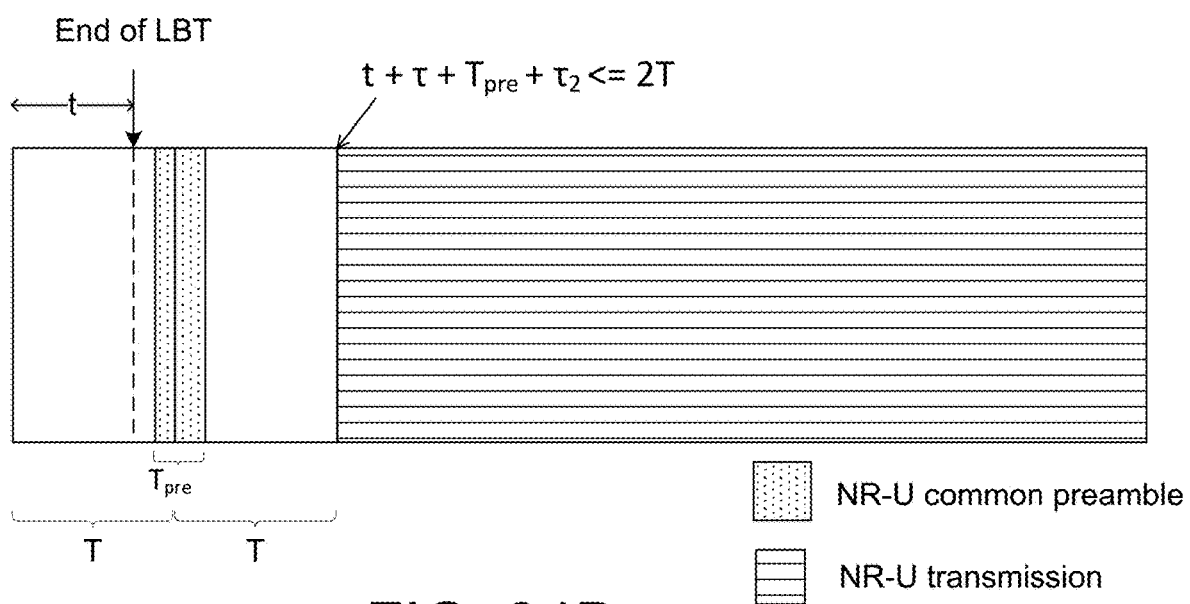

FIGS. 34A and 34B illustrate exemplary fixed frame periods with a NR-U preamble in according to embodiments of the present disclosure. The embodiments shown in FIGS. 34A and 34B are for illustration only. Other embodiments could be used without departing from the scope of the present disclosure.

In one example of the first approach of the Embodiment 10, the NR-U common preamble can be transmitted after the LBT is successfully completed plus some additional processing time $\tau$. The processing time $\tau$ takes into consideration the processing time for NR-U transmitter to switch from LBT to transmit NR-U preamble using Wi-Fi timing-related parameters; or the time for NR-U transmitter to switch to transmit using the Wi-Fi RF module (if supported); which can be implementation dependent. Denote by T the NR-U OFDM symbol duration, t ($0 \leq t \leq T$) the time instance of LBT completion with respect to the start of the NR-U OFDM symbol that contains this time instance, $T_{pre}$ the NR-U preamble duration, and $\tau_2$ the additional processing time for NR-U transmitter to switch from transmitting the preamble to transmitting NR-U signal/channel (e.g., PDCCH/PDSCH).

- In one sub-example, an NR-U preamble can be transmitted within the same NR-U OFDM symbol in which the LBT is completed, if $t+\tau+T_{pre}+\tau_2 \leq T$. FIG. 34A provides an illustration of this sub-example.
- In another sub-example, if $t+\tau+T_{pre}+\tau_2 > T$, the NR-U preamble can either be transmitted across two NR-U OFDM symbols or transmitted within the NR-U OFDM symbol that comes after the NR-U OFDM symbol in which an LBT is completed. Since the duration of the NR-U preamble in this approach is either 8 μs or 16 μs, higher NR-U subcarrier spacing such as 60 kHz or 30 kHz is more suitable in supporting this sub-example, which can avoid or reduce the chance for a gap larger than 25 μs between the end of NR-U preamble and the start of next NR-U transmission within the COT. FIG. 34B provides an illustration of this sub-example.
- In another sub-example, the earliest NR-U OFDM symbol within the COT wherein the NR-U transmitter can start to transmit NR-U signal/channel (e.g., PDCCH/PDSCH), is the earliest NR-U OFDM symbol that comes after time instance $t+\tau+T_{pre}+\tau_2$ starting at the start of NR-U OFDM symbol wherein LBT is completed. FIG. 34B provides illustrations of this sub-example.

In a second approach of the Embodiment 10, the NR-U common preamble can be transmitted through NR-U resource grid, such that the continuous-time OFDM baseband signal for the common preamble can have a periodic repetition pattern that can be detected by NR-U receiver, as well as the Wi-Fi receiver.

In a first example of the second approach of the Embodiment 10, the period of the repetition pattern for NR-U common preamble can be close to the 0.8 μs period of 802.11 short training symbol, with a difference less than the 0.05 μs sample duration of Wi-Fi 802.11 system. This can be referred to as the short NR-U common preamble. In one sub-example, with such repetition pattern for NR-U common preamble, the NR-U device can detect the existence of NR-U common preamble through either auto-correlation based algorithms or cross-correlation based algorithms. In another sub-example, with such repetition pattern for NR-U common preamble, the Wi-Fi device can detect the existence of NR-U common preamble at least through auto-correlation based algorithms.

In a second example of the second approach of the Embodiment 10, in addition to supporting the first example of the second approach of this example, the NR-U common preamble can further include a longer preamble sequence with a repetition pattern with a periodicity close to the 3.2 μs period of 802.11 long training symbol, with a difference less than one or few of the 0.05 μs sample duration of 802.11 system. This can be referred to as the long NR-U common preamble.

In a third example of the second approach of the Embodiment 10, the repetition pattern for NR-U common preamble can be achieved by having the periodicity of $1/(\Delta f \Delta \times \delta)$, wherein $\Delta f$ is the subcarrier spacing of the preamble which shares the subcarrier spacing of NR-U; and $\delta$ is an integer parameter such that the common NR-U preamble sequence can potentially have non-zero amplitudes on NR-U subcarriers within the resource grid with indices $i \times \delta + N_{grid,x}^{size,\mu} N_{SC}^{RB}/2 - k_0^{\mu}$ and zero amplitude otherwise; wherein i is an integer, $N_{grid,x}^{size,\mu}$ is the resource grid size in unit of PRB, $N_{SC}^{RB}$ is number of subcarriers per PRB, and $k_0^{\mu}$ is defined in Section 5.3.1 of 3GPP TS 38.211 v15.4.0, "NR, Physical channels and modulation," Specifically, the time-continuous OFDM baseband signal of NR-U common preamble on antenna port p and subcarrier spacing μ for OFDM symbol l is given by:

$$s_l^{(p,\mu)}(t) = \sum_{k=0}^{N_{grid,x}^{size,\mu} N_{SC}^{RB}/2-1} a_{k,l}^{(p,\mu)} \times \exp[j2\pi(k+k_0^{\mu}-N_{grid,x}^{size,\mu} N_{SC}^{RB}/2)\Delta f(t-N_{CP,l}^{\mu} T_c - t_{start,l}^{\mu})],$$

wherein $a_{k,l}^{(p,\mu)}$ is the complex symbol of the NR-U common preamble sequence transmitted at subcarrier k and OFDM symbol l at antenna port p; $N_{CP,l}^{\mu}$ is the CP length in the unit of $T_c$, and $t_{start,l}^{\mu}$ is the start time of OFDM symbol l. For the NR-U common preamble sequence of this example, it satisfies that $|a_{k,l}^{(p,\mu)}|=0$ for any $k \neq i \times \delta + N_{grid,x}^{size,\mu} N_{SC}^{RB}/2 - k_0^{\mu}$, with $i_m \leq i \leq i_M$ and $i_m = \lceil (k_0^{\mu} - N_{grid,x}^{size,\mu} N_{SC}^{RB}/2)/\delta \rceil$; $i_M = \lfloor (k_0^{\mu} + N_{grid,x}^{size,\mu} N_{SC}^{RB}/2-1)/\delta \rfloor$. As a result, the time-continuous OFDM baseband signal for the common NR-U preamble is given by: $s_l^{(p,\mu)}(t) = \sum_{i=i_m}^{i_M} a_{i \times \delta N_{grid,x}^{size,\mu} N_{SC}^{RB}/2 - k_o^{\mu},l} \times \exp[j2\pi i \delta \Delta f(t-N_{CP,l}^{\mu} T_c - t_{start,l}^{\mu})]$, which is a periodic signal that satisfies $s_l^{(p,\mu)}(t) = s_l^{(p,\mu)}(t+1/\delta \Delta f)$.

Figure 35:
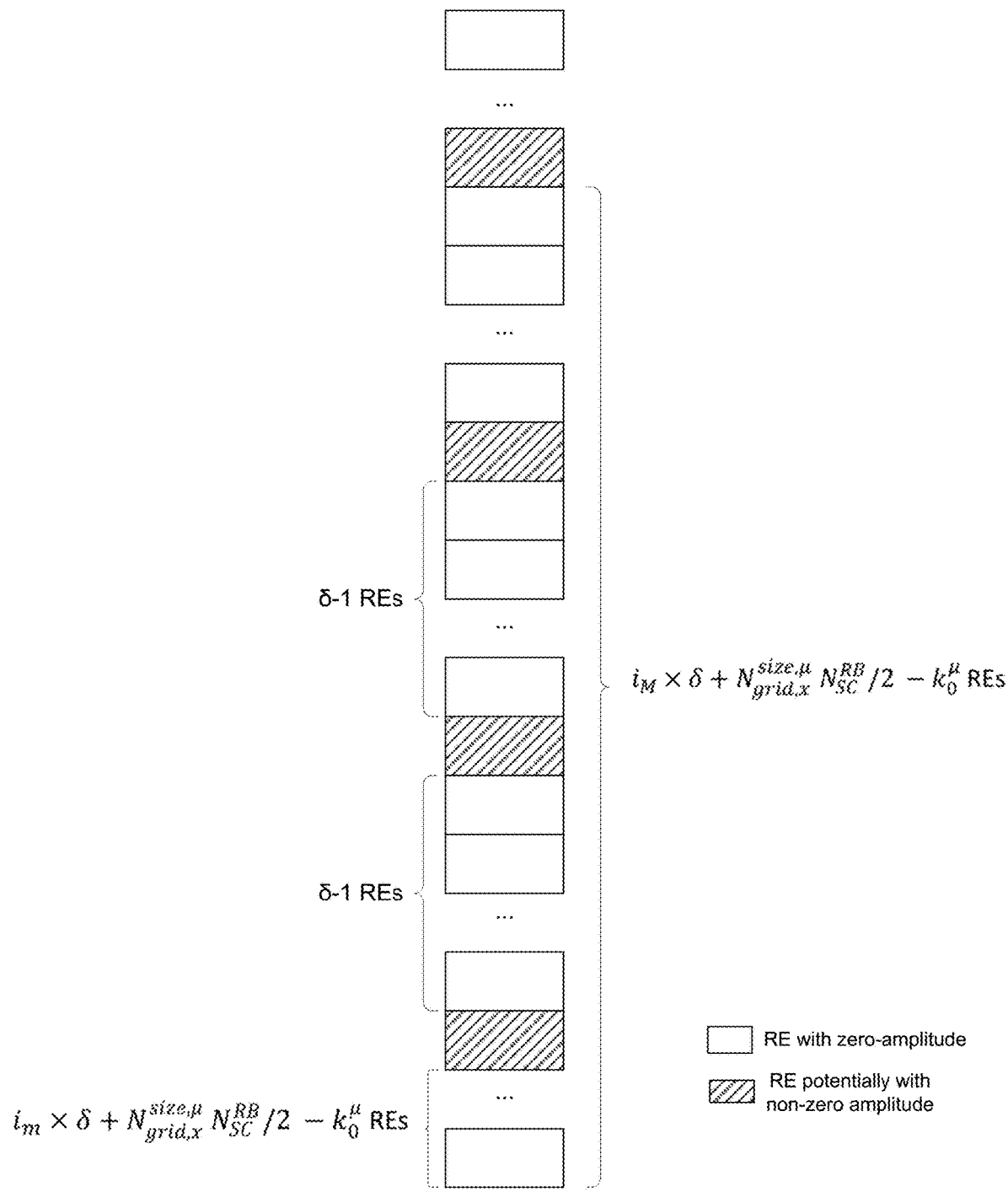
FIG. 35 illustrates an exemplary structure of the NR-U common preamble according to one embodiment of the present disclosure.
Figure 36B:
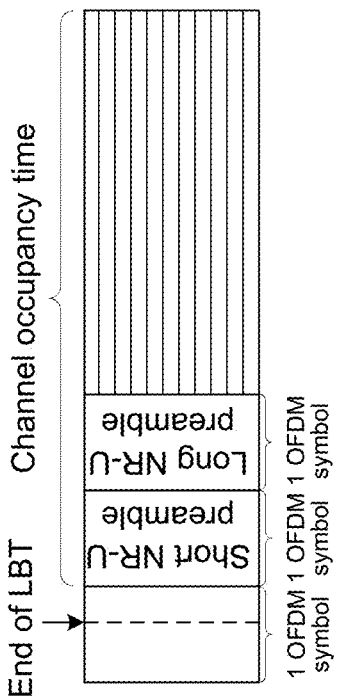
FIGS. 36A, 36B, 36C, and 36D illustrate exemplary embodiments of transmitting a NR-U common preamble as early as a next NR-U OFDM symbol that comes after the LBT process according to embodiments of the present disclosure.
Figure 36D:
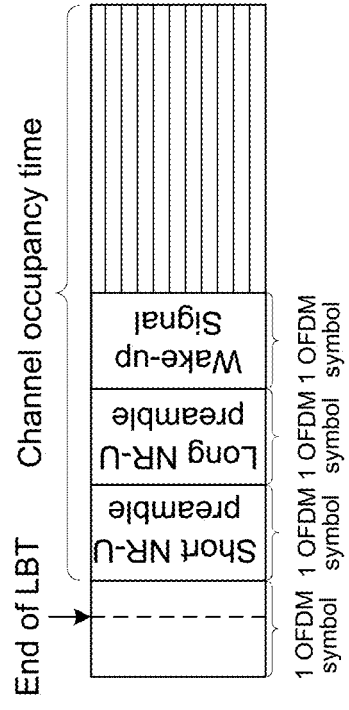
Figure 36A:
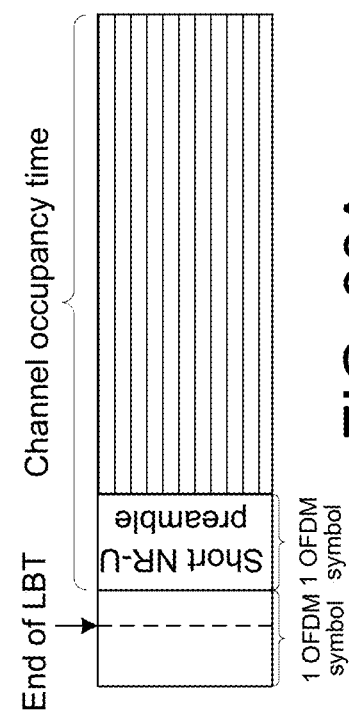
Figure 36C:
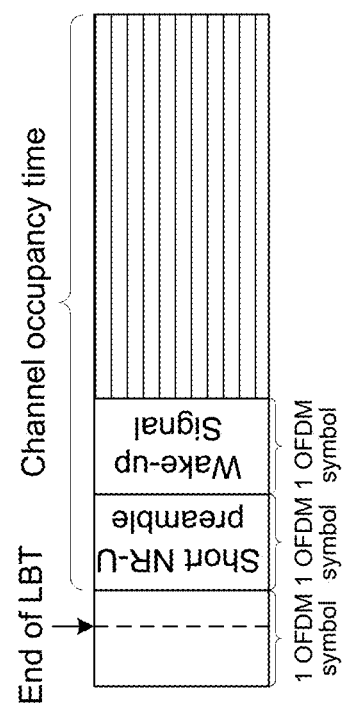

FIG. 35 illustrates an exemplary structure of the NR-U common preamble according to one embodiment of the present disclosure. The embodiment shown in FIG. 35 is for illustration only. Other embodiments could be used without departing from the scope of the present disclosure In this example, the NR-U common preamble is transmitted at OFDM symbol l, wherein $|a_{k,l}^{(p,\mu)}|=0$ for any $k \neq i \times \delta + N_{grid,x}^{size,\mu} N_{SC}^{RB}/2 - k_0^\mu$, with $i_m \leq i \leq i_M$; while the remaining subcarriers/REs can potentially have non-zero amplitude.

In one sub-example, the short NR-U common preamble (i.e., first example of the second approach of the Embodiment 10) can be achieved by setting the NR-U subcarrier spacing $\Delta f$, and parameter $\delta$ as defined in this example according to one or multiple of the options as shown in TABLE 1. In addition, for each carrier bandwidth and subcarrier spacing, the maximum length of the NR-U common preamble sequence, which corresponds to the maximum number of subcarriers that can have non-zero amplitudes, is illustrated in TABLE 2. TABLE 2 is obtained as $i_M - i_m + 1$ assuming $|a_{k,l}^{(p,\mu)}| \neq 0$ for any $k = i \times \delta + N_{grid,x}^{size,\mu} N_{SC}^{RB}/2 - k_0^\mu$, with $i_m \leq i \leq i_M$ and $k_0^\mu = 0$; the max preamble sequence length for other values of $k_0^\mu$ (e.g., 6, 12) can be obtained similarly.

TABLE 1

| $\Delta f$ | $\delta$ | NR-U preamble periodicity (1/$\delta\Delta f$) |
|---|---|---|
| 15 kHz | 83 | 0.8032 μs |
| 15 kHz | 84 | 0.79365 μs |
| 30 kHz | 41 | 0.813 μs |
| 30 kHz | 42 | 0.79365 μs |
| 60 kHz | 20 | 0.8333 μs |
| 60 kHz | 21 | 0.79375 μs |

TABLE 2

| | $\Delta f$ = 15 kHz, $\delta$ = 83 | $\Delta f$ = 15 kHz, $\delta$ = 84 | $\Delta f$ = 30 kHz, $\delta$ = 41 | $\Delta f$ = 30 kHz, $\delta$ = 42 | $\Delta f$ = 60 kHz, $\delta$ = 20 | $\Delta f$ = 60 kHz, $\delta$ = 21 |
|---|---|---|---|---|---|---|
| 20 MHz | 15 | 15 | 15 | 15 | 15 | 13 |
| 40 MHz | 31 | 31 | 31 | 31 | 31 | 29 |
| 60 MHz | N/A | N/A | 47 | 47 | 47 | 45 |
| 80 MHz | N/A | N/A | 63 | 62 | 65 | 61 |
| 100 MHz | N/A | N/A | 79 | 78 | 81 | 77 |

In another sub-example, the long NR-U common preamble (i.e., second example of the second approach of the Embodiment 10) can be achieved through setting the NR-U subcarrier spacing $\Delta f$, and parameter $\delta$ as defined in this example according to one or multiple of the options as shown in TABLE 3. As can be observed from TABLE 3, ($\Delta f$, $\delta$)=(15 kHz, 21) satisfies that the difference between the periodicity for NR-U preamble and the 3.2 μs periodicity of long training symbol for 802.11 is less than 1 802.11 OFDM sample period, while other configurations from TABLE 3 have difference larger than 1 802.11 OFDM sample period. In addition, for each carrier bandwidth and subcarrier spacing, the maximum length of the NR-U common preamble sequence, which corresponds to the maximum number of subcarriers that have non-zero amplitudes, is illustrated in TABLE 4. TABLE 4 is obtained as $i_M - i_m + 1$ assuming $|a_{k,l}^{(p,\mu)}| \neq 0$ for any $k = i \times \delta + N_{grid,x}^{size,\mu} N_{SC}^{RB}/2 - k_0^\mu$, with $i_m \leq i \leq i_M$ and $k_0^\mu = 0$; the max preamble sequence length for other values of $k_0^\mu$ (e.g., 6, 12) can be obtained similarly. Compared to the short NR-U common preamble, the sequence length for long NR-U common preamble can be much longer due to longer periodicity in the time-domain.

TABLE 3

| $\Delta f$ | $\delta$ | NR-U preamble periodicity (1/$\delta\Delta f$) |
|---|---|---|
| 15 kHz | 21 | 3.1746 μs |
| 15 kHz | 20 | 3.333 μs |
| 30 kHz | 10 | 3.333 μs |
| 30 kHz | 11 | 3.0303 μs |
| 60 kHz | 5 | 3.3333 μs |

TABLE 4

| | $\Delta f$ = 15 kHz, $\delta$ = 21 | $\Delta f$ = 15 kHz, $\delta$ = 20 | $\Delta f$ = 30 kHz, $\delta$ = 10 | $\Delta f$ = 30 kHz, $\delta$ = 11 | $\Delta f$ = 60 kHz, $\delta$ = 5 |
|---|---|---|---|---|---|
| 20 MHz | 61 | 63 | 61 | 55 | 57 |
| 40 MHz | 123 | 129 | 127 | 115 | 123 |
| 60 MHz | N/A | N/A | 195 | 177 | 189 |
| 80 MHz | N/A | N/A | 261 | 237 | 257 |
| 100 MHz | N/A | N/A | 327 | 297 | 324 |

In another sub-example, depending on the frequency resources that the NR-U preamble is intended to transmit over with if an LBT is successful, the NR-U common preamble can be mapped in frequency domain to either the entire resource grid of $N_{grid,x}^{size,\mu}$ PRBs for an NR-U carrier; or a subset of the resource grid of $N_{grid,x}^{size,\mu}$ PRBs of an NR-U carrier. For instance, the frequency resource for NR-U common preamble can be the configured BWP(s) for DL or UL transmission, while the remaining REs can have zero-amplitude in generating the OFDM signal for preamble, i.e., $|a_{k,l}^{(p,\mu)}| = 0$ if NR-U common preamble is not mapped onto subcarrier k and OFDM symbol l at antenna port p within the common resource grid. In addition, among the frequency resources that the NR-U common preamble is mapped to, the actual frequency resource that can be utilized to transmit the NR-U common preamble will further depend on the result of LBT.

In addition to the design of the NR-U common preamble sequence pattern, another important consideration is the timing position to transmit the preamble.

FIGS. 36A, 36B, 36C, and 36D illustrate exemplary embodiments of transmitting a NR-U common preamble as early as a next NR-U OFDM symbol that comes after the LBT process according to embodiments of the present disclosure. The embodiment shown in FIGS. 36A, 36B, 36C, and 36D are for illustration only. Other embodiments could be used without departing from the scope of the present disclosure In one example of the second approach of the Embodiment 10, the time-domain resource to transmit the NR-U common preamble sequence can be the NR-U OFDM symbol(s) that comes after the completion of a successful LBT process.

In one sub-example, if the LBT finishes in the middle of an NR-U OFDM symbol, the NR-U common preamble will be transmitted as early as the next NR-U OFDM symbol that comes after LBT. In one sub-example, if the NR-U common preamble only includes the short NR-U preamble sequence, it can be transmitted in the first NR-U OFDM symbol that comes after the completion of a successful LBT process. An illustration of this sub-example is provided by FIG. 36A.

In another sub-example, if the NR-U common preamble includes both the short NR-U preamble sequence and long NR-U preamble sequence, the NR-U preamble can be transmitted in the first two NR-U symbols that come after the completion of a successful LBT process. An illustration of this sub-example is provided by FIG. 36B.

In another sub-example, the NR-U common preamble can include only the short NR-U preamble sequence, which is transmitted in the NR-U OFDM symbol that comes after the completion of a successful LBT process; while another wake-up signal (WUS) can be transmitted in the one or few OFDM symbols after the NR-U common preamble, which can carry information such as the NR-U cell-ID, UE-group ID, COT duration information, etc. An illustration of this sub-example is provided by FIG. 36C. In one instance, the WUS can follow the NR-U frame structure and time-frequency domain resource allocation. In another instance, the WUS can be the SIG field of 802.11a.

In another sub-example, the NR-U common preamble can include the short NR-U preamble sequence and long NR-U preamble sequence, which is transmitted in the first two NR-U OFDM symbols that come after the completion of a successful LBT process; while another wake-up signal (WUS) can be transmitted in the one or few OFDM symbols after the NR-U common preamble, which can carry information such as the NR-U cell-ID, UE-group ID, COT duration information, etc.; and the bandwidth of WUS can be same or different from the bandwidth of the preamble. An illustration of this sub-example is provided by FIG. 36D. In one instance, the WUS can follow the NR-U frame structure and time-frequency domain resource allocation. In another instance, the WUS can be the SIG field of 802.11a.

In another sub-example, the NR-U common preamble can include in time domain a subset of all the samples of the short NR-U preamble sequence, and/or in time domain a subset of all the samples of the long NR-U preamble sequence, such that the resulting subset samples of the short/long NR-U preamble sequence has the same duration as the short/long training symbols of 802.11a (i.e., 8 μs).

In another sub-example, when the WUS is transmitted after the NR-U common preamble wherein the WUS carries information regarding the COT duration or the ending time instance of the COT, the unlicensed device that is able to detect the NR-U common preamble and decode the WUS of NR-U can determine the channel will be occupied for the duration or until the ending position indicated by WUS. For instance, this can facilitate the virtual carrier sensing for NR-U and/or Wi-Fi.

In another example of the second approach of the Embodiment 10, the NR-U common preamble sequence can carry the radio-access-technology (RAT) information, such that an NR-U UE upon detecting the existence of the NR-U common preamble can further determine the preamble is from NR-U rather than Wi-Fi.

This can be achieved by using cross-correlation based algorithms or through observing the frequency domain structure of the preamble by the UE. In addition, upon detecting a preamble sequence, the Wi-Fi device can also differentiate if the sequence is from NR-U or Wi-Fi using similar approaches, such that that Wi-Fi device can stop fine synchronization/channel estimation or detecting the SIGNAL field, which is beneficial in power saving.

In another example of the second approach of the Embodiment 10, the NR-U common preamble sequence can carry the NR-U operator information, such that NR-U receiver can identify which NR-U operator the detected NR-U common preamble belongs to.

In addition to the NR-U common preamble sequence detailed in the first two approaches of the Embodiment 10, another design factor is the frequency position for NR-U transmitter to transmit the NR-U common preamble sequence after a successful LBT, which will depend on the frequency-unit(s) wherein the LBT is performed and the corresponding LBT result.

In a third approach of the Embodiment 10, NR-U transmitter can transmit the NR-U common preamble sequence over all the frequency units that have passed an LBT.

In one example of the third approach of the Embodiment 10, LBTs can performed over the entire component carrier bandwidth, and the NR-U common preamble can be transmitted over the entire component carrier if an LBT is passed. In one sub-example, the component carrier bandwidth can be 20/40/60/80/100 MHz. In another sub-example, for the first approach of the Embodiment 10 wherein NR-U preamble reuses Wi-Fi preamble, since Wi-Fi supports bandwidth of 20 MHz (802.11a/n/ac), 40 MHz (802.11n/ac), 80 MHz (802.11ac), 80+80 MHz (802.11ac), 160 MHz (802.11ac), NR-U can support carrier bandwidth being selected as one of the options supported by Wi-Fi when the first approach of the Embodiment 10 is used, and the Wi-Fi preamble that corresponds the selected carrier bandwidth can be transmitted by the NR-U transmitter.

In another example of the third approach of the Embodiment 10, the frequency unit for LBT can be a bandwidth-part (BWP). In one sub-example, NR-U transmitter can perform LBT over at least one BWPs in parallel, and the NR-U common preamble sequence can be transmitted in the BWP(s) that have successfully passed an LBT. In one sub-example, each BWP can be an integer multiple of 20 MHz. In another sub-example, for the first approach of the Embodiment 10 wherein NR-U preamble reuses Wi-Fi preamble, NR-U can select the BWP bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter if an LBT is passed on this BWP.

In another example of the third approach of the Embodiment 10, the frequency unit for a LBT can be a sub-band of fixed bandwidth, and NR-U transmitter can perform LBTs over multiple sub-bands in parallel, and the NR-U common preamble sequence can be transmitted in the sub-band(s) that have successfully passed an LBT. In one sub-example, each sub-band can be 20 MHz. In another sub-example, for the first approach of the Embodiment 10 wherein NR-U preamble reuses Wi-Fi preamble, NR-U can select the sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected sub-band bandwidth can be transmitted by the NR-U transmitter if an LBT is passed on this sub-band; or for neighboring consecutive sub-bands that pass an LBT and their combined bandwidth is one of the supported Wi-Fi bandwidth, the Wi-Fi preamble that corresponds to the combined sub-bands bandwidth can be transmitted by the NR-U transmitter.

In another example of the third approach of the Embodiment 10, in correspond to the second approach of the Embodiment 10, this means $|a_{k,l}^{(p,\mu)}| \neq 0$ for any $k = i \times \delta + N_{grid,x}^{size,\mu} N_{SC}^{RB}/2 - k_0^{\mu}$, with $i_m \leq i \leq i_M$ and subcarrier k belongs the frequency unit that passes an LBT.

In another example of the third approach of the Embodiment 10, through the frequency unit(s) wherein the NR-U preamble is detected, the NR-U receiver can derive the frequency position(s) that the NR-U transmitter passes an LBT.

FIGS. 37A to 37B illustrate exemplary FBE channel access schemes with configurable BWPs for the LBT processes according to embodiments of the present disclosure. The embodiments shown in FIGS. 37A to 37B are for illustration only. Other embodiments could be used without departing from the scope of the present disclosure In another sub-example, this example can be applied by the UE to down-select from its configured BWPs (e.g. the successful detection of a NR-U preamble is treated as an indicator of the availability of the corresponding configured BWP), or the sub-bands within its configured BWPs (e.g. the successful detection of a NR-U preamble is treated as an indicator of the availability of the corresponding sub-band within the configured BWP), for PDCCH monitoring inside current COT; such that UE only monitors for PDCCH from the BWP(s), or the sub-band(s) within its configured BWPs that passes an LBT. As a result, the PDCCH monitoring occasions for the UE can potentially be reduced after detecting the NR-U common preamble.

In one instance of the sub-example, if a UE is configured with 4 DL BWPs indexed BWP 0 to BWP 3, and BWP 0 being the active DL BWP previously configured to the UE; assume BWP 0 and BWP 1 fail an LBT while BWP 2 and BWP 3 pass an LBT. If NR-U common preamble is not supported, then UE may either need to monitor for PDCCH only on its previously configured active BWP which fails the LBT; or to enable switching to a new active DL BWP that passes an LBT within current COT, the UE needs to also monitor for a PDCCH on BWP 1, BWP 2 and BWP 3 within current COT; which potentially cause high UE power consumption. An illustration of this scenario is provided in FIG. 37A. By contrast, if NR-U common preamble is supported, and with NR-U common preamble being detected only on BWP 2 and BWP 3 but not BWP 0 and BWP 1, UE can down-select to only monitor PDCCH on BWP 2 and BWP 3 for BWP switching. An illustration of this scenario is provided in FIG. 37B.

In a fourth approach of the Embodiment 10, NR-U transmitter can transmit the NR-U common preamble sequence over a subset S of the frequency units that have passed an LBT.

In one example of the fourth approach of the Embodiment 10, LBTs can performed over the entire component carrier bandwidth, and the NR-U common preamble can be transmitted over a sub-band of the component carrier if an LBT is passed. In one sub-example, the sub-band can be of 20 or 40 MHz. In another sub-example, for the first approach of the Embodiment 10 wherein NR-U preamble reuses Wi-Fi preamble, NR-U can select this sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter.

In another example of the fourth approach of the Embodiment 10, the frequency unit for an LBT can be a bandwidth-part (BWP), and NR-U transmitter can perform an LBT over multiple BWPs in parallel, and the NR-U common preamble sequence can be transmitted in a subset of the BWP(s) that have successfully passed an LBT.

In one sub-example, this example can be applied by the gNB for indicating the active DL BWP to the UE and BWP switching if necessary, through selecting one BWP (if any) among the BWPs that have passed an LBT.

In one instance of this sub-example, if gNB configures 4 BWPs for a UE and the previously configured active DL BWP passes LBT, gNB can only transmit the NR-U common preamble sequence on the active DL BWP, and the UE that detects the NR-U common preamble can continue to monitor this active DL BWP for PDCCH/PDSCH inside a current COT.

In another instance of this sub-example, if gNB configures 4 BWPs for a UE and the previously configured active DL BWP fails the LBT, gNB can transmit the NR-U common preamble sequence on one of the remaining DL BWPs that have passed LBT, while UE switches to this DL BWP for receiving a PDCCH/PDSCH if it detected the NR-U common preamble on this BWP inside a current COT.

In another sub-example, for the first approach of the Embodiment 10 wherein NR-U preamble reuses Wi-Fi preamble, NR-U can select each BWP bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter.

Figure 38:
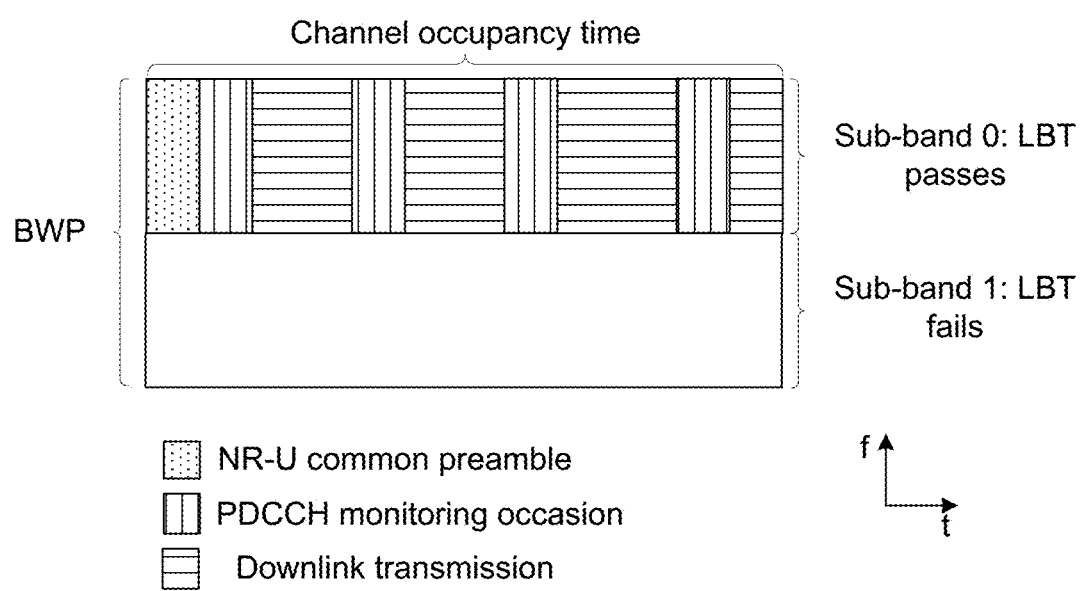
FIG. 38 illustrates an exemplary FBE channel access scheme of performing LBTs over multiple sub-bands in parallel according to embodiments of the present disclosure.

FIG. 38 illustrates an exemplary FBE channel access scheme of performing LBTs over multiple sub-bands in parallel according to embodiments of the present disclosure. The embodiment shown in FIG. 38 for illustration only. Other embodiments could be used without departing from the scope of the present disclosure In another example of the fourth approach of the Embodiment 10, the frequency unit for an LBT process can be a sub-band of fixed bandwidth, and NR-U transmitter can perform LBTs over multiple sub-bands in parallel, and the NR-U common preamble sequence can be transmitted in a subset of the sub-band(s) that have successfully passed an LBT.

In one sub-example, through selecting the sub-band(s) that have passed the LBT to transmit NR-U preamble sequence, gNB can indicate to the UE the active DL BWP as well as which sub-band(s) within the active DL BWP to monitor to receive PDCCH/PDSCH.

For instance, if gNB configures 4 BWPs for a UE, and certain sub-band(s) within the previously configured active DL BWP passes an LBT, gNB can transmit the NR-U common preamble sequence on the sub-band(s) within the active DL BWP that passes LBT, while the UE can receive PDCCH/PDSCH only from these sub-band(s) within the active DL BWP inside the current COT.

An illustration of this sub-example is provided in FIG. 38, wherein the active BWP consists of two sub-bands with sub-band 0 passes LBT and sub-band 1 fails LBT; then the gNB would transmit NR-U common preamble on sub-band 0 and only transmits in sub-band 0 for the remaining of the current COT.

In another sub-example, for the first approach of the Embodiment 10 wherein NR-U preamble reuses Wi-Fi preamble, NR-U can select each sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected sub-band bandwidth can be transmitted by the NR-U transmitter; or for neighboring consecutive sub-bands that pass an LBT and their combined bandwidth is one of the supported Wi-Fi bandwidth, the Wi-Fi preamble that corresponds to the combined sub-bands bandwidth can be transmitted by the NR-U transmitter.

In another example of the fourth approach of the Embodiment 10, for the second approach of the Embodiment 10, this means $|a_{k,l}^{(p,\mu)}| \neq 0$ for any $k = i \times \delta + N_{grid,x}^{size,\mu} N_{SC}^{RB}/2 - k_0^{\mu}$, with $i_m \leq i \leq i_M$ and subcarrier k belongs selected sub-set S within the frequency unit that passes an LBT process.

Another design factor is the additional information that can be carried or derived from the NR-U common preamble sequence.

In a fifth approach of the Embodiment 10, the NR-U receiver can detect the start of a channel occupancy time by detecting the existence of the NR-U common preamble sequence.

In one example, for NR-U downlink, UE can detect the start of a COT upon detecting NR-U common preamble sequence; after which the UE can start to monitor for PDCCH until its corresponding PDCCH can be received, or the end of the COT is reached, wherein UE can determine the COT duration as the longest COT allowed by unlicensed regulation (e.g., 8 ms for 5 GHz unlicensed band).

Figure 39:
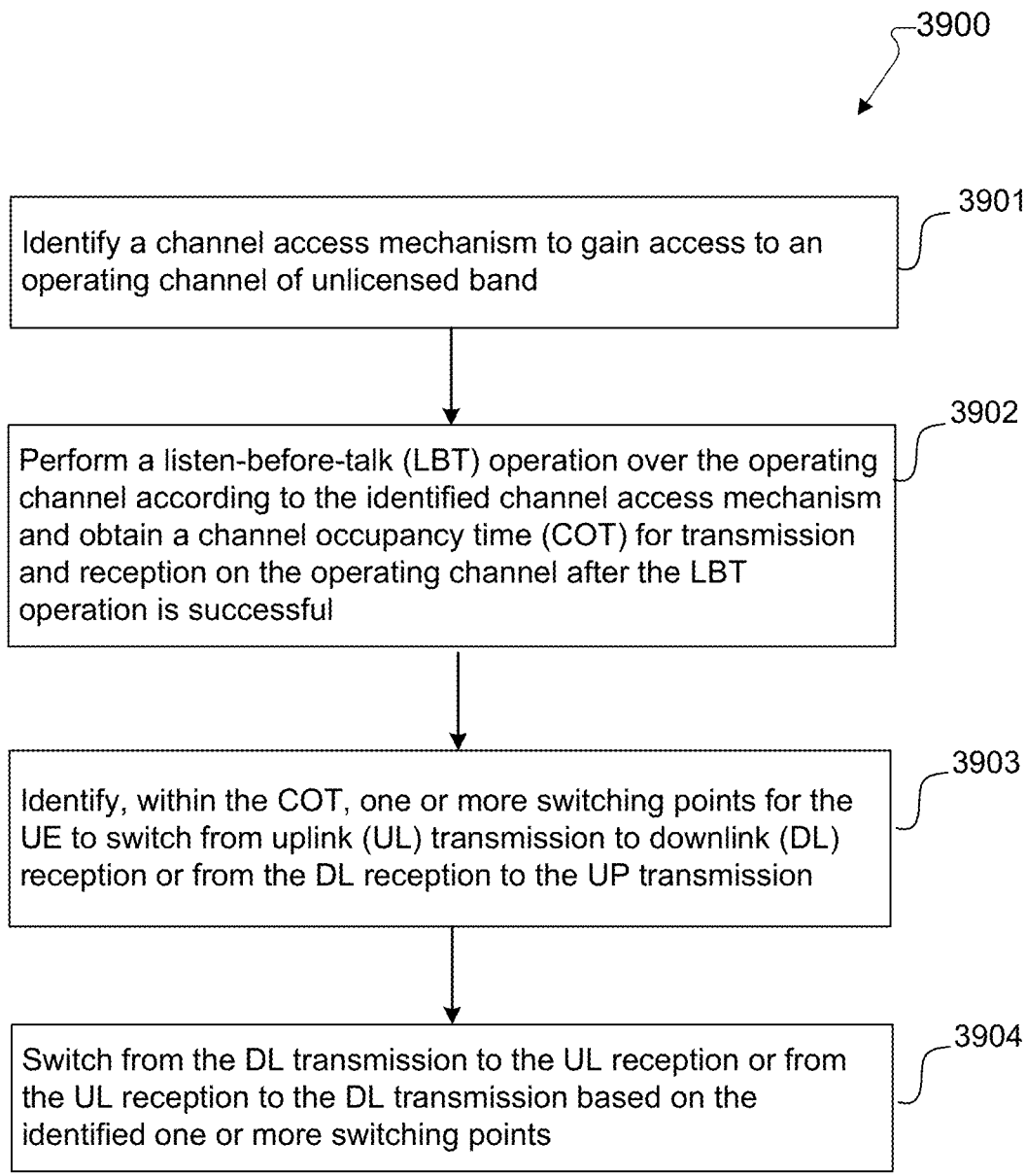
FIG. 39 illustrates a flowchart of an example method for operating a UE according to embodiments of the present disclosure.

FIG. 39 illustrates a flowchart of a method 3900 for operating a UE according to embodiments of the present disclosure. The embodiment of the method 3900 illustrated in FIG. 39 is for illustration only. FIG. 39 does not limit the scope of the present disclosure to any particular implementation. The method 3900 may be performed by a UE such as UE 116 or any other UEs discussed herein.

The method 3900 begins with the UE 116 identifying a channel access mechanism to gain access to an operating channel of unlicensed band in step 3901. For example, in step 3901, the identified channel access mechanism is one of a load based equipment (LBE) mode in which an LBT is configured with a configurable sensing duration to obtain an adaptable contention window size, and a frame based equipment (FBE) mode in which an LBT with a fixed sensing duration is performed prior to each of periodic fixed frame periods (FFPs) and the UE is configured to transmit or receive a transmission within the COT after the LBT.

In another example, the FBE mode is configured with at least one of a length of an FFP that is configurable from a pre-defined set of values in a unit of one millisecond or one slot, a length of a COT that is configurable with one of a fixed maximum value, a percentage of an FFP, or one of a set of predefined values, or a starting position of an FFP that is configurable by a time granularity of one of one microsecond, one millisecond, one symbol, or 1/(480 kilo-Hertz (kHz)*4096).

In yet another example, when the identified channel access mechanism is configured with the FBE mode and a carrier channel bandwidth is larger than an operating channel bandwidth of a unlicensed band, the UE 116 is further configured with a maximum number of FFPs to be consecutively utilized by the UE for a transmission or a reception, wherein the UE is configured to utilize different subsets of the operating channels of the unlicensed band within the carrier channel bandwidth in a time-division multiplexed pattern.

The UE 116 then performs a listen-before-talk (LBT) operation over the operating channel according to the identified channel access mechanism and obtain a channel occupancy time (COT) for transmission and reception on the operating channel after the LBT operation is successful in step in step 3902.

For example, in step 3902, when the identified channel access mechanism is configured with the FBE mode, the UE 116 performs an LBT over each of a plurality of spatial receive (RX) parameters aligned with intended spatial transmit (TX) parameters simultaneously, and utilize spatial parameters that have passed LBT for transmission during a COT; or the UE 116 performs an LBT over each of the plurality of spatial RX parameters sequentially over each of time units; or the UE 116 performs an omni-directional LBT by, if the omni-directional LBT passes, causing the transceiver to send a transmission, or if the omni-directional LBT does not pass, performing a directional LBT and cause the transceiver to send a transmission over a spatial TX parameter that has passed the directional LBT.

Thereafter, the UE 116 identifies, within the COT, one or more than one switching points for the UE to switch from uplink (UL) transmission to downlink (DL) reception or from the DL reception to the UL transmission in step 3903.

For example, in step 3903, the UE 116 further determines whether each switching point occurs within a gap after a last DL reception if switching from the DL reception to the UL transmission, or a last UL transmission if switching from the UL transmission to the DL reception, occurs. In response to each switching point occurring within the gap, The UE 116 performs a switching between the DL reception and the UL transmission, without performing an LBT, and in response to the each switching point occurring out of the gap, the UE 116 performs an LBT ending prior to each switching point, or extends a cyclic prefix of a perspective UL transmission such that a prospective UL transmission starts within the gap after an end of the last UL transmission. In one instance, the gap is a short interframe space (SIFS) duration.

Subsequently, the UE 116 switches from the UL transmission to the DL reception or from the DL reception to the UL transmission based on the identified one or more switching points in step 3904. For example, in step 3904, a maximum number of switchings between the UL transmission to the DL reception within the COT is configured to be one of a predefined fixed number, a scalable number which is non-decreasing with respect to the COT, a scalable number with respect to an LBT priority class that is non-decreasing as a channel access priority decreases; or a scalable number that is non-decreasing with respect to a fixed frame period. For another example, the UE 116 transmits a preamble signal, wherein, in a frequency domain, the preamble sequence is be mapped to subcarriers in which subcarrier indexes for which any two adjacent preamble sequence elements are mapped to be differed by a same fixed number N, and, in a time domain, the preamble sequence is transmitted with a periodic repetition pattern with a periodicity of 1/(N*a subcarrier spacing of the preamble signal).

The BS 102 may perform a reciprocal process in that BS 102 identifies a channel access mechanism to gain access to an operating channel of unlicensed band, performs a listen-before-talk (LBT) operation over the operating channel according to the identified channel access mechanism and obtain a channel occupancy time (COT) for transmission and reception on the operating channel after the LBT operation is successful, identifies, within the COT, one or more than one switching points for the BS to switch from downlink (DL) transmission to uplink (UL) reception or from the UL reception to the DL transmission, switches from the DL transmission to the UL reception or from the UL reception to the DL transmission based on the identified one or more switching points.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) in a wireless communication system, the UE comprising:
at least one processor configured to:
identify a channel access mechanism to gain access to an operating channel of an unlicensed band;
perform a listen-before-talk (LBT) operation over the operating channel according to the identified channel access mechanism and obtain a channel occupancy time (COT) for transmission and reception on the operating channel after the LBT operation is successful;
identify, within the COT, one or more switching points for the UE to switch from
uplink (UL) transmission to downlink (DL) reception or from the DL reception to the UL transmission;
determine whether each of the one or more switching points occurs within a gap after (i) a last DL reception when switching from the DL reception to the UL transmission occurs or (ii) a last UL transmission when switching from the UL transmission to the DL reception occurs; and
in response to each of the one or more switching points occurring within the gap, perform a switching between the DL reception and the UL transmission, without performing an LBT; and
a transceiver operably connected to the at least one processor, the transceiver configured to:
transmit to or receive from a base station (BS) over the operating channel during the COT; and
switch from the UL transmission to the DL reception or from the DL reception to the UL transmission based on the identified one or more switching points.

2. The UE of claim 1, wherein:
if the identified channel access mechanism is-a load-based equipment (LBE) mode, the processor is configured to identify a configurable sensing duration to obtain an adaptable contention window size for the LBT operation;
if the identified channel access mechanism is a frame-based equipment (FBE) mode, the processor is configured to identify a fixed sensing duration prior to each of periodic fixed frame periods (FFPs) to perform the LBT operation; and
the UE is configured to transmit or receive a transmission within the COT after the LBT operation.

3. The UE of claim 2, wherein the FBE mode is configured with at least one of:
a length of an FFP that is configurable from a pre-defined set of values in a unit of one millisecond or one slot;
a length of a COT that is configurable with one of a fixed maximum value, a percentage of an FFP, or one of a set of predefined values; or
a starting position of an FFP that is configurable by a time granularity of one of one microsecond, one millisecond, one symbol, or 1/(480 kilo-Hertz (kHz)*4096).

4. The UE of claim 2, wherein when the identified channel access mechanism is configured with the FBE mode, the processor is further configured to:
perform an LBT over each of a plurality of spatial receive (RX) parameters aligned with intended spatial transmit (TX) parameters simultaneously, and utilize spatial parameters that have passed LBT for transmission during a COT; and
perform an LBT over each of the plurality of spatial RX parameters sequentially over each of time units; or
perform an omni-directional LBT by:
if the omni-directional LBT passes, causing the transceiver to send a transmission, or
if the omni-directional LBT does not pass, performing a directional LBT and causing the transceiver to send a transmission over a spatial TX parameter that has passed the directional LBT.

5. The UE of claim 1, wherein the processor is further configured to:
in response to the each of the one or more switching points occurring outside of the gap:
cause the transceiver to perform an LBT ending prior to each of the one or more switching points; or
extend a cyclic prefix of a perspective UL transmission such that a prospective UL transmission starts within the gap after an end of the last UL transmission,
wherein the gap is a short interframe space (SIFS) duration.

6. The UE of claim 1, wherein a maximum number of switchings between the UL transmission to the DL reception within the COT is configured to be one of:
a predefined fixed number;
a scalable number which is non-decreasing with respect to the COT;
a scalable number with respect to an LBT priority class that is non-decreasing as a channel access priority decreases; or
a scalable number that is non-decreasing with respect to a fixed frame period.

7. The UE of claim 1, wherein a maximum allowed number of LBT attempts at each of the one or more switching points between the UL transmission to the DL reception is configured to be one of:
a predefined fixed number; or
a scalable number which is non-decreasing with respect to a duration of a perspective UL transmission after each of the one or more switching points between the UL transmission and the DL reception,
wherein a time interval between adjacent LBT attempts is configurable such that:
a new LBT attempt immediately restarts if a previous LBT attempt fails; a new LBT attempt starts at one of a next symbol boundary, a next mini-slot boundary, or a next slot boundary; or a new LBT is attempted such that a perspective UL transmission starts at one of the next symbol boundary, the next mini-slot boundary, or the next slot boundary.

8. The UE of claim 1, wherein the at least one processor is further configured to cause the transceiver to transmit a preamble signal, wherein:

in a frequency domain, the preamble signal is mapped to subcarriers in which subcarrier indexes for which any two adjacent preamble signal elements are mapped to be differed by a same fixed number N; and in a time domain, the preamble signal is transmitted with a periodic repetition pattern with a periodicity of 1/(N*a subcarrier spacing of the preamble signal).

9. A base station (BS) in a wireless communication system, the BS comprising:

at least one processor configured to:
identify a channel access mechanism to gain access to an operating channel of an unlicensed band;
perform a listen-before-talk (LBT) operation over the operating channel according to the identified channel access mechanism and obtain a channel occupancy time (COT) for transmission and reception on the operating channel after the LBT operation is successful;
identify, within the COT, one or more switching points for the BS to switch from downlink (DL) transmission to uplink (UL) reception or from the UL reception to the DL transmission;
determine whether each of the one or more switching points occurs within a gap after (i) a last UL reception when switching from the UL reception to the DL transmission occurs or (ii) a last DL transmission when switching from the DL transmission to the UL reception occurs; and
in response to each of the one or more switching points within the gap, perform a switching between the UL reception and the DL transmission, without performing an LBT; and a transceiver operably connected to the at least one processor, the transceiver configured to:
transmit to or receive from a user equipment (UE) over the operating channel during the COT; and
switch from the DL transmission to the UL reception or from the UL reception to the DL transmission based on the identified one or more switching points.

10. The BS of claim 9, wherein:
if the identified channel access mechanism is a load-based equipment (LBE) mode, the processor is configured to identify a configurable sensing duration to obtain an adaptable contention window size for the LBT operation;
if the identified channel access mechanism is a frame-based equipment (FBE) mode, the processor is configured to identify a fixed sensing duration prior to each of periodic fixed frame periods (FFPs) to perform the LBT operation; and
the BS is configured to transmit or receive a transmission within the COT after the LBT operation.

11. The BS of claim 10, wherein when the identified channel access mechanism is configured with the FBE mode, the processor is further configured to:
perform an LBT over each of a plurality of spatial receive (RX) parameters aligned with intended spatial transmit (TX) parameters simultaneously, and utilize spatial parameters that have passed LBT for transmission during a COT; and
perform an LBT over each of the plurality of spatial RX parameters sequentially over each of time units; or
perform an omni-directional LBT by:
if the omni-directional LBT passes, causing the transceiver to send a transmission, or
if the omni-directional LBT does not pass, performing a directional LBT and causing the transceiver to send a transmission over a spatial TX parameter that has passed the directional LBT.

12. The BS of claim 9, wherein the processor is further configured to:
in response to of the one or more switching points occurring outside of the gap:
cause the transceiver to perform an LBT ending prior to each of the one or more switching points; or
extend a cyclic prefix of a perspective DL transmission such that a prospective DL transmission starts within the gap after an end of the last DL transmission,
wherein the gap is a short interframe space (SIFS) duration.

13. The BS of claim 9, wherein a maximum number of switchings between the DL transmission to the UL reception within the COT is configured to be one of:
a predefined fixed number;
a scalable number which is non-decreasing with respect to the COT;
a scalable number with respect to an LBT priority class that is non-decreasing as a channel access priority decreases; or
a scalable number that is non-decreasing with respect to a fixed frame period.

14. The BS of claim 9, wherein a maximum allowed number of LBT attempts at each of the one or more switching points between the DL transmission to the UL reception is configured to be one of:
a predefined fixed number; or
a scalable number which is non-decreasing with respect to a duration of a perspective UL transmission after each of the one or more switching points between the DL transmission and the UL reception,
wherein a time interval between adjacent LBT attempts is configurable such that:
a new LBT attempt immediately restarts if a previous LBT attempt fails; a new LBT attempt starts at one of a next symbol boundary, a next mini-slot boundary, or a next slot boundary; or
a new LBT is attempted such that a perspective DL transmission starts at one of the next symbol boundary, the next mini-slot boundary, or the next slot boundary.

15. The BS of claim 10, wherein the FBE mode is configured with at least one of:
a length of an FFP that is configurable from a pre-defined set of values in a unit of one millisecond or one slot;
a length of a COT that is configurable with one of a fixed maximum value, a percentage of an FFP, or one of a set of predefined values; or
a starting position of an FFP that is configurable by a time granularity of one of one microsecond, one millisecond, one symbol, or 1/(480 kilo-Hertz (kHz)*4096).

16. The BS of claim 9, wherein the at least one processor is further configured to cause the transceiver to transmit a preamble signal, wherein:

in a frequency domain, the preamble signal is mapped to subcarriers in which subcarrier indexes for which any two adjacent preamble signal elements are mapped to be differed by a same fixed number N; and in a time domain, the preamble signal is transmitted with a periodic repetition pattern with a periodicity of 1/(N*a subcarrier spacing of the preamble signal).

17. A method for operating a user equipment (UE) in a wireless communication system, the method comprising:

identifying a channel access mechanism to gain access to an operating channel of unlicensed band;

performing a listen-before-talk (LBT) operation over the operating channel according to the identified channel access mechanism and obtain a channel occupancy time (COT) for transmission and reception on the operating channel after the LBT operation is successful;

identifying, within the COT, one or more switching points for the UE to switch from uplink (UL) transmission to downlink (DL) reception or from the DL reception to the UL transmission;

determining whether each of the one or more switching points occurs within a gap after (i) a last DL reception when switching from the DL reception to the UL transmission occurs or (ii) a last UL transmission when switching from the UL transmission to the DL reception occurs;

in response to each of the one or more switching points occurring within the gap, performing a switching between the DL reception and the UL transmission, without performing an LBT; and switching from the UL transmission to the DL reception or from the DL reception to the UL transmission based on the identified one or more switching points.

18. The method of claim 17, wherein the identified channel access mechanism is one of:

a load-based equipment (LBE) mode in which an LBT is configured with a configurable sensing duration to obtain an adaptable contention window size; and a frame-based equipment (FBE) mode in which an LBT with a fixed sensing duration is performed prior to each of periodic fixed frame periods (FFPs) and the UE is configured to transmit or receive a transmission within the COT after the LBT.

19. The method of claim 17, further comprising:

in response to the each of the one or more switching points occurring outside of the gap:

performing an LBT ending prior to each of the one or more switching points; or extending a cyclic prefix of a perspective UL transmission such that a prospective UL transmission starts within the gap after an end of the last UL transmission, wherein the gap is a short interframe space (SIFS) duration.

20. The method of claim 17, wherein a maximum number of switchings between the UL transmission to the DL reception within the COT is configured to be one of:

a predefined fixed number;

a scalable number which is non-decreasing with respect to the COT;

a scalable number with respect to an LBT priority class that is non-decreasing as a channel access priority decreases; or a scalable number that is non-decreasing with respect to a fixed frame period.

* * * * *